(12) United States Patent
Guina et al.

(10) Patent No.: US 9,762,094 B2
(45) Date of Patent: Sep. 12, 2017

(54) LOW SPEED ELECTROMAGNETIC TURBINE

(71) Applicant: HERON ENERGY PTE LTD, Singapore (SG)

(72) Inventors: Ante Guina, Surfers Paradise (AU); John Kells, Surfers Paradise (AU); Kurt Labes, Surfers Paradise (AU); Stuart Galt, Surfers Paradise (AU); Johannes S. De Beer, Surfers Paradise (AU); David B. T. Sercombe, Surfers Paradise (AU); Rene Fuger, Surfers Paradise (AU)

(73) Assignee: HERON ENERGY PTE LTD, Singapore (SG)

(*) Notice: Subject to any disclaimer, the term of this patent is extended or adjusted under 35 U.S.C. 154(b) by 706 days.

(21) Appl. No.: 14/081,003

(22) Filed: Nov. 15, 2013

(65) Prior Publication Data
US 2014/0306568 A1    Oct. 16, 2014

Related U.S. Application Data

(63) Continuation of application No. PCT/AU2012/000346, filed on Apr. 5, 2012.

(30) Foreign Application Priority Data

May 17, 2011 (AU) ................................. 2011901892
Feb. 17, 2012 (AU) ................................. 2012000594

(51) Int. Cl.
*H02K 31/02* (2006.01)
*H02K 1/06* (2006.01)
(Continued)

(52) U.S. Cl.
CPC ................. *H02K 1/06* (2013.01); *H02K 3/04* (2013.01); *H02K 7/116* (2013.01); *H02K 13/04* (2013.01);
(Continued)

(58) Field of Classification Search
CPC ............ H02K 1/06; H02K 3/04; H02K 13/04; H02K 31/02
See application file for complete search history.

(56) References Cited

U.S. PATENT DOCUMENTS 1,255,838 A    2/1918 Knoll
3,579,005 A    5/1971 Noble
(Continued)

FOREIGN PATENT DOCUMENTS

GB    1181821 A    2/1970
JP    52-151805 A    12/1977
(Continued)

OTHER PUBLICATIONS

Doyle et al., "A 300 KW Superconductive DC Ship Drive with Liquid Metal Current Collectors", Marine Engineers Review, Apr. 1985, pp. 10-12.
(Continued)

*Primary Examiner* — Dang Le
(74) *Attorney, Agent, or Firm* — Morrison & Foerster LLP

(57) ABSTRACT

Various configurations of an electrometric turbine are discussed. In one possible arrangement the turbine is a radial drum type turbine and includes a pair of opposing magnetic assemblies with drum positioned therebetween. Each of the magnetic assemblies includes a pair of coils an outer coil and an inner coil. The coils are arranged concentrically about the axis of rotation of the drum, i.e. the coils are co-axial with the rotational axis of the drum. The drum includes at least
(Continued)

one conductive element coupled to current transfer mechanisms which pass current across the drum. As current is passed across the conductive layer of the drum torque is generated on the drum. The torque is transferred to the output shaft which passes through the drum and magnetic elements.

15 Claims, 61 Drawing Sheets

(51) Int. Cl.
    *H02K 55/06*      (2006.01)
    *H02K 3/04*      (2006.01)
    *H02K 7/116*      (2006.01)
    *H02K 13/04*      (2006.01)

(52) U.S. Cl.
    CPC ............ *H02K 31/02* (2013.01); *H02K 55/06* (2013.01); *Y02E 40/627* (2013.01)

(56) References Cited

U.S. PATENT DOCUMENTS

| | | | |
|---|---|---|---|
| 3,648,088 A | | 3/1972 | Wilkin et al. |
| 4,024,422 A | | 5/1977 | Gill |
| 4,710,665 A | * | 12/1987 | Kilgore ................. H02K 31/02 310/178 |
| 5,032,748 A | * | 7/1991 | Sakuraba ............... H02K 31/02 310/178 |
| 5,032,752 A | * | 7/1991 | McKee .................. B23K 26/00 219/121.14 |
| 6,066,906 A | * | 5/2000 | Kalsi ...................... H02K 55/02 310/112 |
| 6,822,361 B1 | * | 11/2004 | Roschin ................. H02K 31/00 310/114 |
| 2005/0077795 A1 | | 4/2005 | Piec et al. |
| 2006/0049711 A1 | | 3/2006 | Morozov et al. |
| 2008/0048513 A1 | * | 2/2008 | Wilsdorf ............... H02K 31/00 310/74 |
| 2010/0090556 A1 | * | 4/2010 | Filatov .................. F16C 32/048 310/178 |

FOREIGN PATENT DOCUMENTS

| | | |
|---|---|---|
| JP | 53-55719 A | 5/1978 |
| JP | 53-155009 U | 12/1978 |
| JP | 55-122469 A | 9/1980 |
| JP | 60-187252 A | 9/1985 |
| JP | 62-178150 A | 8/1987 |
| JP | 1-16059 Y2 | 5/1989 |
| JP | 2-107278 U | 8/1990 |
| JP | 02-261047 A | 10/1990 |
| JP | 4-68854 B2 | 11/1992 |
| JP | 4-68855 B2 | 11/1992 |
| JP | 7-15936 A | 1/1995 |
| JP | 1131614 A | 2/1999 |
| JP | 2000-12325 A | 1/2000 |
| JP | 2007-227771 A | 9/2007 |
| JP | 4121083 B2 | 7/2008 |
| JP | 5038015 B2 | 10/2012 |
| WO | 95/19063 A1 | 7/1995 |

OTHER PUBLICATIONS

Extended European Search Report (includes Supplementary European Search Report and Search Opinion) received for European Patent Application No. 12784898.4, mailed on Dec. 9, 2014, 7 pages.
International Preliminary Report on Patentability received for PCT Patent Application No. PCT/AU2012/000346, completed on Sep. 3, 2013, 3 pages.
International Search Report and Written Opinion received for PCT Patent Application No. PCT/AU2012/000346, mailed on Jul. 3, 2012, 9 pages.
Office Action received for Japanese Patent Application No. 2014-510610, mailed on May 10, 2016, 10 pages (5 pages of English Translation and 5 pages of Official Copy).
Office Action received for Chinese Patent Application No. 201280023960.9, issued on Dec. 21, 2016, 18 pages (9 pages of English Translation and 9 pages of Official Copy).
Office Action received for Japanese Patent Application No. 2014-510610, dated on Jan. 17, 2017, 9 pages (4 pages of English translation and 5 pages of Official Copy).
Office Action received for Japanese Patent Application No. 2014-546239, dated on Dec. 20, 2016, 6 pages (English Translation only).

* cited by examiner

LOW SPEED ELECTROMAGNETIC TURBINE

CROSS REFERENCE TO RELATED APPLICATIONS

This application is a Continuation patent application of PCT/AU2012/000346 filed Apr. 5, 2011, which claims priority to Australian Application No. 2011901892 filed May 17, 2011, and Australian Application No. 2012900594 filed Feb. 17, 2012, the contents of which are hereby incorporated by reference in the present disclosure in their entireties.

BACKGROUND OF THE INVENTION

Field of the Invention

The present invention in general relates to an apparatus for the generation of electro-mechanical work. In particular although not exclusively the present invention relates to electromagnetic turbines.

Discussion of the Background Art

It is a well understood aspect of electrometric theory that as current passes through a simple bar conductor, it induces a magnetic field perpendicular to the direction of current flow. As a result of the induced magnetic field, each of the moving charges comprising the current, experiences a force. The force exerted on each of the moving charges generates torque. It is this principle that underpins devices such as electric motors and generators.

Most typical DC motors consist of three main components namely a stator, armature/rotor and commutator. The stator typically provides a magnetic field which interacts with the field induced in the armature to create motion. The commutator acts to reverse the current flowing in the armature every half revolution thereby reversing the field in the armature to maintain its rotation within the field in the one direction. A DC motor in its simplest form can be described by the following three relationships:

$$e_a = K\Phi\omega$$

$$V = e_a + R_a i_a$$

$$T = K\Phi i_a$$

Where $e_a$ is the back emf, V the voltage applied to the motor, T the torque, K the motor constant, $\Phi$ the magnetic flux, $\omega$ the rotational speed of the motor, $R_a$ the armature resistance and $i_a$ the armature current.

The magnetic field in a typical motor is stationary (on the stator) and is created by permanent magnets or by coils. As current is applied to the armature/rotor the force on each conductor in the armature is given by $F=ia\times B$. Back emf is generated due to a relative rate of flux change as a result of the conductors within the armature rotating through the stationary field. The armature voltage loop therefore contains the back emf plus the resistive losses in the windings. Thus speed control of the DC motor is primarily through the voltage V applied to the armature while torque scales with the product of magnetic flux and current.

Thus in order to maximise torque in a DC motor one would presume that it is simply a matter of increasing either the magnetic field or the current supplied. In practice, however, there are limitations. For instance the size of the magnetic field which can be generated via permanent magnets is limited by a number of factors. In order to produce a significantly large field from a permanent magnet the physical size of the magnet is relatively large (e.g. a 230 mm N35 magnet is capable of producing a field of a few Kilogauss (kG)). Significantly larger fields can be produced utilising a plurality of magnets the size and number of magnets again adds to the overall size and weight of the system. Both size and weight of the motor are critical design considerations in applications such as electric propulsion systems. Generation of larger magnetic fields is possible utilising standard wire coils but the size, weight and heating effects make the use of standard coils impractical.

Another factor which has an effect on torque that needs consideration is the production of drag caused by eddy currents created within the armature/rotor. Eddy currents occur where there is a temporal variation in the magnetic field, a change in the magnetic field through a conductor or change due to the relative motion of a source of magnetic field and a conducting material. The eddy currents induce magnetic fields that opposes the change of the original magnetic field per Lenz's law, causing repulsive or drag forces between the conductor and the magnet. The power loss (P) caused by eddy currents for the case of a simple conductor assuming a uniform a material and field, and neglecting skin effect can be calculated by:

$$P = \frac{\pi^2 B_p^2 d^2 f^2}{12\rho D}$$

Where $B_p$ is peak flux density, d—thickness or diameter of the wire, $\rho$—resistivity, $\sigma$—electrical conductivity, $\mu$ magnetic permeability, f frequency (change in field) and penetration depth (D).

As can be seen from the above equation as the magnetic field increases the size and effects of eddy currents increase i.e. the higher the magnetic field the greater the drag produced as a result of eddy currents. In addition to the field strength the resistivity of and thickness of the conductive elements in the armature are also a factor. Selection of the material of the conductive elements in the armature can greatly affect the amount of current that can be applied to the armature.

In light of the foregoing it would be advantageous to provide an apparatus and system for the generation of electro-mechanical work which is capable of operating with relatively high strength magnetic fields and which ameliorates at least some of the aforementioned deficiencies of the prior art.

SUMMARY OF THE INVENTION

Disclosure of the Invention

Throughout the specification it is to be understood that the term turbine is, used to refer to a structure which includes one or more rotors which produce mechanical work responsive to exposure to a substantially uniform field.

Accordingly in one aspect of the present invention there is provided a turbine, said turbine including:
  a pair of magnetic elements arranged in repulsion;
  a drum assembly positioned between the magnetic elements the drum assembly including a plurality of conductive elements disposed about the drum wherein the conductive elements are connected to form an electrical circuit through the drum; and
  whereon application of current through the electrical circuit causes rotation of the drum.

In another aspect of the present invention there is provided a turbine, said turbine including:
- a pair of magnetic elements arranged in repulsion;
- a plurality of drum assemblies positioned between the magnetic elements, each drum assembly including a plurality of conductive elements disposed about the drum wherein the conductive elements are connected to form an electrical circuit through each drum and the wherein the drums are electrically coupled together to form a current path through the turbine; and
- whereon application of current through the current path causes the drum assemblies to rotate in unison.

Preferably the drum(s) are mounted relative to and typically within a support adjacent the magnetic elements. Suitably the drum is mounted within the support via the use of a shaft. The shaft may be mounted within the drum such that it runs substantially co-axial with the longitudinal axis of the drum(s).

Suitably the conductive elements are electrically isolated and insulated from each other to prevent a short circuit or parallel current flow. The isolation between of the conductive elements may be provided by a plurality of non-conductive spacing elements. Suitably the spacing elements are positioned between each conductive element about the outer circumference and the periphery of the central aperture of the annular disc.

The conductive elements may be substantially "I" shaped. The "I" shaped conductive elements may be disposed on the outer periphery of the drum electrically isolated' from one another. The "I" shaped conductive elements preferably have a cap portion and a base portion and an elongate body. The cap and base portions are typically arcuate, the cap and base portions of respective conductive elements forming a substantially circular collar. The elongate body of each conductive element typically extends parallel to the axis of rotation, thereby forming the drum.

The length of the conductive elements is less important than that they are of sufficient length to interact with the portion of the field that extends perpendicularly to the axis of rotation.

The conductive elements may have any cross-sectional shape.

The electrical circuit through the drum may be formed by connecting adjacent conductive elements via plurality of current transfer elements disposed around the outer periphery of the periphery of the drum. The current transfer elements may be connected together in series to ensure that current flow in each of the conductive elements flows in one direction along each conductive element within the drum.

Each of the current transfer elements may include a brush assembly coupled to a gearing assembly. Suitably, the gearing assembly co-operates with one or more gears disposed opposing ends of the drum. Suitably the gears may be electrically isolated from the conductive elements. The gear assembly may include a shaft which also carries a gear which meshes with at least one of the gears disposed on the drum. The shaft may also be connected to the roller such that when the drum begins to spin, the rotation caused by the meshing of the gears is translated through the shaft to the roller causing the roller to rotate in unison with the drum. Alternatively, the gear could be connected to the roller, both the roller and gear being supported on the shaft by bearings such that the motion of the gear directly drives the roller.

The brush assembly may include a conductive brush which is coupled to the brush of the preceding current transfer element in the electrical circuit, typically over the length of the drum to ensure that the current through the respective conductive elements is in the same direction. The brush could be a continuous metal fibre brush capable of providing a continuous current density of over 310 A/cm$^2$ and operating at speeds of 70-100 m/s with 5 cm of wear length over $2.5 \times 10^9$ meters of slide path.

The brush assembly may also include, a conductive roller in contact between the brush and the conductive elements. The brush assembly may also be provided with a mounting clip secured to the brush for attachment to a suitable mounting structure to maintain the position of the brush during operation of the rotor.

Suitably the magnetic elements are permanent magnets. The permanent magnets may have a diameter of 230 mm and is composed of N35 and is capable of producing a peak field of 3-5 KG. The magnet is axially magnetised with the rotor assembly being mounted adjacent to the magnet's north pole.

Alternatively, the magnetic elements could be constructed from coils composed of High Temperature Superconductor (HTS) tape. The coils may produce a magnetic field of between 1 T to 2 T for a supply current of between 160 A to 175 A. Suitably the coils may produce a magnetic field of between 2 t to 5.1 T for a supply current of between 180 A to 500 A depending on the configuration of the coils. Preferably the coils produce a peak field of between 1.3 T to 5.1 T. The coils may produce a magnetic of between 3 T to 5 T with a supply current of 300 A to 500 A.

The magnetic elements may have any configuration and are positioned with the polar axis substantially parallel and preferably coaxial with the axis of rotation of the drum. For this reason, the magnetic elements are preferably annular such that a mounting shaft (if present) can extend through both magnetic elements and out either end of the turbine although this configuration is not required.

In another aspect of the present invention there is provided a turbine, said turbine including:
- a pair of magnetic elements arranged in repulsion;
- at least a pair of drum assemblies positioned between the magnetic elements for rotation about a common axis, a first drum assembly including a plurality of conductive elements disposed about the drum and a second drum including a plurality of conductive elements disposed radiating from the axis, the conductive elements of the second drum located closer to the magnetic elements than those of the first drum;
- wherein the conductive elements are connected to form an electrical circuit through the drum and wherein the drums are electrically coupled together to form a current path through the turbine; and
- whereon application of current through the current path causes the drum assemblies to rotate.

BRIEF DETAILS OF THE DRAWINGS

In order that this invention may be more readily understood and put into practical effect, reference will now be made to the accompanying drawings, which illustrate preferred embodiments of the invention, and wherein.

DESCRIPTION OF EMBODIMENTS OF THE INVENTION

Figure 1:
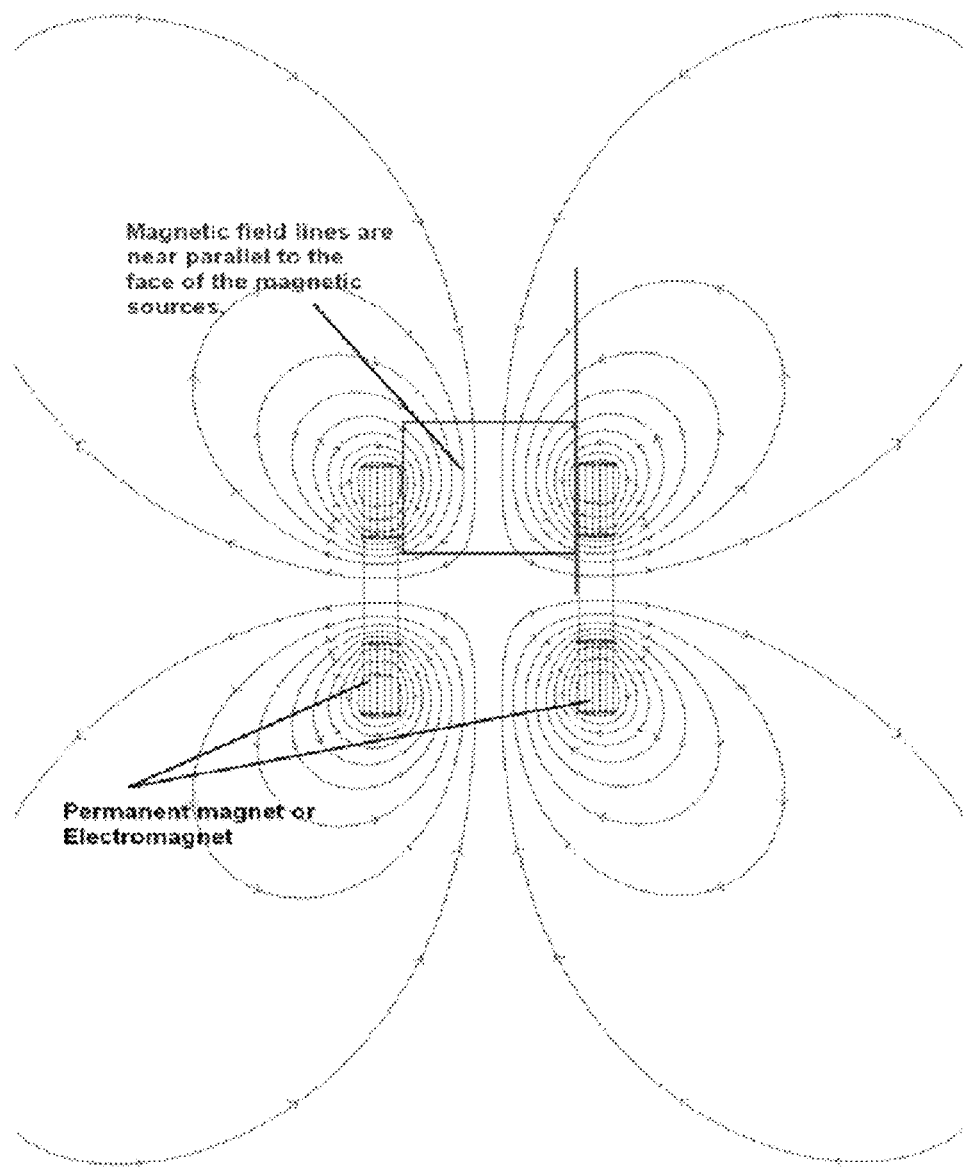
FIG. 1 is a schematic diagram depicting the interaction of the magnetic field between a pair of magnetic elements.

When two nearly identical magnetic fields are brought together in repulsion, the field lines compress and bend each other such that many of the field lines become parallel to the face of the source. For example, when two magnetic elements are placed side by side and are in repulsion, the magnetic field resembles that of the image shown in FIG. 1.

Figure 2:
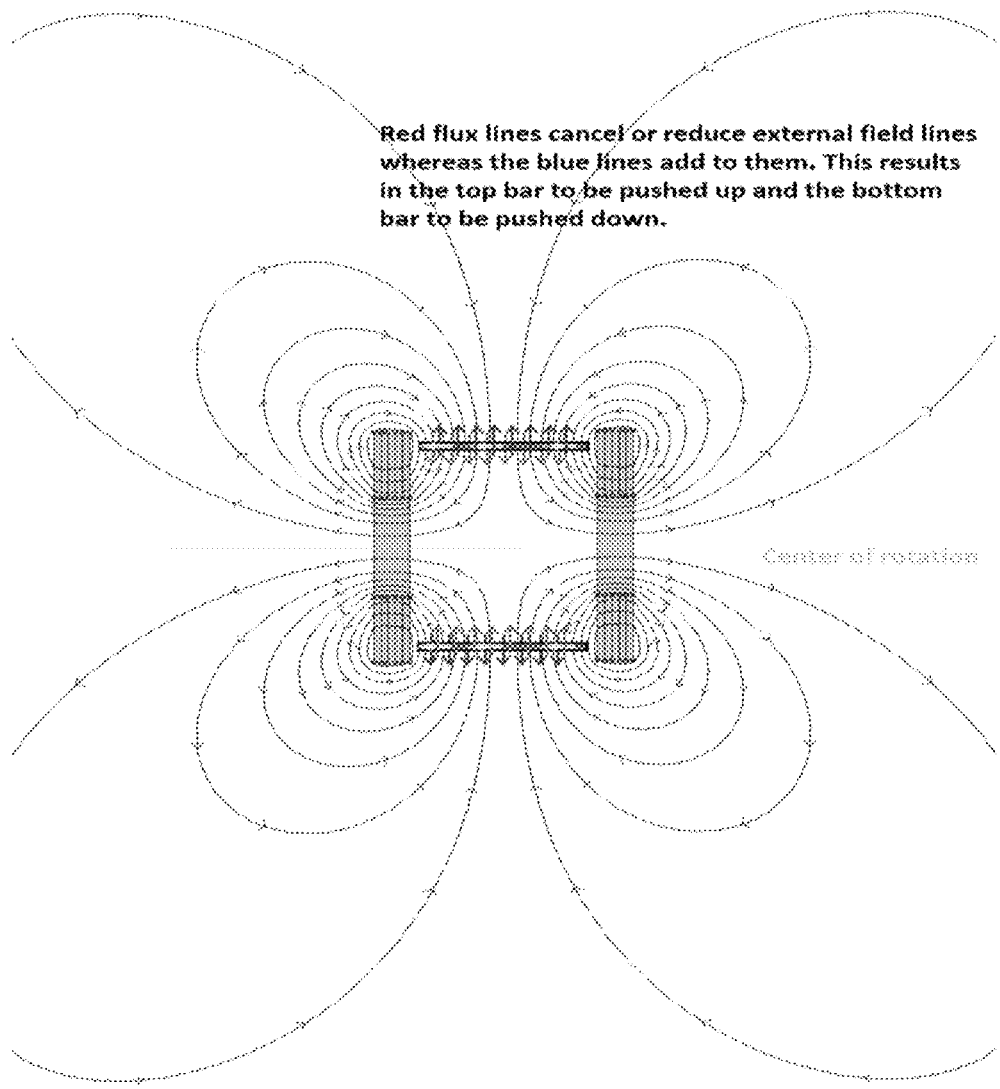
FIG. 2 is a schematic diagram depicting the interaction of the magnetic field between a pair of magnetic elements and the position of the conductive elements.

When an external magnetic field is present such that its own field lines are perpendicular to the magnetic field lines from the repelling magnets, a reaction, or drive will be created. As mentioned the field lines running parallel, or mainly parallel to the face of the electromagnet/magnet are the field regions of interest. Creating a reaction is most simply achieved by placing a conductor bar between the magnets or electromagnets and perpendicular to their respective faces. From FIG. 2 it can be seen that the field produced by a current carrying conductor will have a perpendicular plane. Imagine that an infinite number of planes of flux are centred radially about the centre of the electromagnet/magnet. Here a single two dimensional plane is shown. In reality the flux is in three dimensions. If we observe the planes from point of view of the face of the electromagnet/magnet, we see that the flux planes are centred about the centre of the electromagnet/magnet.

Figure 3:
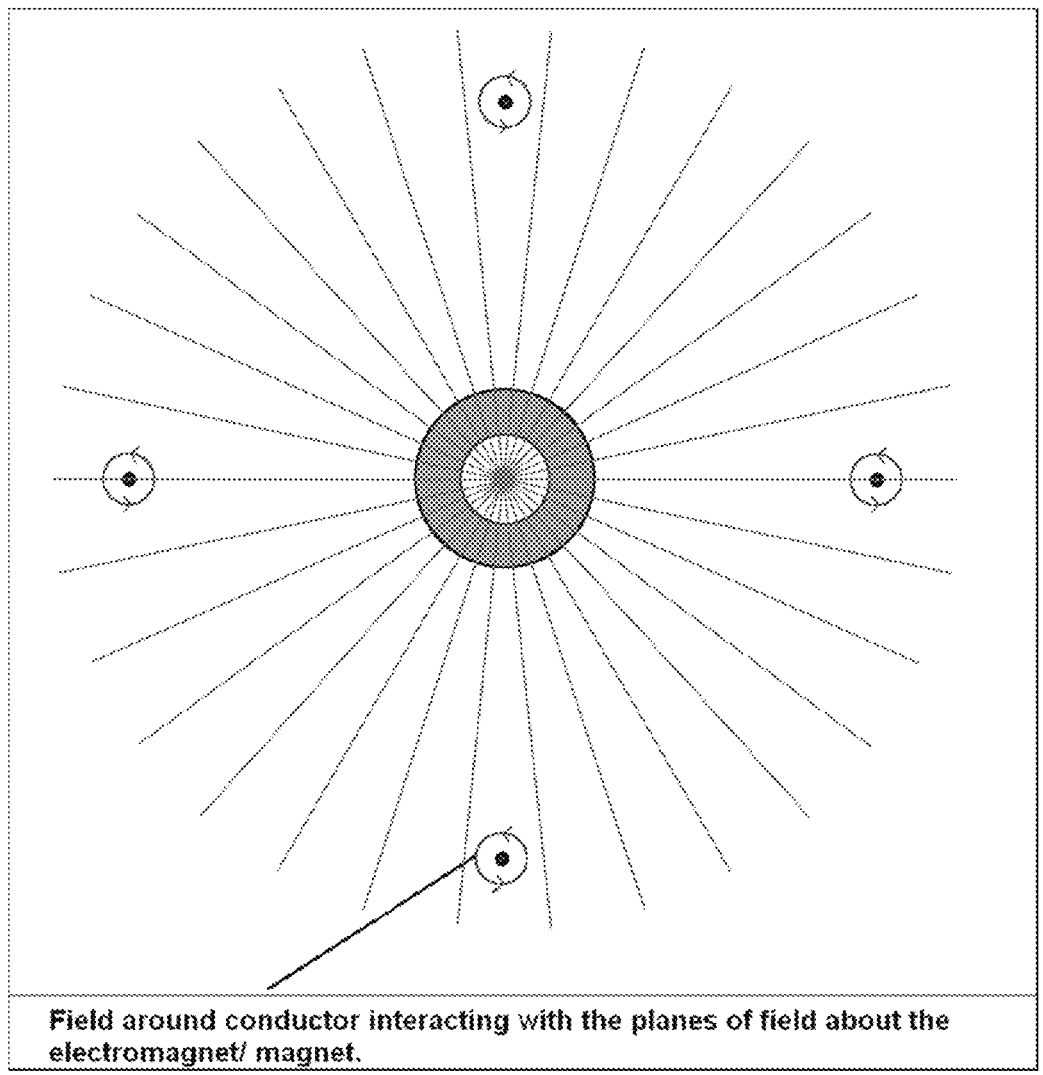
FIG. 3 is a schematic diagram depicting the positions of conductors within the magnetic field formed by the magnetic elements of FIGS. 1 and 2.

FIG. 3 shows four conductor bars positioned perpendicular to the face of the magnetic elements. The flux planes produced by the conductor bars are perpendicular to those produced by the magnetic elements. In order to utilise this field to produce electro-mechanical work the applicant has devised a number of conductive structures. Examples of these structures are shown in FIGS. 4 to 9 which are discussed in greater detail below.

Figure 4:
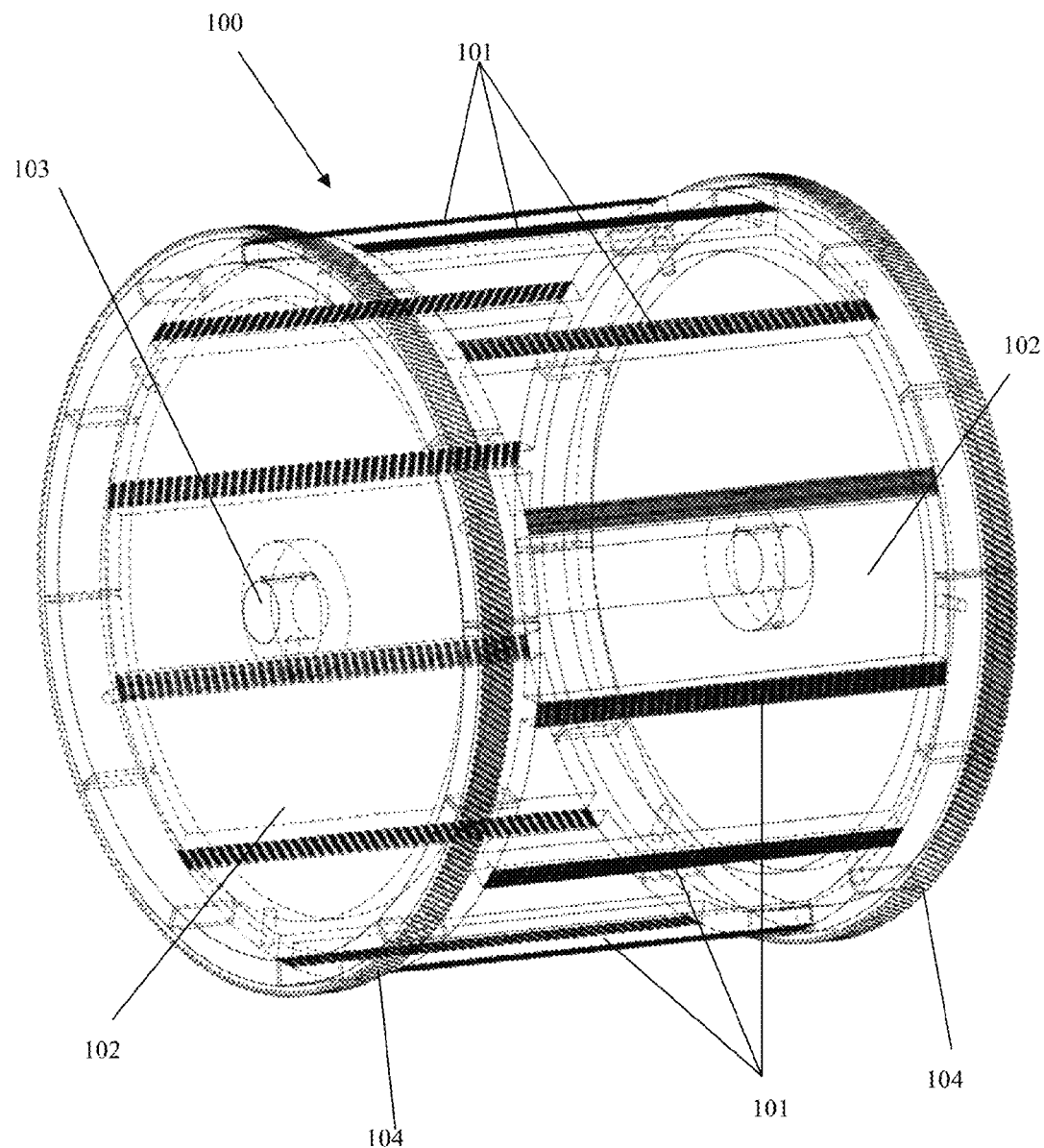
FIG. 4 is a schematic diagram depicting the arrangement of a drum assembly according to one embodiment of the invention.

With reference to FIG. 4 there is illustrated one possible configuration of a drum assembly 100 for use in a turbine according to one embodiment of the present invention. As shown the drum 100 includes a plurality of conductive members 101 positioned between end plates 102 and about the circumference of the drum 100. The drum may also be provided with a shaft 103 which is co-axial with the central axis of the drum. In the present example the end plates include helical gears 104 for engagement with one or more gears of the current transfer assemblies of the present invention which are discussed in greater detail below.

The conductor bars in this instance are electrically isolated and insulated from each other to prevent a short circuit or parallel current flow. In this particular example the conductive elements are substantially "I" shaped with the caps of the I being in abutting relation with the end plates 102. Each conductor bar can be made out of multiple strips of HTS tape side by side in parallel (in the case of the I the tape could be packed within the longitudinal body of the I). The tape surface should be orientated such that the surface of the tape is parallel to the magnetic field produced by the repelling elements of the turbine. That is, the tape will be oriented as if radiating from the axis of rotation of the drum. With such a construction the HTS tapes can be contained within a high conducting frame made out of pure copper or an alloy with suitably low electrical resistivity.

As noted above the conductive elements 101 must be isolated and insulated from one another, in the illustrated example this is accomplished by an air gap 105 being provided between each element. It will of course be appreciated by those of skill in the art that the separation between the elements in this instance must be large enough to prevent arcing across the gap. While in this case an air gap is utilised to provide the desired isolation and insulation it will be appreciated by those of skill in the art that an insulating material could be positioned between each element.

Figure 5:
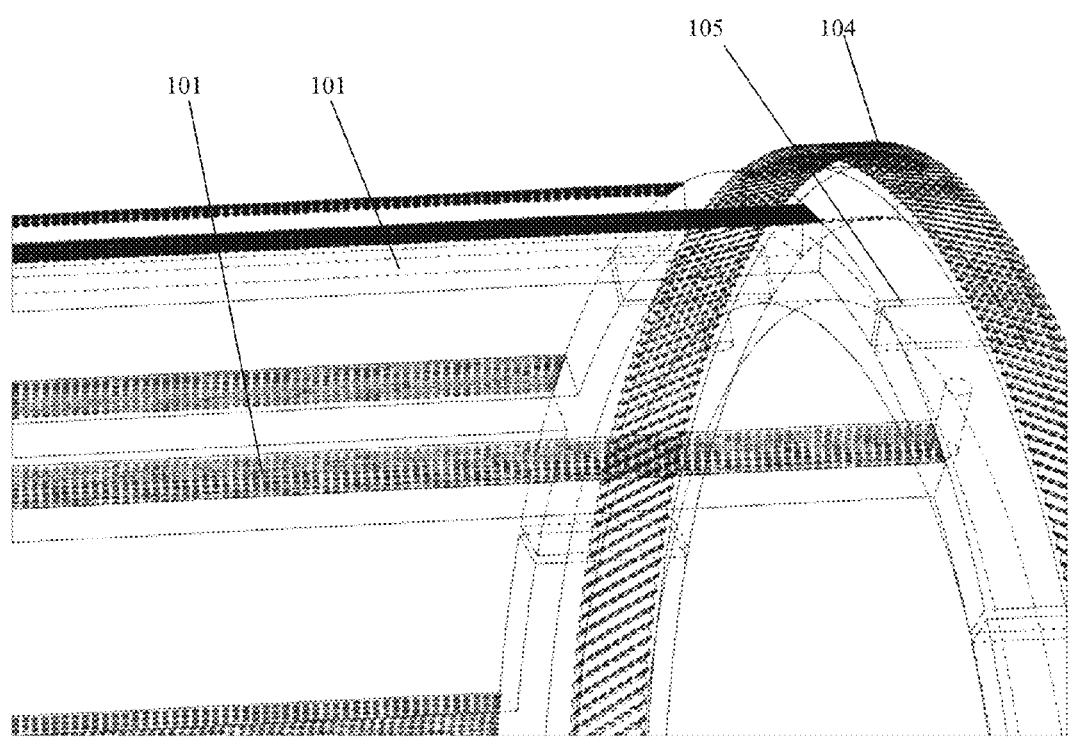
FIG. 5 is a schematic diagram depicting the arrangement of conductors of the drum assembly of FIG. 4.

FIG. 5 is a more detailed view of the arrangement of the conductive element 101 on the drum 100. As can be seen each of the caps of the I shaped beams forming the conductive elements is separated via air gap 105. The caps in this case are bonded to the end plate 102 adjacent gear 104. The longitudinal body of the I in this particular embodiment are packed with strips HTS tape arranged in parallel.

Figure 6:
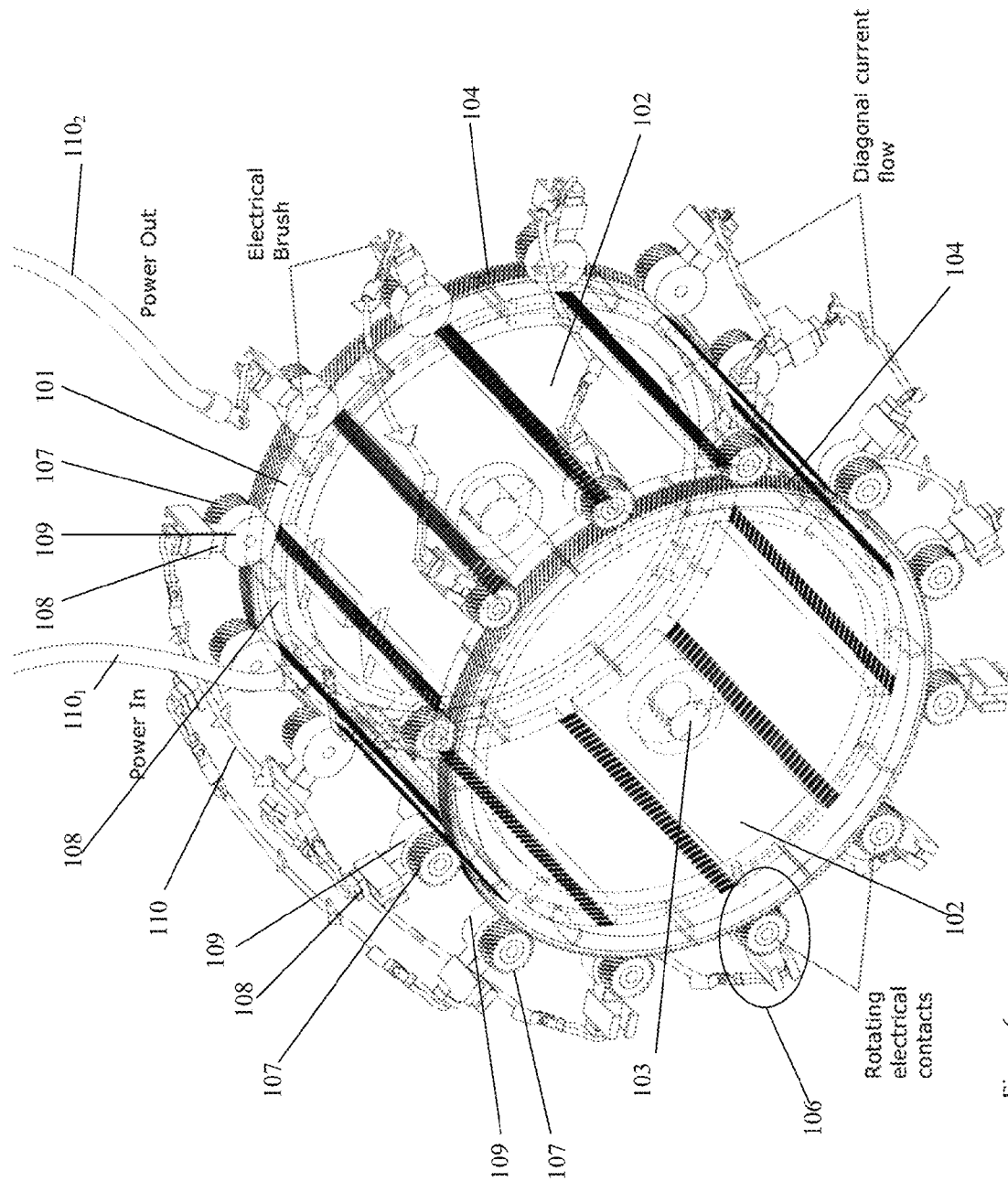
FIG. 6 is a schematic of drum assembly with current transfer assemblies mounted in situ.

As it will be appreciated by those of skill in the art in order for the drum assembly of FIGS. 4 and 5 to be utilised in an electromagnetic turbine according to the present invention they must be connected to form an electrical circuit to permit the passage of current through the turbine to produce torque responsive to the magnetic field produced by the turbines magnetic elements. FIG. 6 depicts one arrangement for electrically coupling adjacent conductive elements to form an electrical circuit through the drum assembly 100.

As the conductive elements will rotate with the drum due to the resultant torque, a moving or sliding electrical contact is required. One possible method is to supply current to the ends of the conductor bars through a rolling gear through the gear teeth or through a smooth contact area. The arrangement shown in FIG. 6 uses the latter. As shown a plurality of current transfer assemblies 106 are positioned about the periphery of the end plates 102. Each current transfer assembly includes a gear 107 which mates with gear 104 of the end plate 102. The current transfer assemblies in this case also include a brush 108 coupled to roller 109 which is connected to the gear 107. The brush 108 could be a continuous metal fibre brush of the type disclosed in U.S. Pat. No. 6,245,440 such brushes can provide continuous current densities of over 310 A/cm$^2$ and can be operated at speeds of 70 m/s with 5 cm of wear length over $2.5 \times 10^9$ meters of slide path.

Each of the current assemblies 106 are coupled to a current assembly at the opposing end of the drum either directly via a conductive element or via cables 110 interconnection. In the present example the current transfer assemblies are connected to form a series circuit. As current is applied through the primary feeder cable $110_1$ to the current transfer assembly 106, the current is the transferred across conductive element 101 to the next current transfer element 106 in the circuit. Current is then conducted from current transfer element 106 to next current transfer element 106 via cable 110. This continuous transfer of current between opposing current transfer elements 106 via the bridges form by the conductive elements 101 and the return cable linkages 110 and out through cable $110_2$ thereby completing the series circuit through the drum 100.

As current is applied through the roller 109 to conductive element 101, the drum beings to spin causing gear 104 to rotate, the rotation of gear 104 is translated through gear 107 to the roller 109 ensuring that the roller 109 rotates in unison with the rotor.

While the above discussion details the use of a series circuit through the drum it will of course be appreciated by those of skill in the art that the circuit through the drum could be a parallel circuit. Such an arrangement would simply require reconfiguration of the cable interconnection between the current transfer assemblies.

Figure 7:
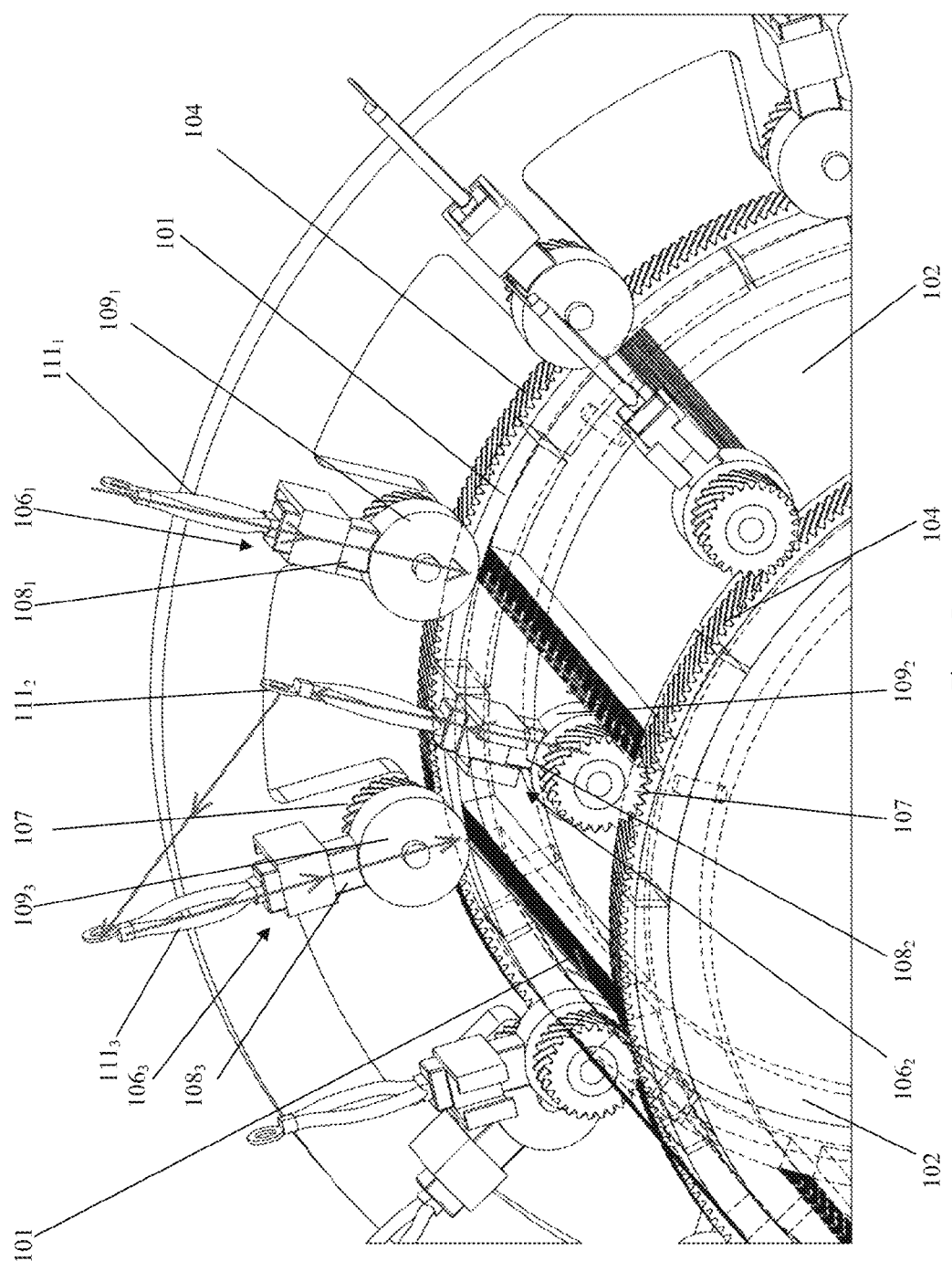
FIG. 7 is a schematic diagram depicting the current transfer path within the drum assembly of FIG. 6.

A more detailed view of the current transfer path through the drum 100 is shown in FIG. 7. As current is applied to the first current transfer assembly $106_1$ through cable tails 111 current is passed across brush $108_1$ to roller $109_1$ to the conductive element 101 which it is presently in contact with, the current flows across the conductive element 101 to the roller $109_2$ of transfer assembly $106_2$. Current from roller $109_2$ is picked up by brush $108_2$ and passes out through cable tails 111 across cable 110 (not shown) to current transfer assembly $106_3$ where it is passed to brush $108_3$ via cable tails 111. Brush $108_3$ in turn passes the current to roller $109_3$ where it is the conducted across the conductive element 101 which it presently contacts to current transfer element $106_4$. This process is then repeated across the remaining current transfer assemblies in the circuit until the circuit is complete.

As noted above each of the current transfer assemblies includes a gear 107 which meshes with gear 104 provided on the end plates 102. The gear 107 in this instance is provided to ensure that the roller 108 to which it is coupled rotates at the same surface speed as that of the drum during operation. It is important that the rotation of the roller 108 be matched to the rotation of the drum 100 as any mismatch in rotation can reduce current transfer efficiency. Additionally matching the surface speed of the roller and drum also reduce the potential for uneven wear which could lead to unbalancing of the system.

Figure 8:
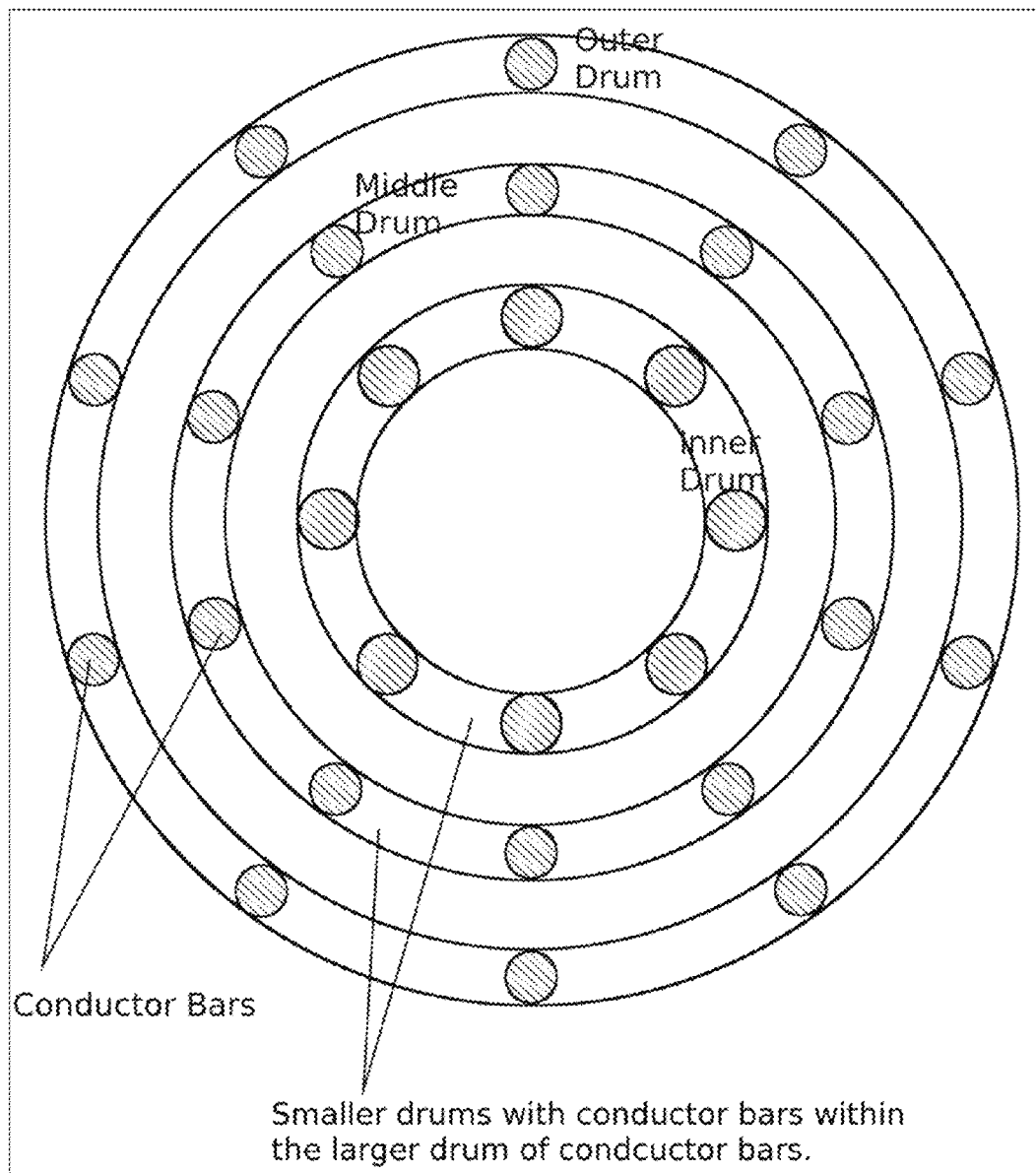
FIG. 8 is a schematic diagram of a drum assembly according to a further embodiment of the present invention.

FIG. 8 depicts another possible configuration of a drum assembly 100 for use in a turbine according to one embodiment of the present invention. In this particular example the drum assembly includes multiple drums 801, 802, 803 arranged concentrically. As shown each of the conductive sections 801, 802, 803 includes a plurality of conductive elements 101 (denoted by the black dots) spaced about the periphery of each conductive section.

Figure 9:
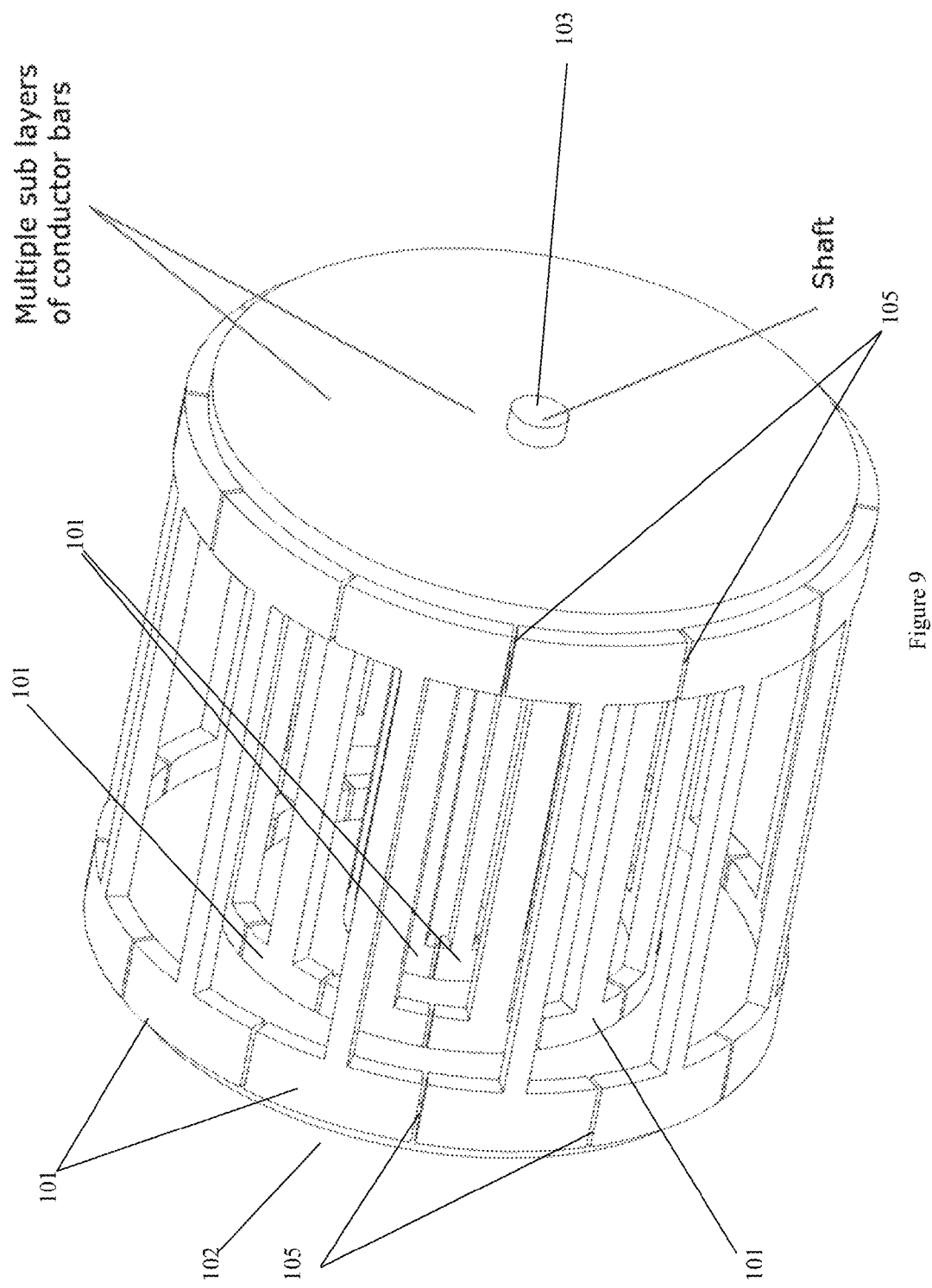
FIG. 9 is a detailed view of the drum assembly of FIG. 8.

FIG. 9 depicts the configuration of drum assembly of FIG. 8 in greater detail. As shown the drums 801, 802, 803 are arranged between end plates 102 and concentrically about the shaft 103. As in the case of the drum of FIG. 1 above each of the drums includes a plurality of conductive members 101 positioned between end plates 102 and about the circumference of the drum 100. Each of the conductive elements isolated and insulated from one another, by an air gap 105 being provided between each element. As in the above examples the conductive elements can be made out of multiple strips of HTS tape side by side in parallel (in the case of the I the tape could be packed within the longitudinal body of the I). The tape surface has to be orientated such that the surface of the tape is parallel to the magnetic field produced by the repelling elements of the turbine.

Current transfer across and between each of the conductive elements and the drums can again be accomplished via the use of current assemblies 106 as discussed above. In which case transfer of current between the drums 801, 802, 803 can be accomplished by connecting the last current transfer element 106 on one drum to the first current transfer element of the next drum.

Figure 10:
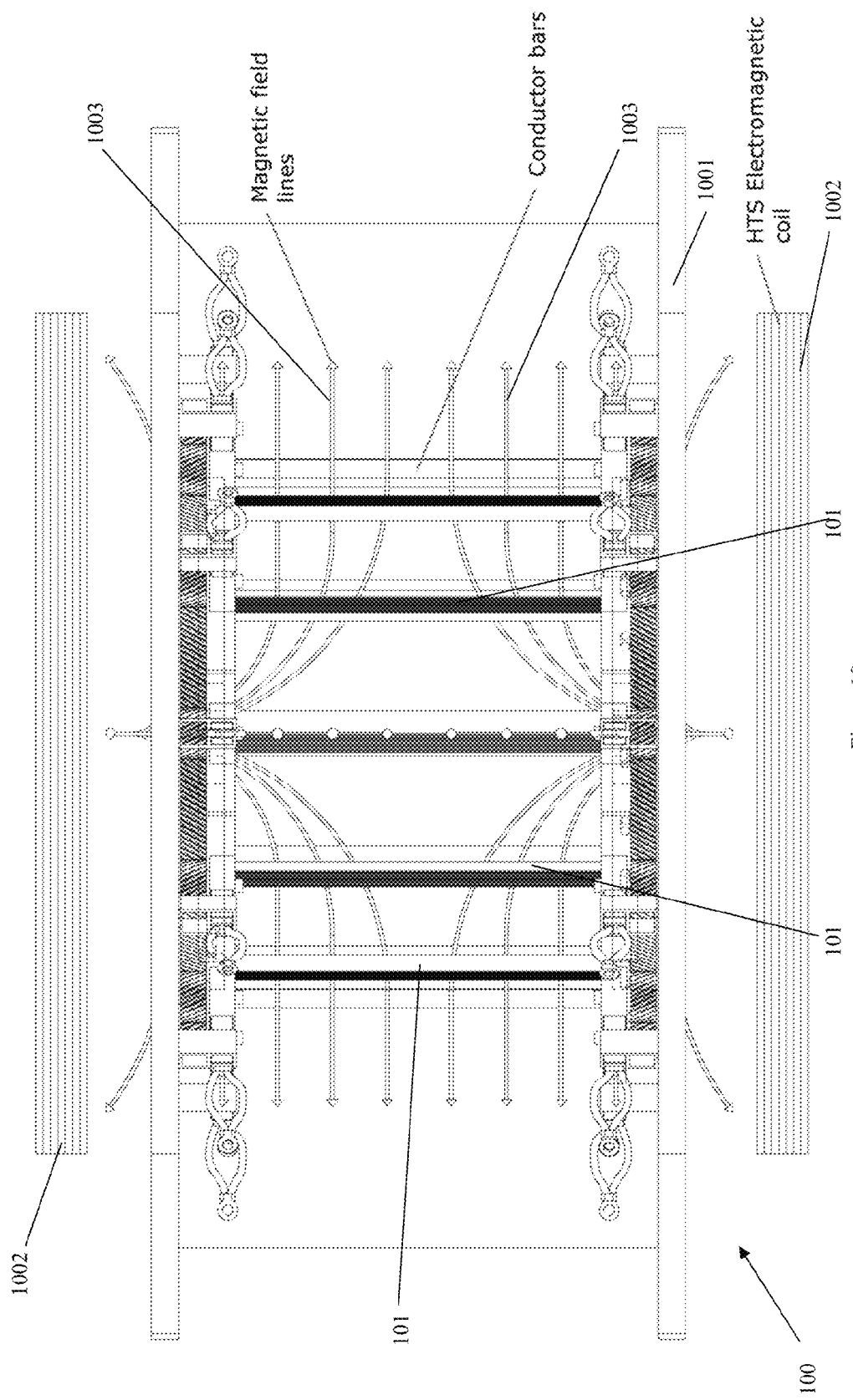
FIG. 10 is a schematic diagram of a turbine according to one embodiment of the present invention.

FIG. 10 depicts the arrangement of a turbine according to one embodiment of the present invention. As shown the turbine includes a support 1001 for drum 100 and magnetic elements 1002. The magnetic elements 1002 are arranged in repulsion resulting in a substantially linear field depicted by field lines 1003 through the support and such that field is substantially perpendicular to the to the conductive elements 101.

Figure 11:
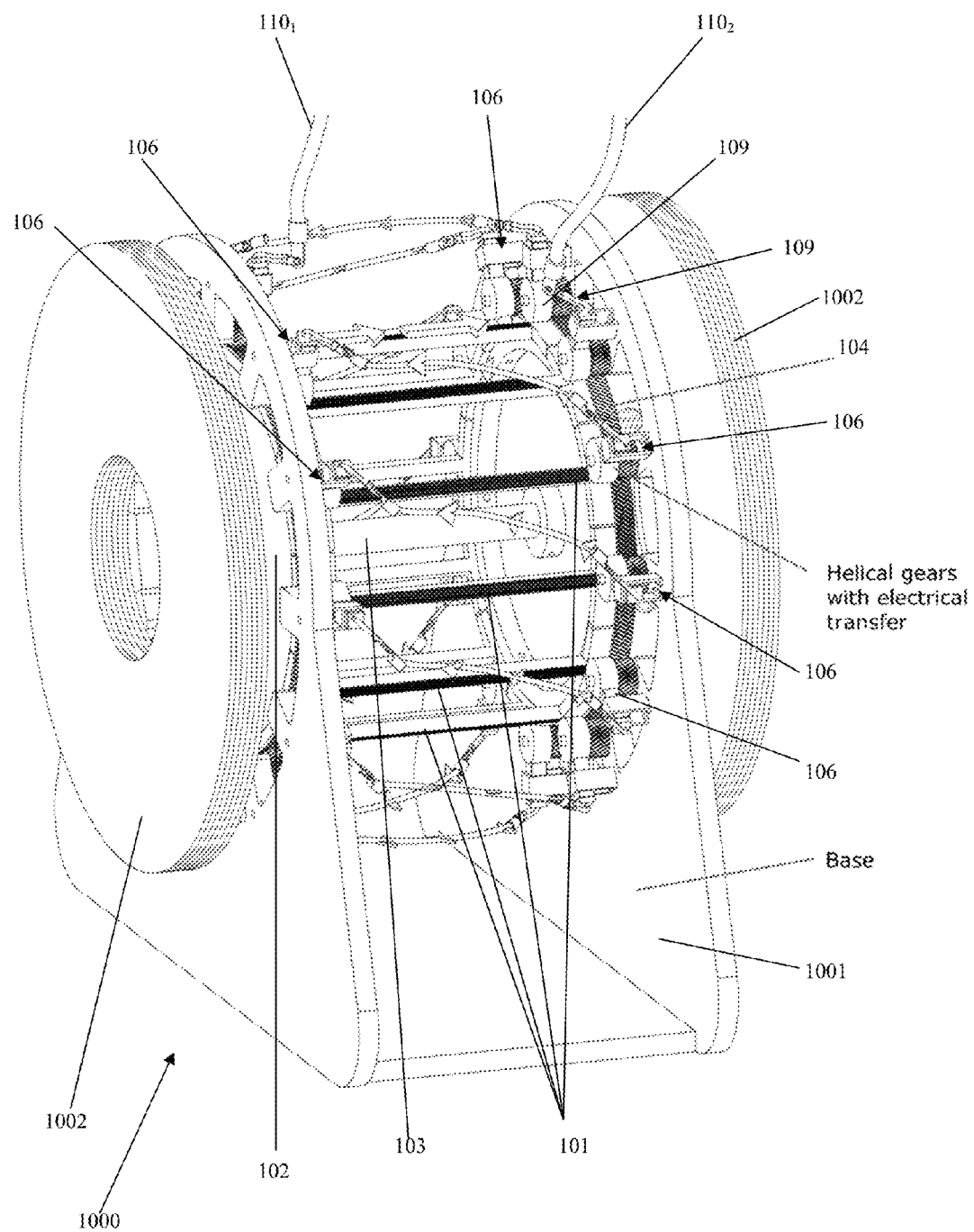
FIG. 11 is a detailed view of the turbine of FIG. 10.

FIG. 11 depicts the arrangement of the support, drum and magnetic elements of the turbine FIG. 10 in greater detail. As shown the drum 100 is suspended within the support 1001 on shaft 103 with the end caps 102 and gears 104 being positioned adjacent the interior of the support 1001. In this case the current transfer assemblies 106 are coupled to the support 1001. In this case the rollers 109 are coupled to the support by shafts secured to the support. In addition brushes 108 are tied back to support by means of clips fitted to the brushes 108.

Figure 12:
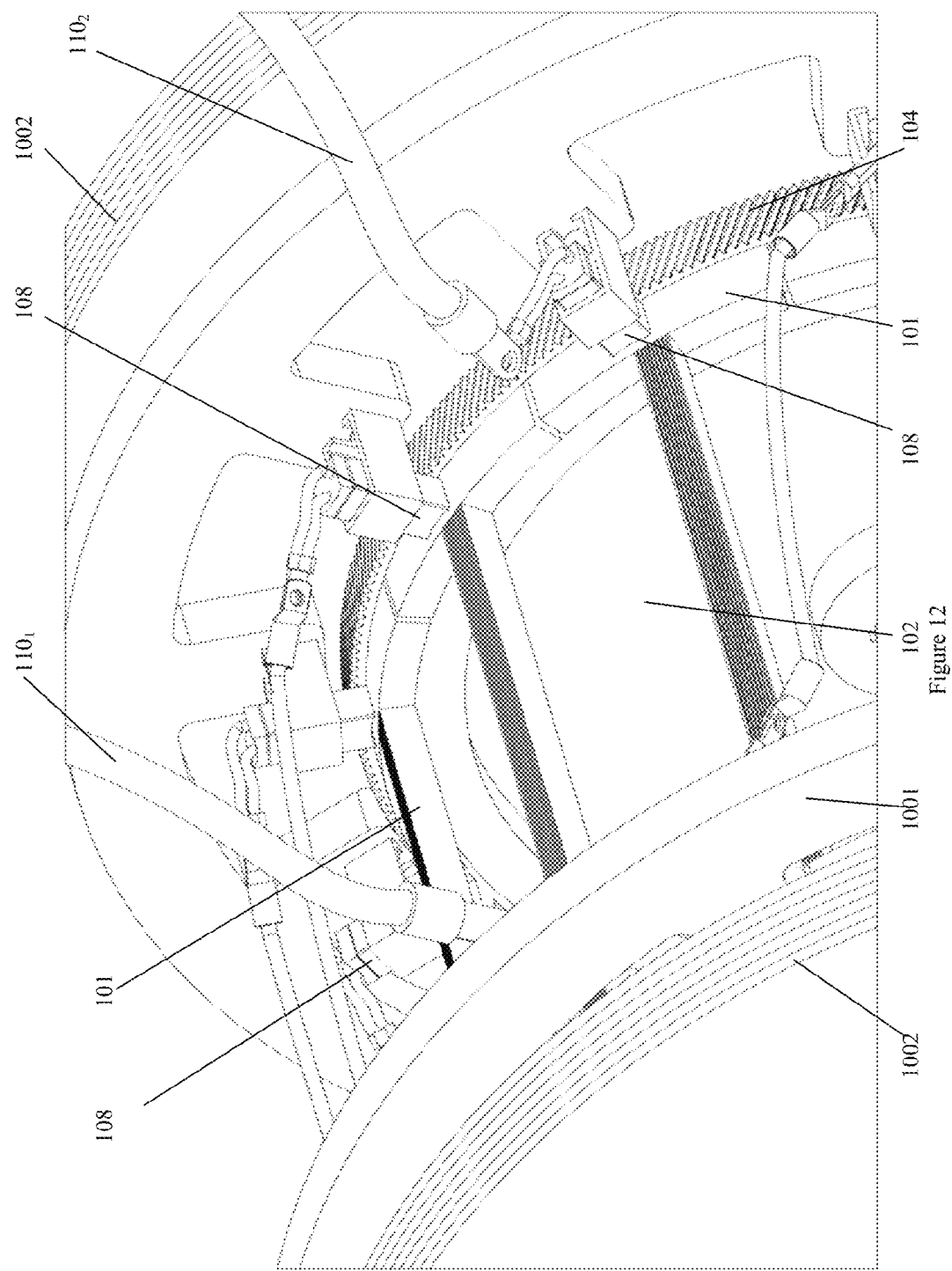
FIG. 12 is a schematic diagram of a turbine according to a further embodiment of the present invention.

FIG. 12 depicts a further embodiment of a turbine according to the present invention. The general construction of the turbine in this case is similar to that of FIGS. 10 and 11 discussed above. More specifically the turbine includes a drum 100 suspended within a support 1001 between a magnetic elements 1002. The difference between the arrangement of the turbine and FIG. 12 and that of FIGS. 10 and 11 is that the current transfer elements do not include a roller and gear rather current transfer to the conductive elements 101 is affected via a direct brush 108 contact.

The advantage of the above arrangements is that any number can be connected together on a central shaft. These stacked turbines can all be connected electrically in series, or each motor can be connected individually to a power supply, or even in parallel to a single power supply.

Figure 13:
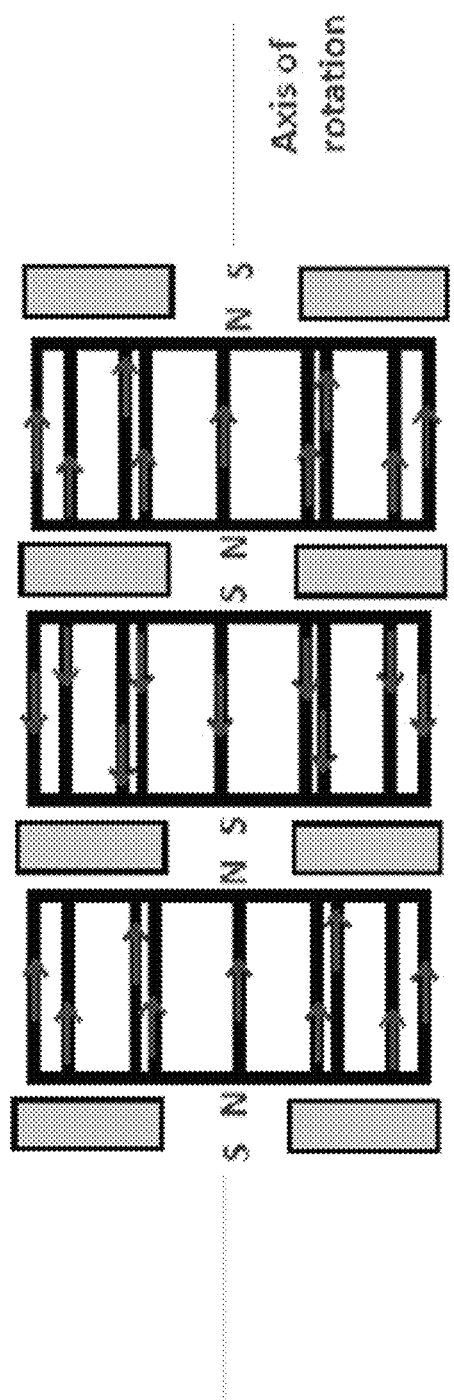
FIG. 13 is a schematic diagram depicted one arrangement of a series of turbines according to one embodiment of the invention.

When motors are stacked the external field has to be arranged such that the fields within each respective motor are repelling. As such the current passed through the conductor bars of every second motor will need to be reversed such that all motors produce a torque in the same direction as shown in FIG. 13.

The magnetic elements in each of the above cases could be permanent magnets or electromagnets. At present permanent magnets have a size limitation of around 230 mm for cylindrical shaped magnets. Large thicknesses can be achieved however by stacking multiple magnets. At this size the highest grade of magnet material that can be used is N35. Future advances in manufacturing capacity means that these limitations are likely to be exceeded with time. Multiple pieces are not desired as it would cause an uneven radial field distribution. Furthermore permanent magnets have a finite peak field of 3-5 KGauss. In the example shown the magnetic elements are electromagnets formed from HTS tape. Such an electromagnet can be constructed to any size and when cryogenically cooled is capable of producing a very large field.

The dimensions of the models that have been used to date are for indicative purposes only. As mentioned above permanent magnets or superconducting electromagnets can be used to produce the static external field. Larger devices are anticipated to have a greater power density.

The current capacity will change depending on whether the preferred option of HTS driving bars are used or whether these are constructed from copper or other normal conducting material. In the case of copper the current density will be determined by a combination of the conductivity of the copper grade used, the amount of area available (determining the cross sectional area of the copper driving bus bars) and the capacity for heat removal of the resistive losses.

Figure 14:
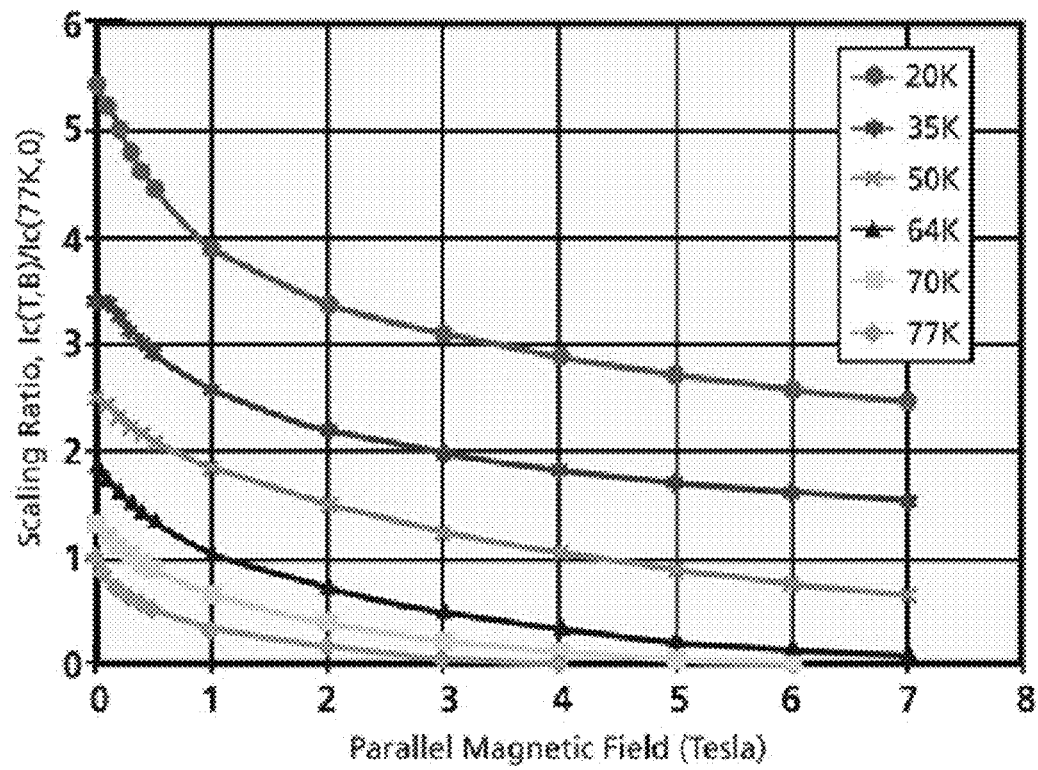
FIG. 14 is a plot different scaling ratios at different temperature for HTS tape exposed to different parallel magnetic fields.

In the preferred embodiment where HTS driving bars are employed, the current capacity is less dependent on the available space but on the grade of HTS wire used, the temperature of operation (below 77K) and the ability to carefully orient the HTS wire so as to avoid exposing the wire to the more detrimental perpendicular magnetic field. The differing effects of parallel and perpendicular field, in terms of HTS current de-rating discussed in greater detail below. FIG. 14 is a plot different scaling ratios at different temperature for HTS tape exposed to different parallel magnetic fields.

To determine the Ic of 12 mm wide tape at 64K when it is exposed to a parallel self field of 1.4 Tesla, the plot can be used as follow. Firstly we assume Ic at 0 Tesla external field and 77K of 100 amps. The 1.4 Tesla field at 64K gives a Scaling ratio on the Y axis of approximately 0.9. Hence 0.9×100=90 amps. This is for 4 mm wide tape, so for 12 mm wide tape the critical current, Ic will be 3 times greater, which gives a 270 Amps Ic. This indicates that the turbine body can be supplied with up to 270 amps of current to produce field far above 1.4 Tesla. For a 42 stack turbine body at 160 amps the peak field was just above 1.45 Tesla.

Figure 15:
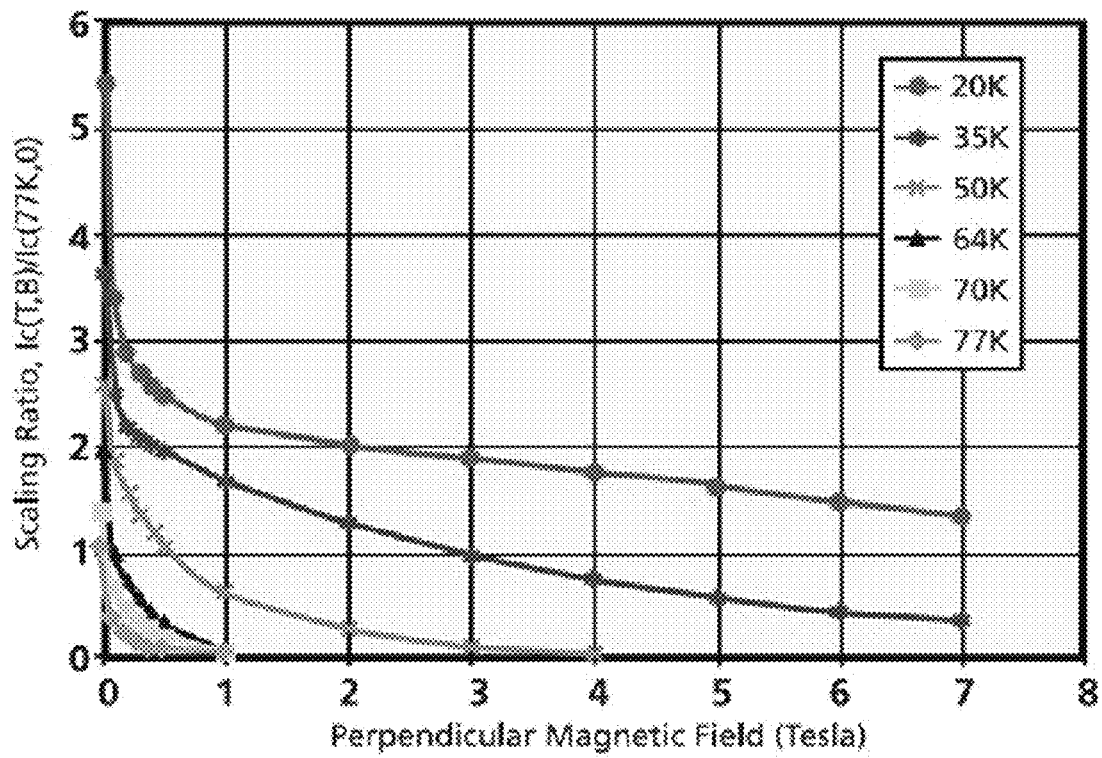
FIG. 15 is a plot different scaling ratios at different temperature for HTS tape exposed to different perpendicular magnetic fields.
Figure 16:
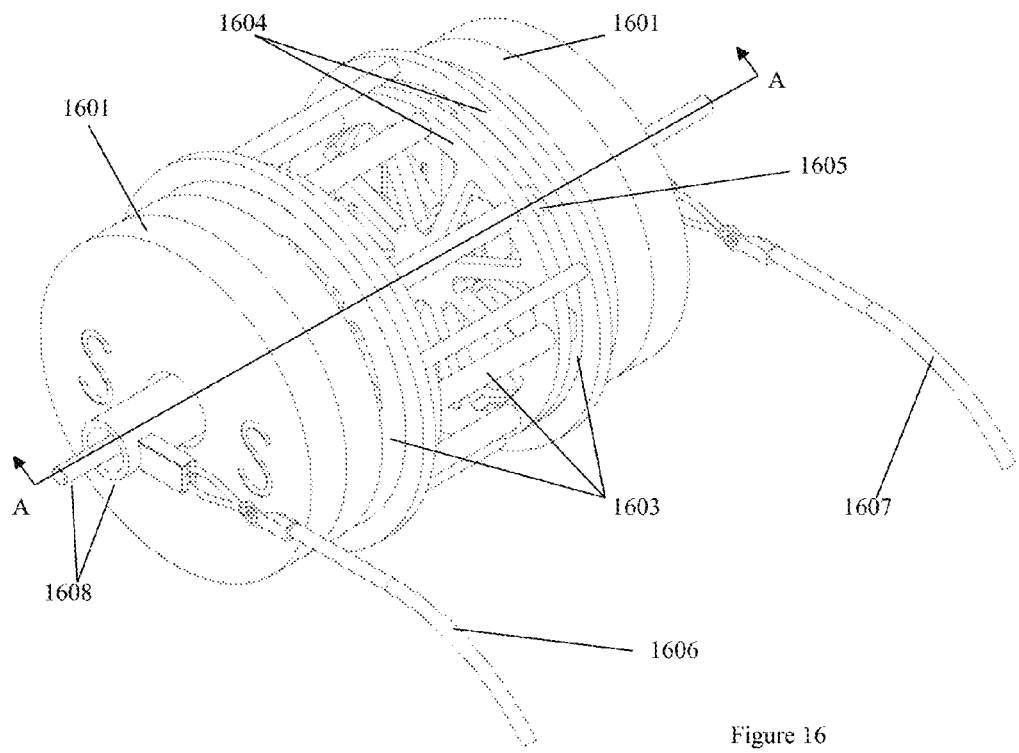
FIG. 16 is an isometric view of an alternative form of the present invention in a counter-rotating two drum embodiment.

Unfortunately HTS tapes do not have the same performance when exposed to perpendicular fields, as can be seen by the plot shown in FIG. 15. For example, when the external or self field is perpendicular at 64 Kelvin a scaling ratio of 0.9 will limit the allowable self or external field to approximately 0.2 Tesla, or 0.6 Tesla for a 12 mm wide tape.

In the preferred embodiment, the external electromagnetic coils, the current carrying conductor bars, and as much of the ancillary current delivery mechanism, including gears, current transmission surfaces and intermediate current connections, will either be constructed of HTS material or tape in their entirety or contain HTS material as a significant part of its make-up. The HTS components will require a cooling system to bring the system down to a sub 77K operating range. It is envisaged that the temperature of operation will be within the range of 10-77K as this represent the range over which significant improvements can be seen in the in field behaviour of the HTS tape but still allows the use of higher efficiency cryogenic systems to maintain the operating temperatures.

It would be further envisaged that most (if not all) of the components that make up the turbine would be encompassed within the cryogenic envelope as the performance of these components will either improve in the lower temperature environment, as is the case with any normal conducting paths or suffer no degradation in performance.

One area of loss that is of concern is that of the generation of eddy currents in parts of the turbine assembly. However these are expected to be minimal due to the uniform radial field distribution.

There are three proposed methods of counteracting any eddy current generation. The first is through a process similar to the idea of electro-dynamic suspension used in levitating trains. As superconductors have properties of diamagnetism they naturally expel field from within themselves. This property is exploited in levitating trains were the generation of a magnetic field within the coils that counters the eddy currents induced upon the coils is used to prevent additional drag on the drive mechanism of the train due to eddy creation.

The second method also involves winding HTS wire around the outer planetary gear interface, however in this method the wound coils are not a closed loop but they are connected to a power source in series. This will allow for current to be passed through the windings to generate a strong magnetic field which would expel most or all external field, hence reducing the eddy currents through the material.

The third method is to omit the use of a coil or permanent magnet to expel the external fields and to minimise the eddy currents through material selection. It is recommended that Titanium is used to construct the turbine drum, that is, the frame, the hub, and gears are all constructed out of Titanium. Titanium having superior mechanical properties allows for similar mechanical strength to be achieved with less material compared to other materials.

By decreasing material thicknesses along eddy current prone areas the generation of eddy currents will be further impeded. Titanium has 25 times more electrical resistance than copper (Titanium has 420 n Ohms/meter versus Copper with 16.78 n Ohms/meter). This higher resistance will make the free flow of eddy currents more difficult and hence smaller eddy currents will be generated within the surface of the turbine drum. The ideal solution still involves using superconducting material for the current carrying drive bars since the superconducting material possesses diamagnetic properties which expel eddy currents.

The Titanium components would be coated or plated with a conducting surface such as copper or silver specifically to aid conduction between gear interfaces or other electromechanical interfaces. Aside from Titanium any other material that has suitable mechanical properties and low electrical conductivity can be used.

Alternatively using thinner sections or laminating the materials reduces the d component reducing the path width that the eddy currents can circulate about. Additionally, sections that do not normally carry current can be made from material that have a higher resistivity, which opposes the generation of circulating current through additional resistance.

For superconducting elements the issue of eddy currents is governed by another effect. An interesting property of superconductors is the fact that they exhibit diamagnetism. That is, when cooled to below the critical temperature field that was previously able to pass through the material, in it normal conducting state, is expelled, from within the material. The fact that the field cannot pass through the field is responsible for the levitating behaviour seen in superconducting sample. It also means that eddy currents cannot form within the superconducting material.

An alternative arrangement of a pair of drums is provided in FIGS. 16 to 25 which show a turbine with a pair of counter-rotating drums. As with previously described embodiments, the turbine includes a pair of magnetic elements 1601 arranged in repulsion. This embodiment takes advantage of conductive elements 1603, non-conductive elements 1604 and conductive brushes 1605 to form a current pathway through the turbine from a current in lead 1606 and a current out lead 1607. The respective drums rotate about shafts 1608.

The turbine also includes a pair of drum assemblies positioned between the magnetic elements for rotation about a common axis. A first drum assembly (inner drum), illustrated best in FIG. 19, includes a plurality of conductive elements 1602 disposed about the drum. The conductive elements 1602 are located substantially parallel to the axis of rotation of the drum and are provided in a central region of the turbine. The conductive elements 1602 of this drum are mounted at either end to a non-conductive rotor body 1609 which includes an annular outer portion 1610, an annular mounting collar 1611 and a plurality of arms 1612 radiating between the annular mounting collar 1611 and the annular outer portion 1610, all of which are non-conductive.

Each of the conductive elements 1602 is mounted to an inner face (rather than the rim) of the annular outer portion 1610. A conductive portion, typically a conductive brush 1605 or similar is provided on an outer face of the annular outer portion in conductive contact with either end of the conductive elements 1602. The conductive portions of each conductive element are spaced from one another.

The inner drum is preferably mounted to a first shaft 1613 for rotation.

Figure 18:
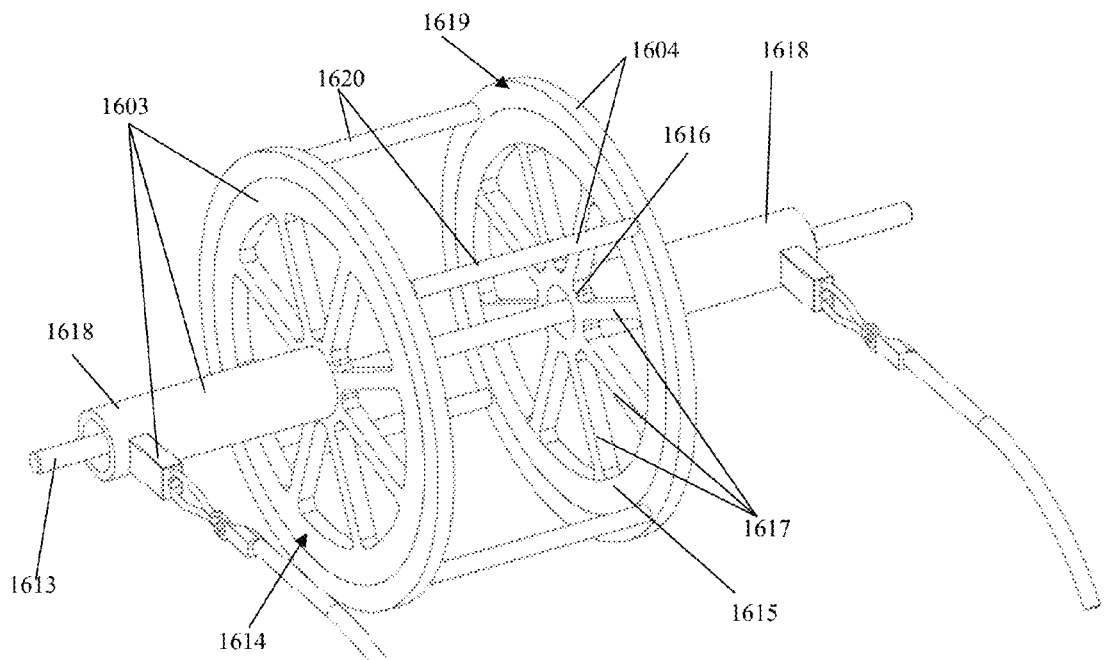
FIG. 18 is an isometric view of a second or outer drum of the embodiment illustrated in FIG. 16.
Figure 19:
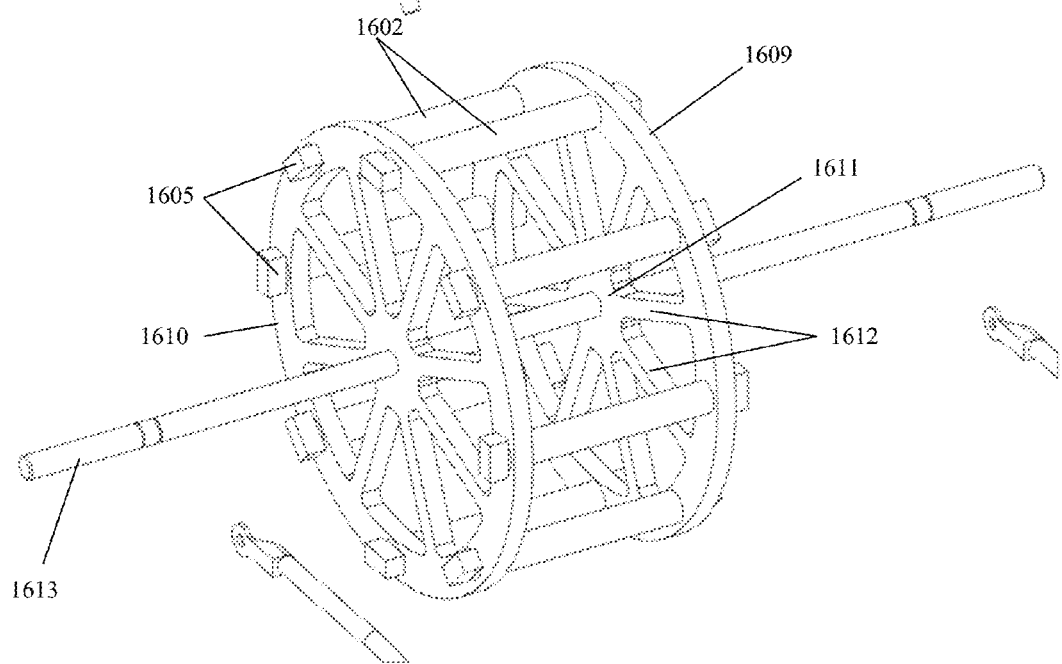
FIG. 19 is an isometric view of a first or inner drum of the embodiment illustrated in FIG. 16.

A second drum illustrated in FIG. 18, includes a plurality of conductive elements disposed radiating from the axis, the conductive elements of the second drum located closer to the magnetic elements than those of the first drum.

The conductive elements of the second drum are typically each configured as a rotor body 1614 which includes an annular outer portion 1615, an annular mounting collar 1616 and a plurality of arms 1617 radiating between the annular mounting collar 1616 and the annular outer portion 1615. Each of these portions are preferably conductive.

Normally, a pair of conductive rotor bodies 1614 is provided, one at either longitudinal end of the turbine, spaced from the respective magnetic elements 1601 and closer to the magnetic elements 1601 than the inner drum.

A non-conductive annular rim 1619 is typically provided radially outside the annular outer portion 1615 of each of the rotor bodies 1614 of the second drum. The non-conductive rims 1619 associated with each of the rotors 1614 will typically be linked together using one or more elongate non-conductive arms 1620 mounted to an inner face (rather than the rim) of the non-conductive annular rim 1619. Typically, a plurality of these elongate non-conductive arms 1620 are provided spaced about the second drum causing co-rotation of the rotors.

The outer drum is preferably mounted to a second shaft for rotation 1618. The second shaft is preferably a hollow shaft which rotates concentrically about the first shaft 1613.

Normally current through the turbine will flow through the second shaft only. The second shaft is normally a pair of shaft portions, one mounted to the annular mounting collar of each of the conductive rotor bodies, and extending outwardly from the second drum.

The conductive elements are connected to form an electrical circuit through the drum and the wherein the drums are electrically coupled together to form a current path through the turbine; and whereon application of current through the current path causes the drum assemblies to rotate.

Figure 17:
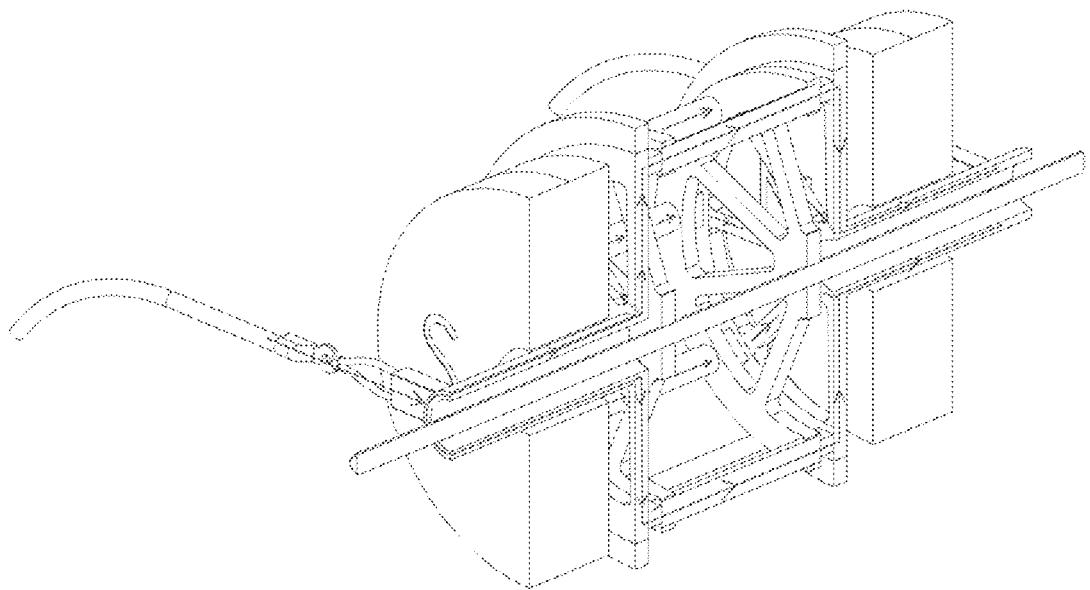
FIG. 17 is a sectional view of the embodiment illustrated in FIG. 16 along line A-A showing the current path through the drums.

Current will preferably be introduced to the turbine through a conductive connection of one of the shaft portions of the second shaft. The current then proceeds through the radially extending arms of the conductive rotor body to the annular outer portion. The annular outer portion of the respective rotors of the second drum are mounted to contact the conductive portions mounted on the outer face of the first drum. This provides a current path to the conductive elements of the first drum. The current traverses the length of the conductive elements of the first drum and exit the first drum through the reverse of the path explained above, through the other rotor of the second drum. This path is illustrated in FIG. 17 in particular.

Figure 20:
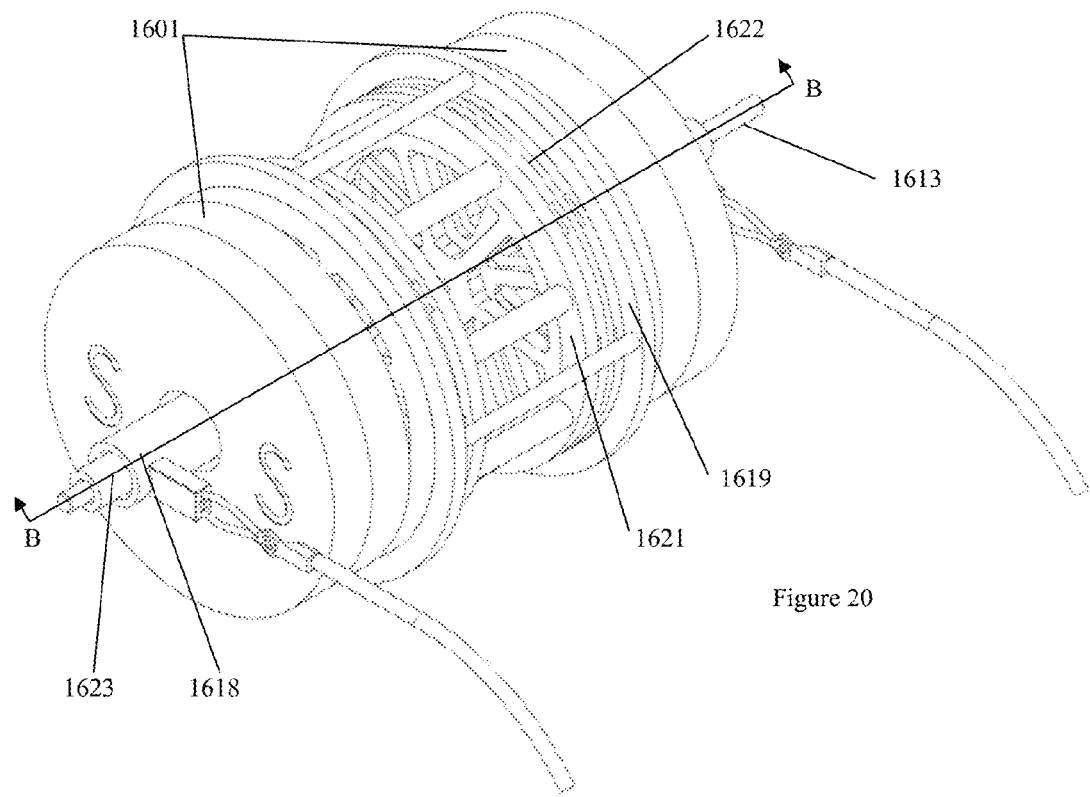
FIG. 20 is a an isometric view of an alternative form of the present invention in a counter-rotating two drum embodiment with fixed brush mounts.
Figure 21:
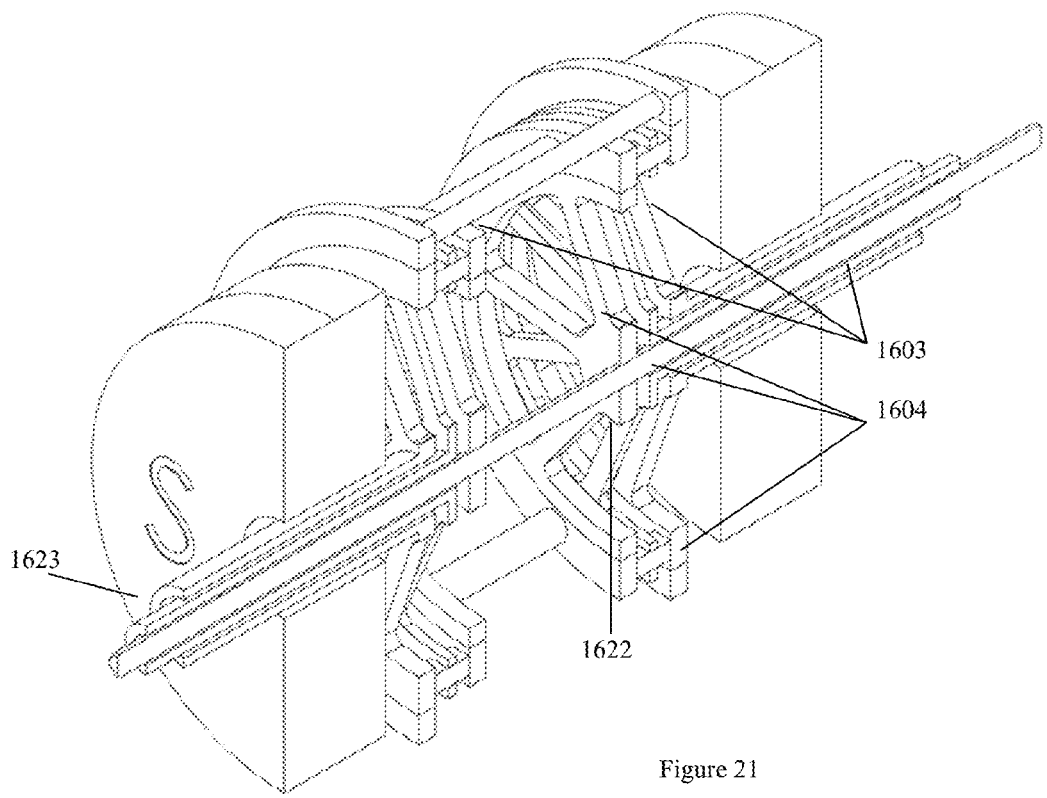
FIG. 21 is a sectional view of the embodiment illustrated in FIG. 20 along line B-B.
Figure 22:
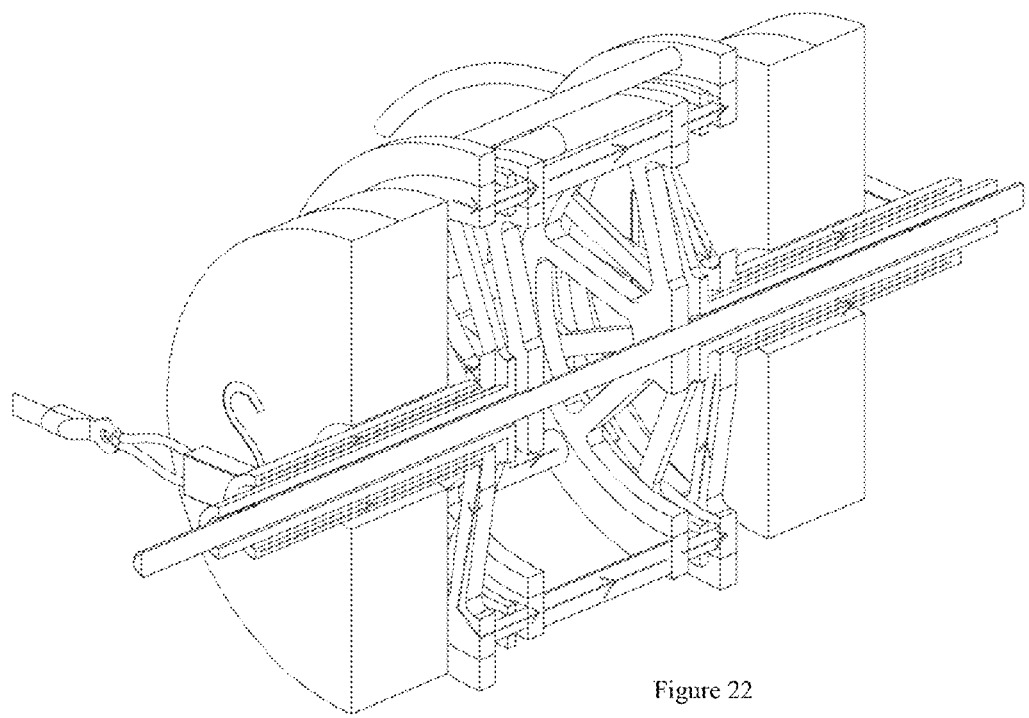
FIG. 22 is a sectional view of the embodiment illustrated in FIG. 20 along line B-B showing the current path through the drums.

In order to minimise the velocity differential between the first drum and the second drum, a fixed brush mount may be provided as shown in FIG. 20. In this embodiment, the first drum may be provided with a conductive rim 1621 at either end to which the conductive elements 1612 are mounted. A fixed annular hub 1622 may be provided between the conductive rim 1621 of the first drum and the conductive rotor body 1614 of the second drum with a plurality of spaced conductive portions, generally in the form of conductive brushes, mounted thereon on both faces, contacting the conductive rotor body 1614 of the second drum on one side and the conductive rim 1621 of the first drum on the other side.

The brushes may be mounted to either side with a conductive path therebetween or alternatively, a single brush may be mounted through the hub, with either end contacting the respective conductive path components.

According to this embodiment, the fixed annular hub 1622 is preferably mounted relative to a hollow shaft 1623 which is received between the first and second shafts of the turbine. Normally a pair of shaft portions are provided, one on either end of the turbine.

Figure 23:
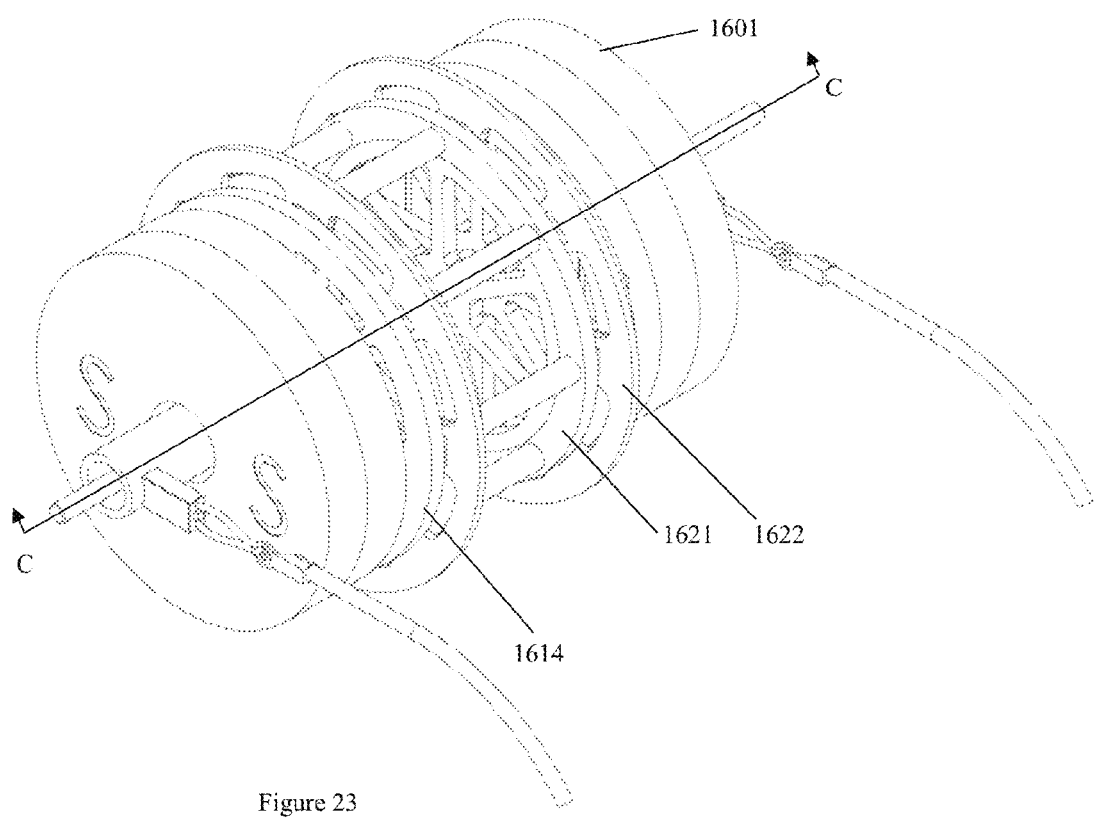
FIG. 23 is an isometric view of an alternative form of the present invention in a counter-rotating two drum embodiment with brush mounts fixed in a alternative configuration.
Figure 24:
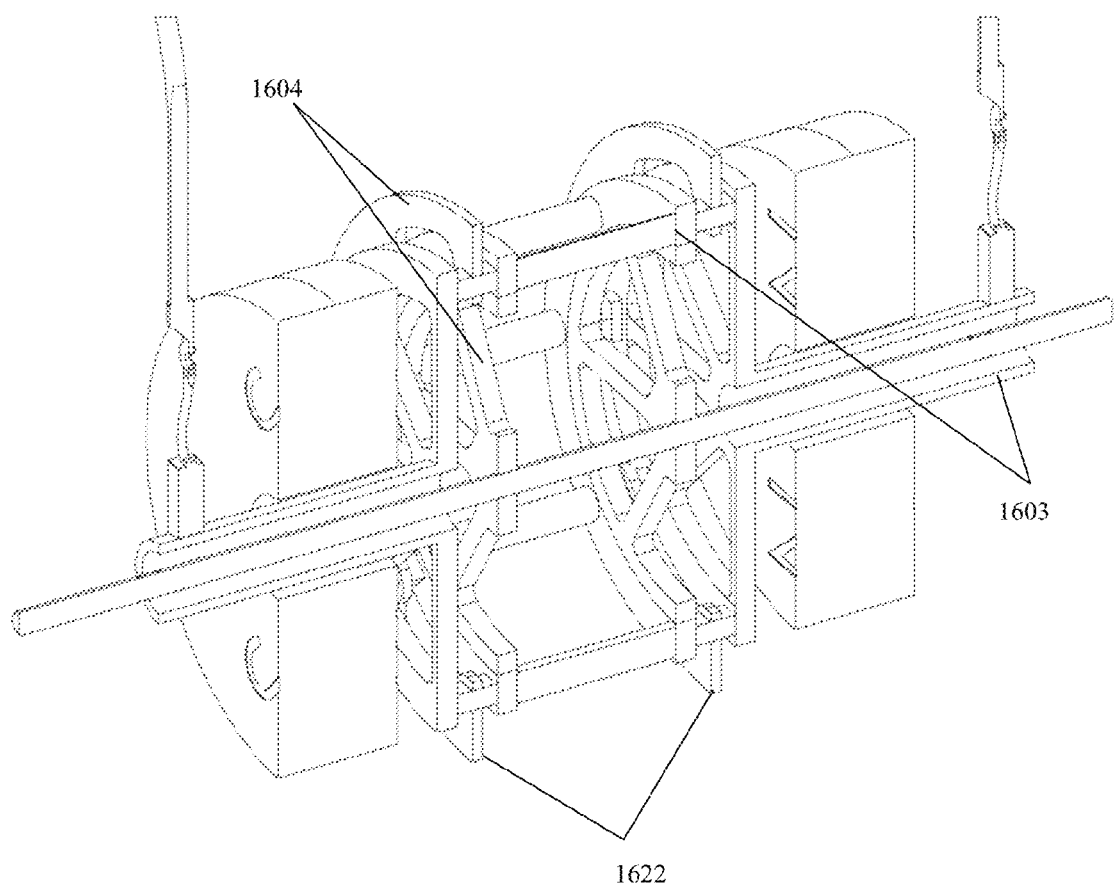
FIG. 24 is a sectional view of the embodiment illustrated in FIG. 23 along line C-C.
Figure 25:
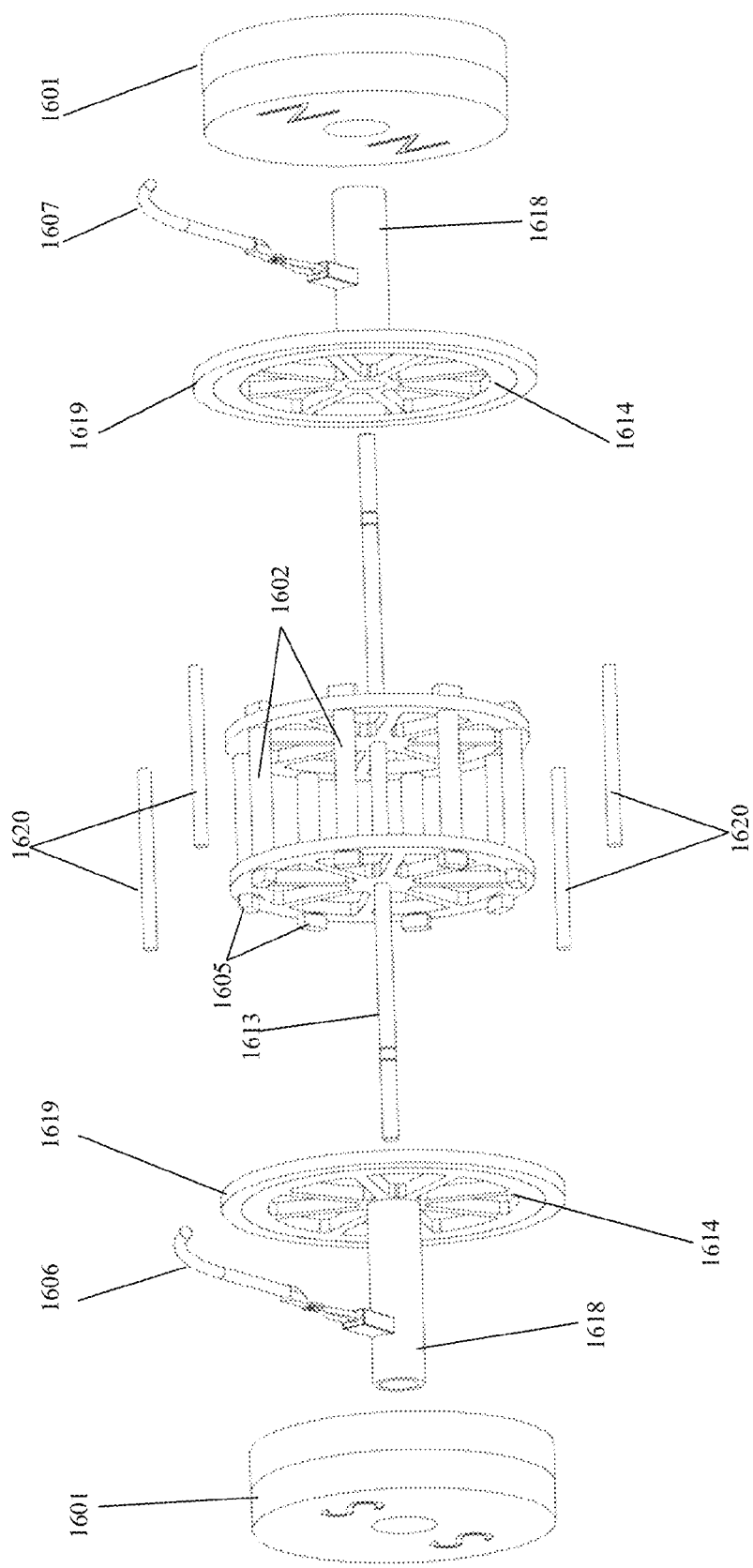
FIG. 25 is an exploded view of the embodiment illustrated in FIG. 16.

Alternatively, the hub may be fixed externally rather than using the hollow shaft configuration as illustrated in FIG. 23.

As will be appreciated by those of skill in the art an increase in torque can be achieved by maximising the magnetic field strength between the magnetic elements of the turbine. To further improve torque it is desirable that the field is maximised while keeping the magnetic elements as small and as light as possible. There are a number of factors which effect the optimisation of the field strength such as the separation distance for two elements the coil diameter and number of turns, the number of coil stacks for each coil assembly.

Figure 26:
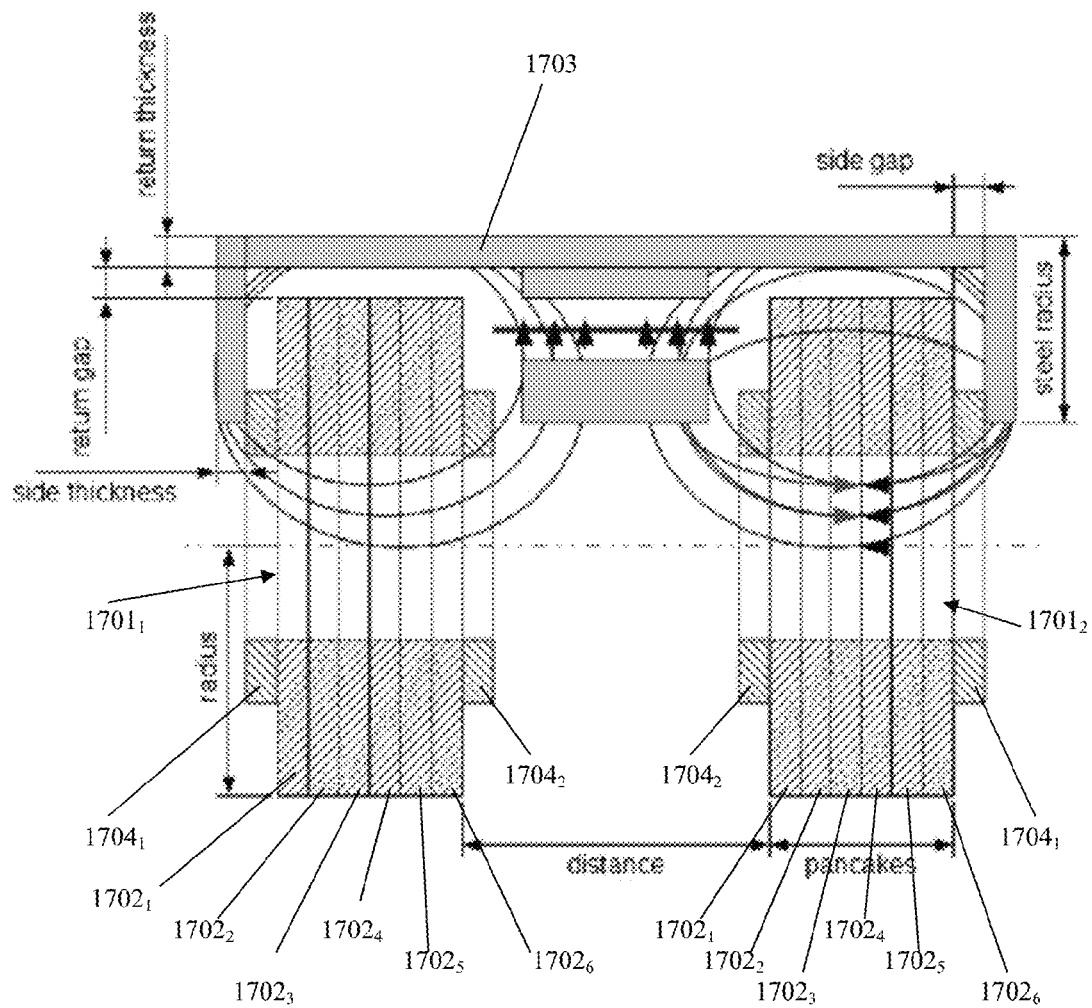
FIG. 26 is a cross-sectional view of one arrangement of the magnetic elements of the turbine to optimise the field between the elements.

One arrangement 1700 for optimising the magnetic field between the two magnetic elements is shown in FIG. 26. As shown the magnetic elements 1701$_1$, 1701$_2$ in this case are constructed from at least 6 coils 1702$_1$, 1702$_2$, 1702$_3$, 1702$_4$, 1702$_5$, 1702$_6$ of HTS tape. Each coil is composed of a 100 turns of HTS tape with an internal radius, of 150 mm. An external steel flux guide 1703, for the purposes of clarity only one half of the guide is shown. The addition of the steel flux guide allows for the localized strengthening of the field. However, the addition of steel is only beneficial up to a point and then there is no further advantage due to over saturation of the steel. Additionally a lighter motor is desired and as such it is desired that as little steel as possible is used.

In addition to the flux guide, this particular example compensation coils 1704$_1$, 1704$_2$ are used to further increase the field strength. As shown the coils are mounted at opposing ends of the magnetic elements 1701$_1$, 1701$_2$. The current applied to the compensation coils are in the opposite direction as that of the coil assemblies 1701$_1$, 1701$_2$. The effect is to manipulate the field such that the parallel field (along Z axis, i.e. the central axis) is reduced and the BY (i.e. the perpendicular) field increased. Ideally it is desired for HTS tape with equal field directional characteristics (such as MGB2 wire) that the perpendicular and parallel field values are the same. HTS tape with a different field directional dependence will normalize as soon as the parallel or perpendicular field is exceeded.

Figure 27:
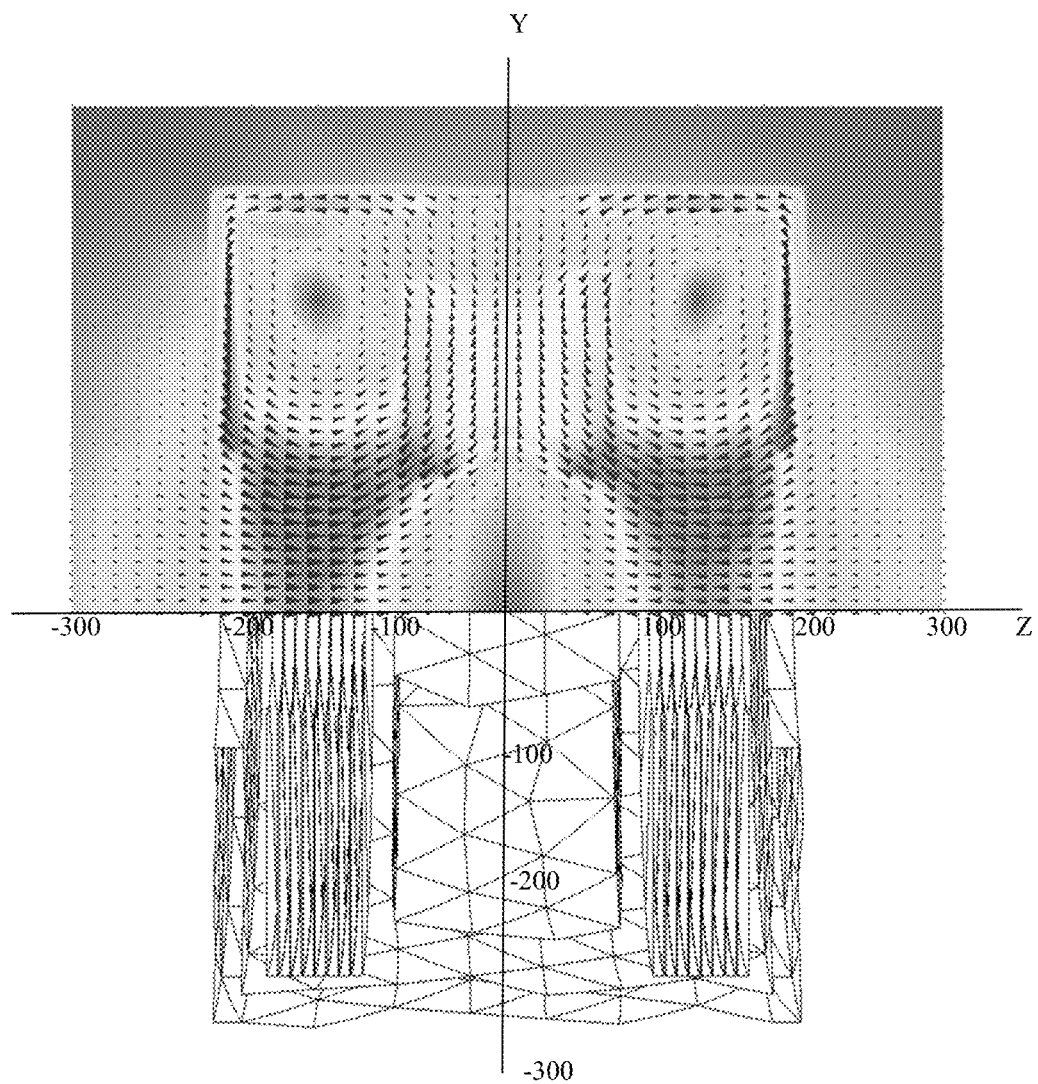
FIG. 27 is a model of the field profile for the magnetic element arrangement of FIG. 26.

FIG. 27 is a vector plot of the magnetic field between the two magnetic elements. The direction of the field is shown by the arrows with the intensity shown by their size and surrounding colour. As can be seen the peak perpendicular and peak parallel field strengths are very close.

Figure 28A:
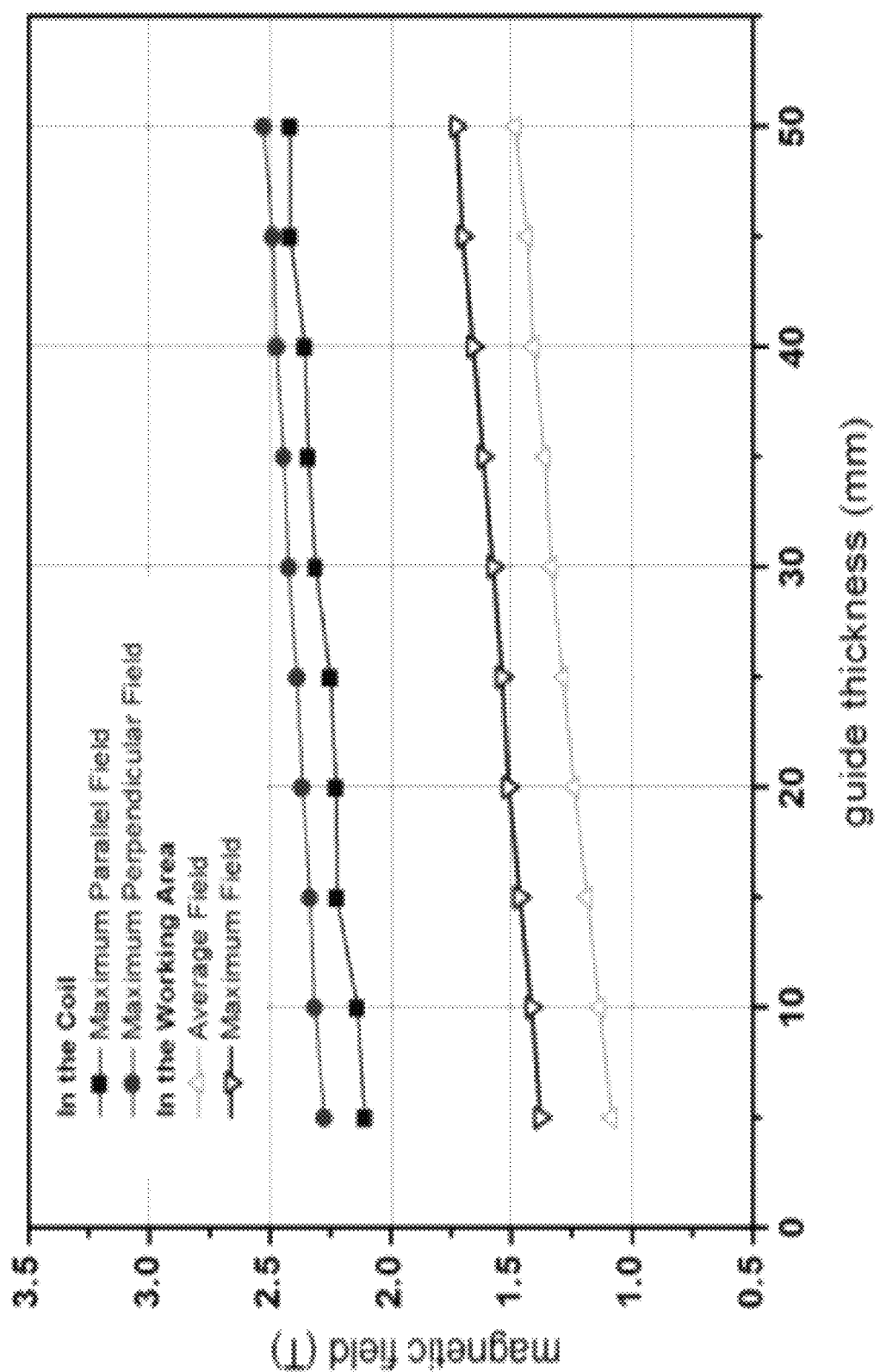
FIGS. 28A to 28F are plots depicting the effects on field strength for various parameters of the turbine.

FIGS. 28A to 28F are plots depicting the field intensity against various physical parameters of the turbine assembly. FIG. 28A shows the field intensity with respect to the flux guide thickness. As can be seen in FIG. 28A the magnetic field increases with an increasing flux guide thickness. The two upper most curves denote the perpendicular and parallel field strength within the coils. While the lower two curves are indicative of the field strength in the region where the rotors will be located (i.e. working region).

Figure 28B:
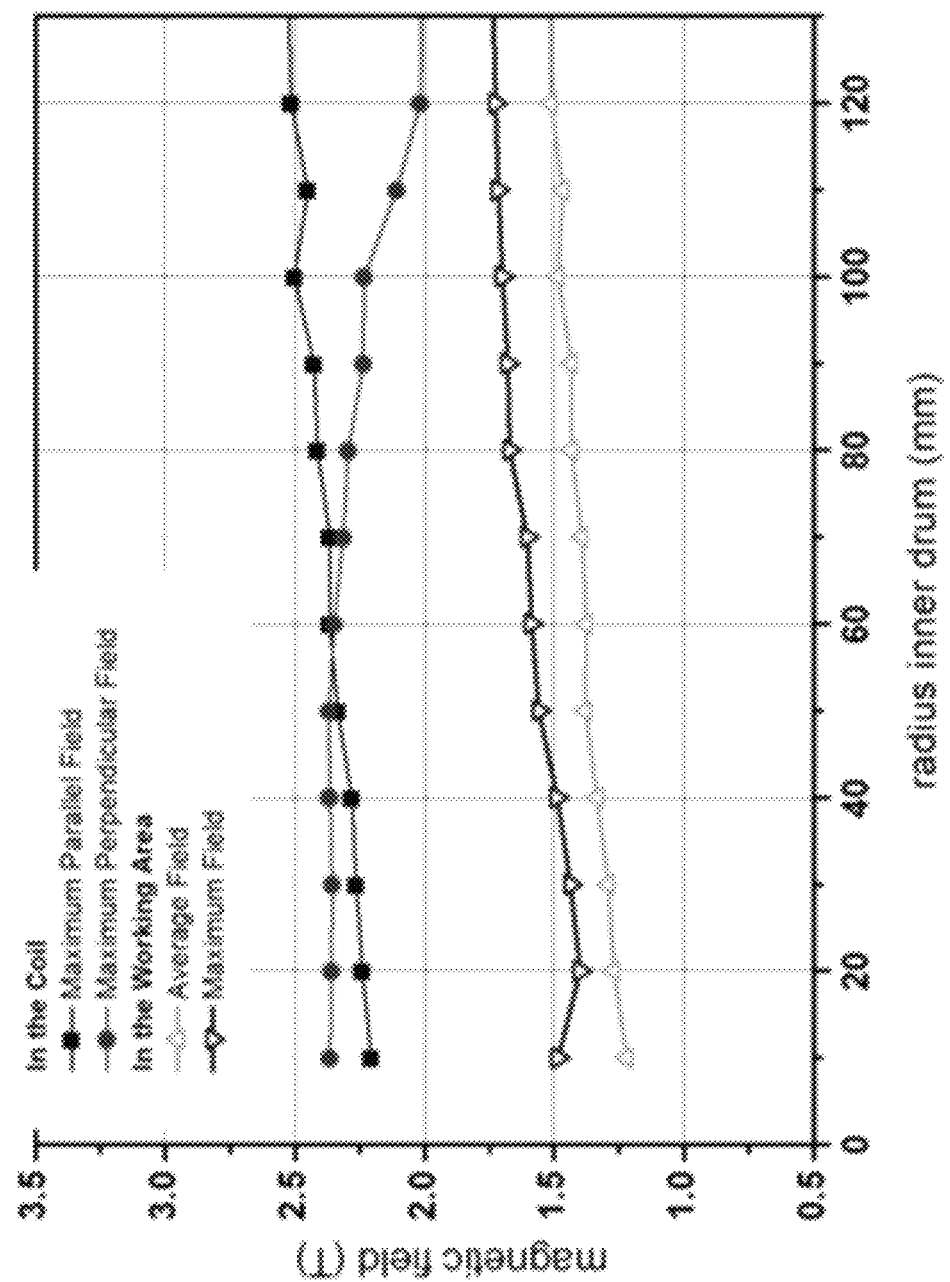

FIG. 28B depicts the field intensity with respect to the size of the inner drum of the rotor assembly. Again the upper most curves denote the perpendicular and parallel field strength within the coil. The lower most curves denote the field strength in the working region. As can be seen from FIG. 28B there is some benefit to increasing the radius of the inner drum. That is a slight field increase is achieved, however this is offset by the increase in overall weight or the rotor assembly.

Figure 28C:
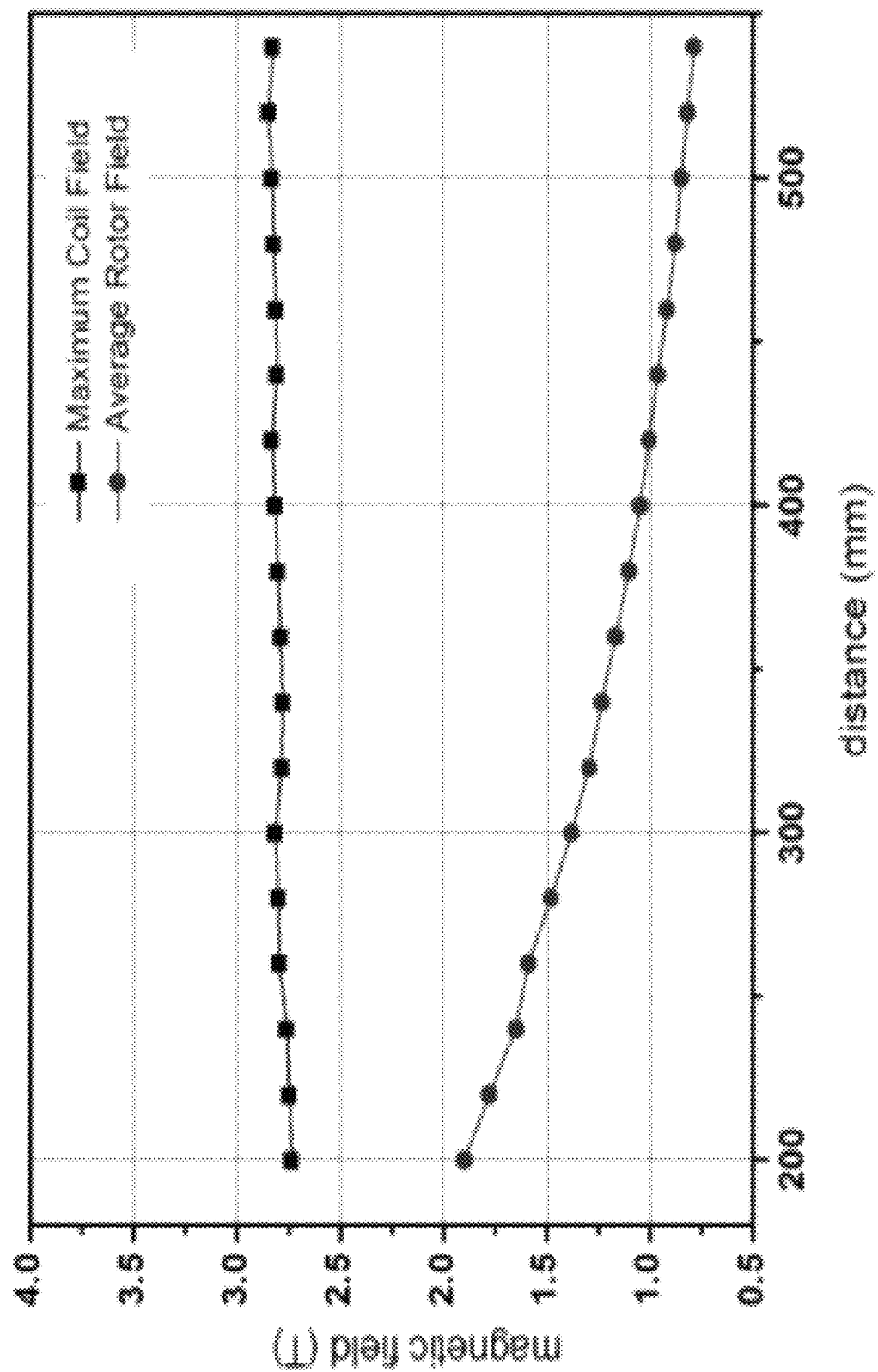

The plot illustrated in FIG. 28C shows the change in field strength against the separation between the two magnetic elements. The lower curve shows how the average field about the rotor drops rapidly as the magnetic elements are moved further apart. The upper line simply shows that the maximum field within the coils does not change much as the two bodies are separated.

Figure 28D:
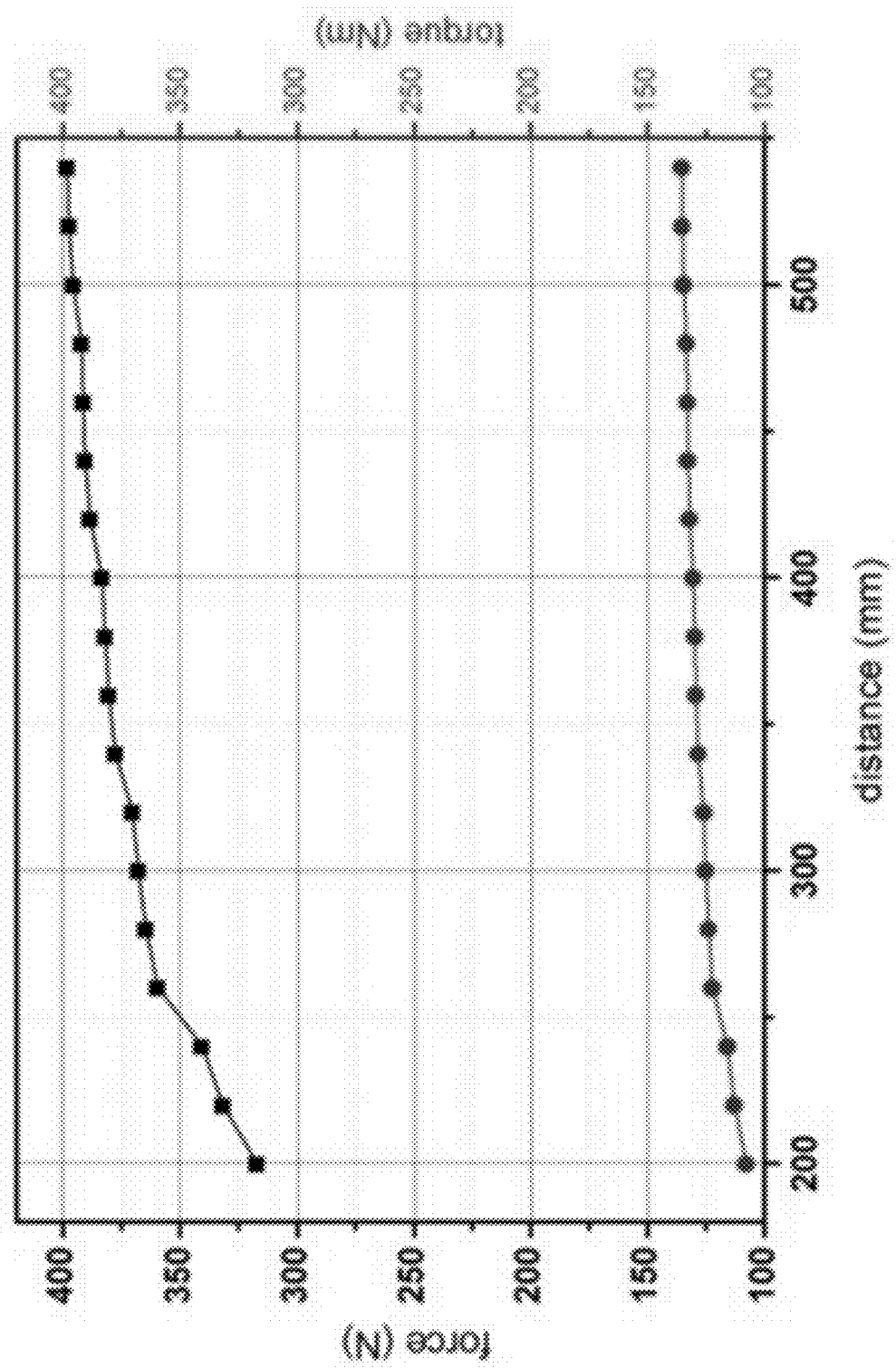

FIG. 28D shows the potential torque produced by the rotor bar. It shows that by separating the coils and increasing the conductor rotor bar length there is a small increase in torque. However the curve flattens out eventually indicating no further gain.

Figure 28E:
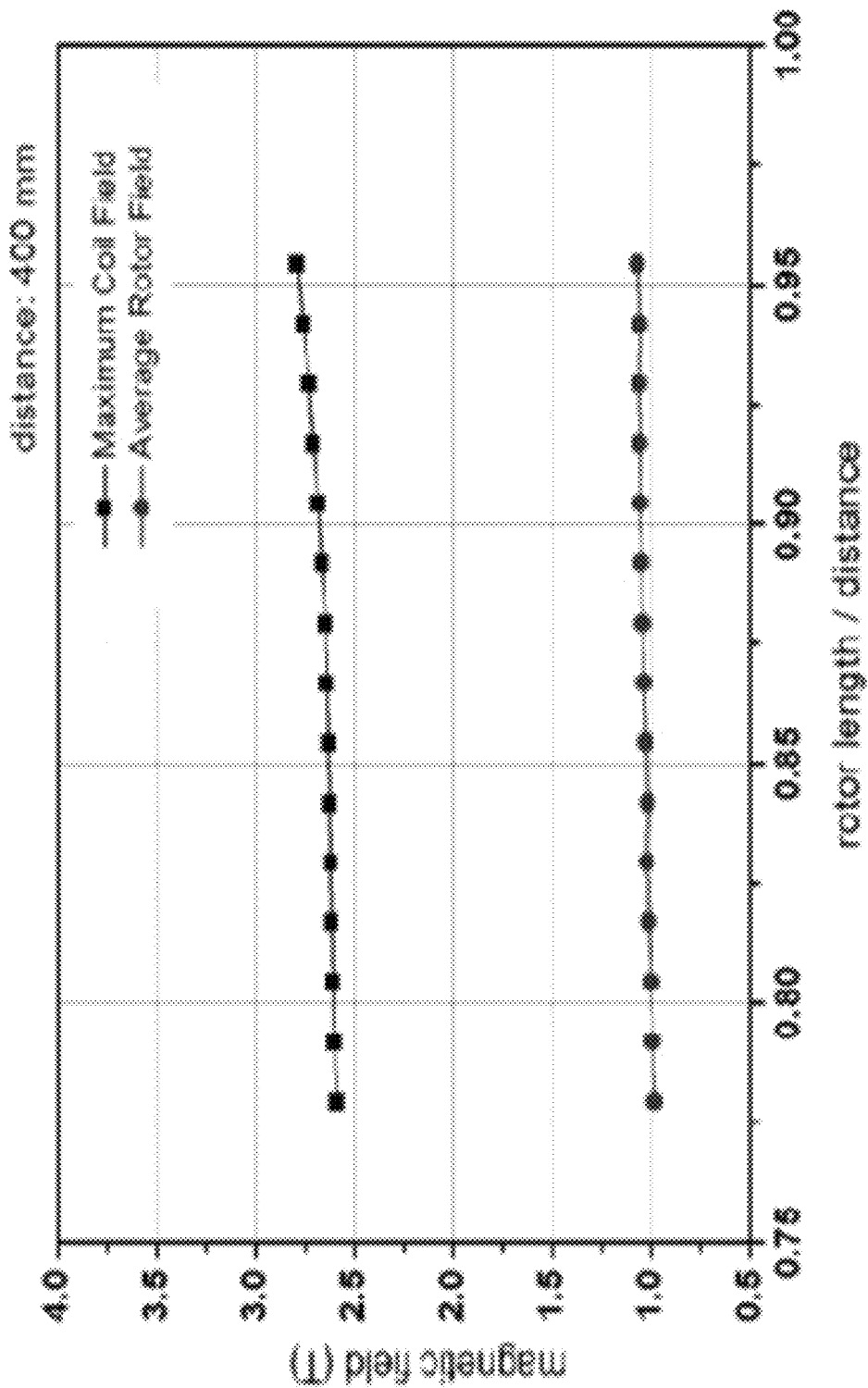
Figure 28F:
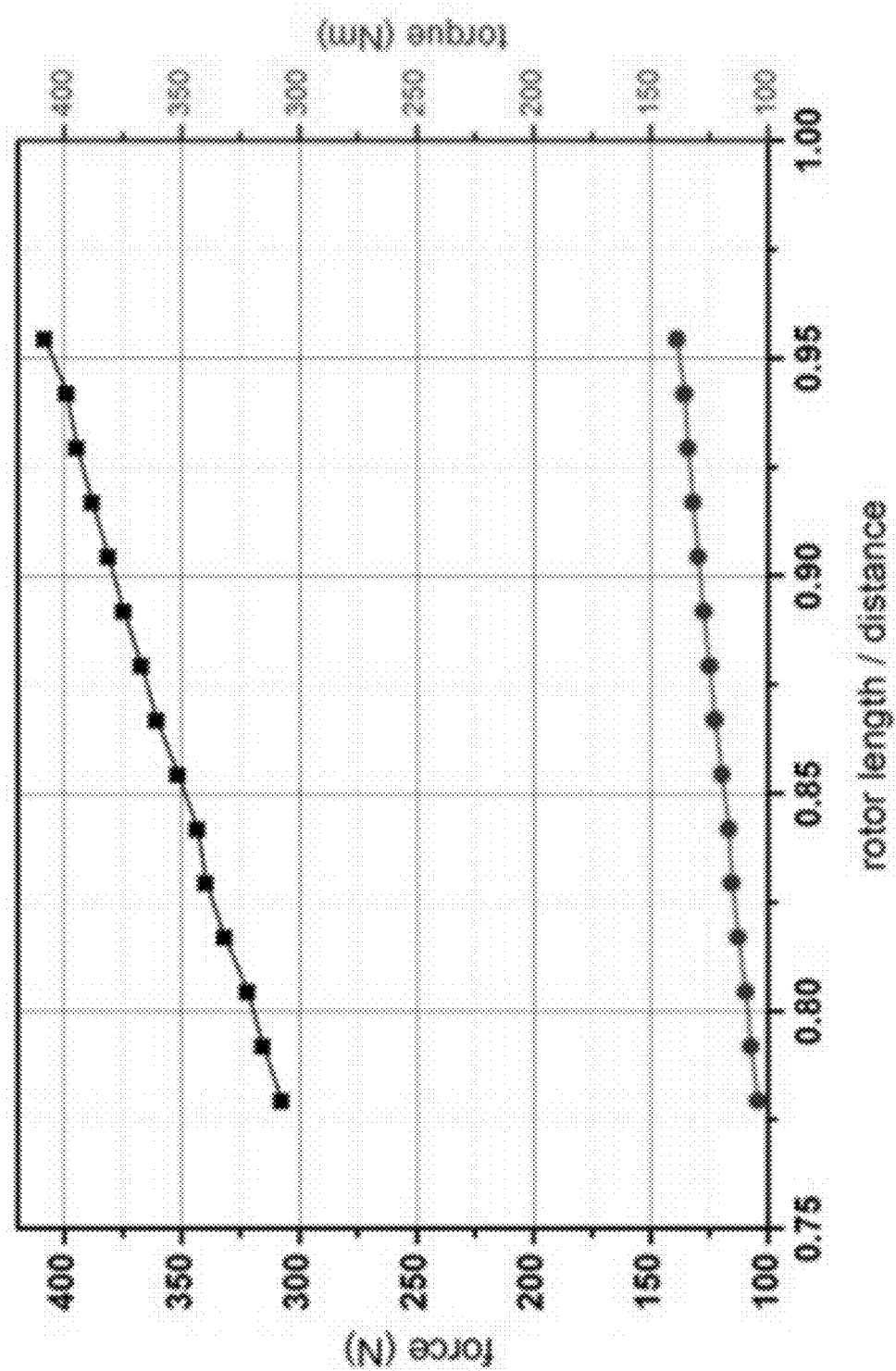

The plot shown in FIG. 28E depicts the magnetic field strength versus the ratio of conductor rotor bar length to a separation distance of 400 mm between the magnetic elements. The lower curve suggests that the difference in field strength over the whole length is very small when the bar length is 80% or even 95% of the 400 mm distance. This is surprising but beneficial since the shorter bar length will allow for space for brushes and a cryogenic system encompassing the magnetic elements. The upper curve again denotes the maximum field within the coils FIG. 28F shows the potential torque versus the ratio of conductor rotor bar length to a separation distance of 400 mm between the solenoid bodies. It shows that having the rotor bar length as close to the separation distance results in more torque. In other words, the longer the rotor bar, the more torque is produced. As mentioned in the previous paragraph, some length will need to be sacrificed for brush room and for a cryogenic membrane.

Figure 29A:
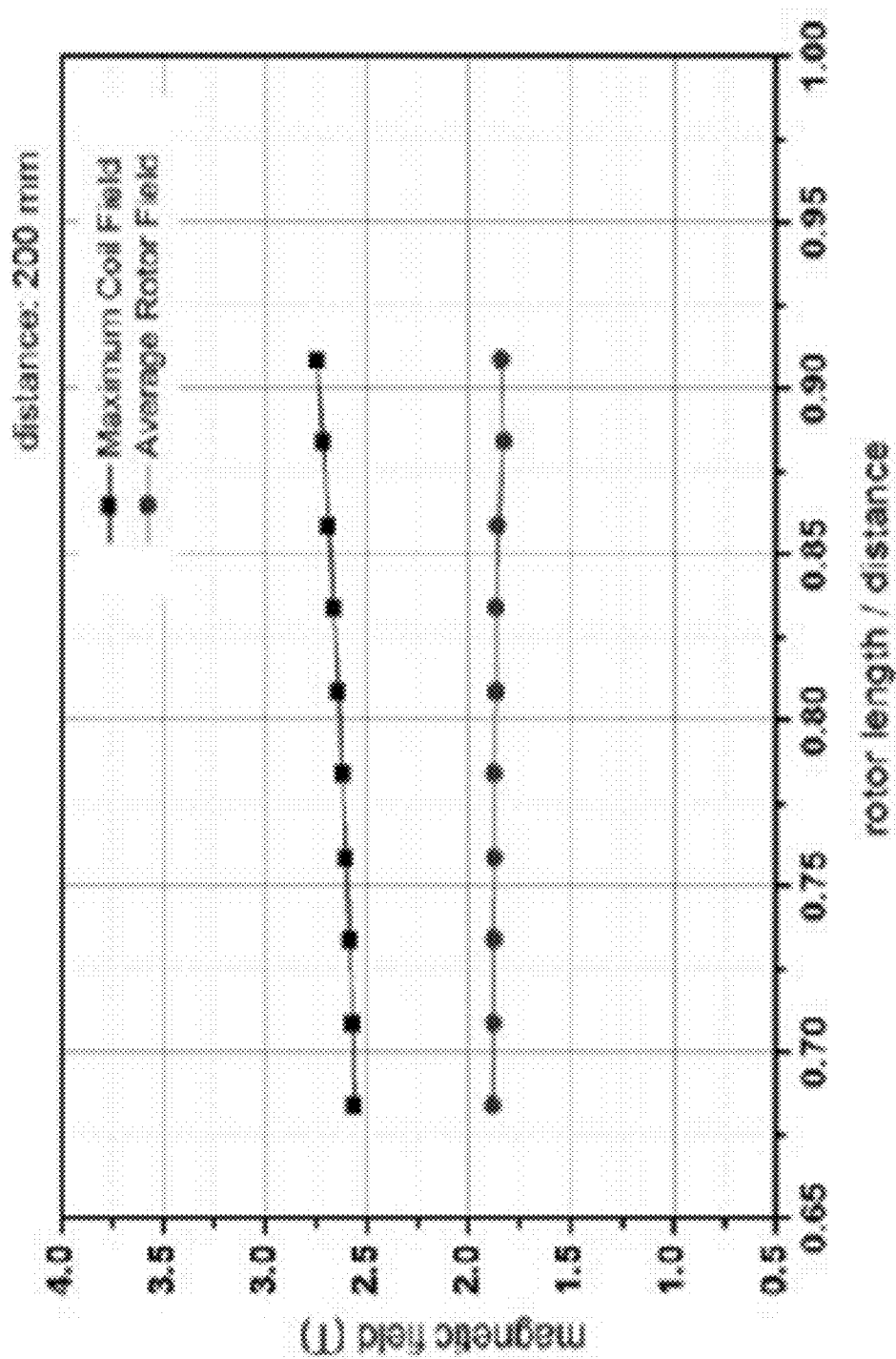
FIGS. 29A to 29F are plots depicting the effects on field strength for set turbine parameters.

FIG. 29A shows the magnetic field strength versus the ratio of conductor rotor bar length to a separation distance of 200 mm between the solenoid bodies. The red line suggests that the difference in field strength over the whole length is even smaller than for the 400 mm distance described earlier. For example when the conductor bar length is 70% or even 90% of the 200 mm distance, the magnetic field strength is very similar. Once again, this is surprising but beneficial since the shorter bar length will allow for space for brushes and a cryogenic system encompassing the solenoids.

Figure 29B:
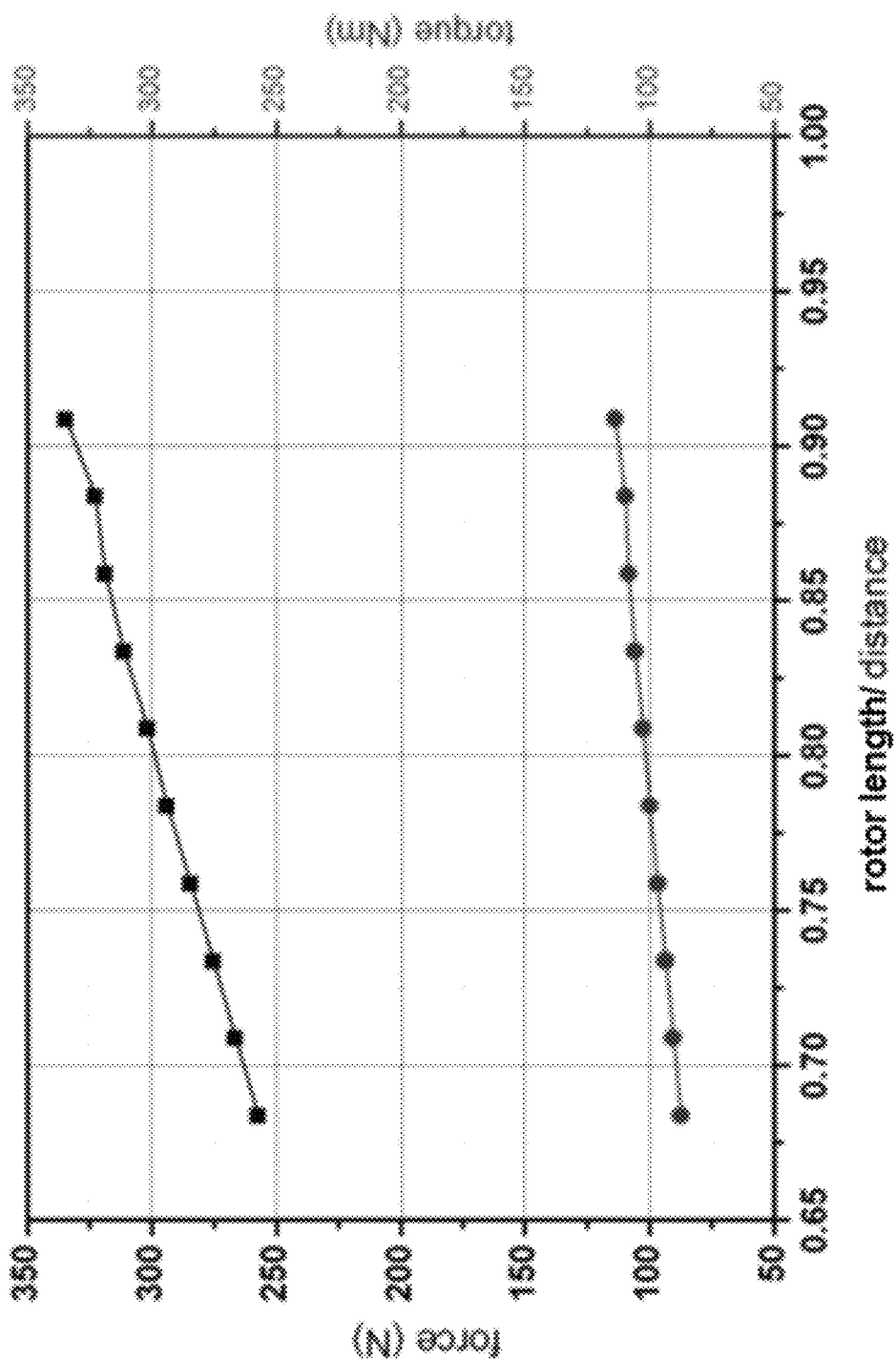

The plot illustrated in FIG. 29B shows the potential torque versus the ratio of conductor rotor bar length to a separation distance of 200 mm between the solenoid bodies. It shows that having the rotor bar length as close to the separation distance results in more torque. In other words, the longer the rotor bar, the more torque is produced. As mentioned earlier, some length will need to be sacrificed for brush room and for a cryogenic membrane.

Figure 29C:
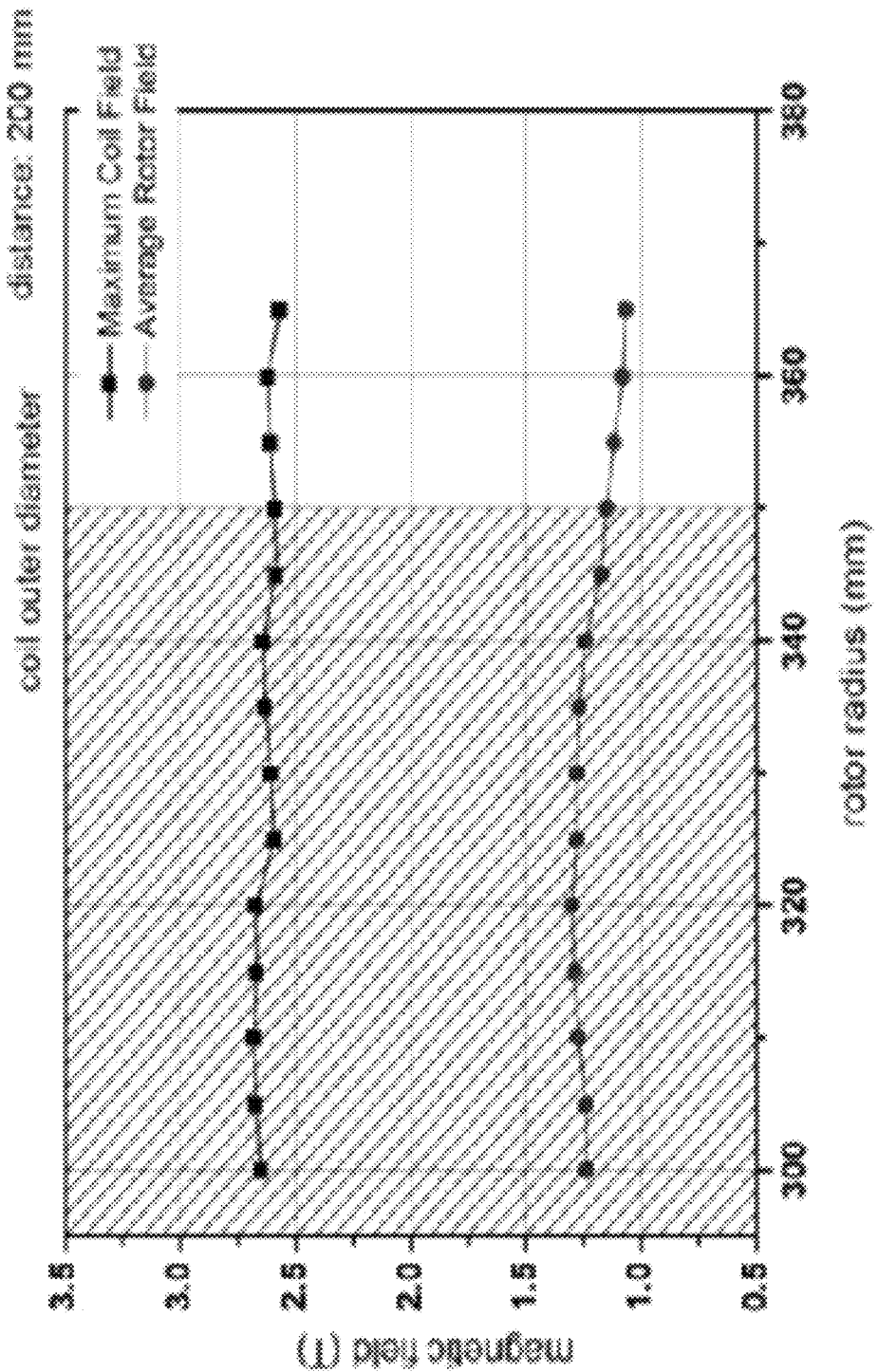

FIG. 29C compares the maximum coil field to the average conductor rotor bar field as the rotor radius increases and the solenoid bodies are separated by 200 mm. Note that the right hand side of the black shaded region corresponds to the coil solenoid body's outer radius. It is 350 mm. One can see that the peak average rotor field is experienced when the rotor radius is in fact below that of the coil solenoid body's. It is at 320 mm.

Figure 29D:
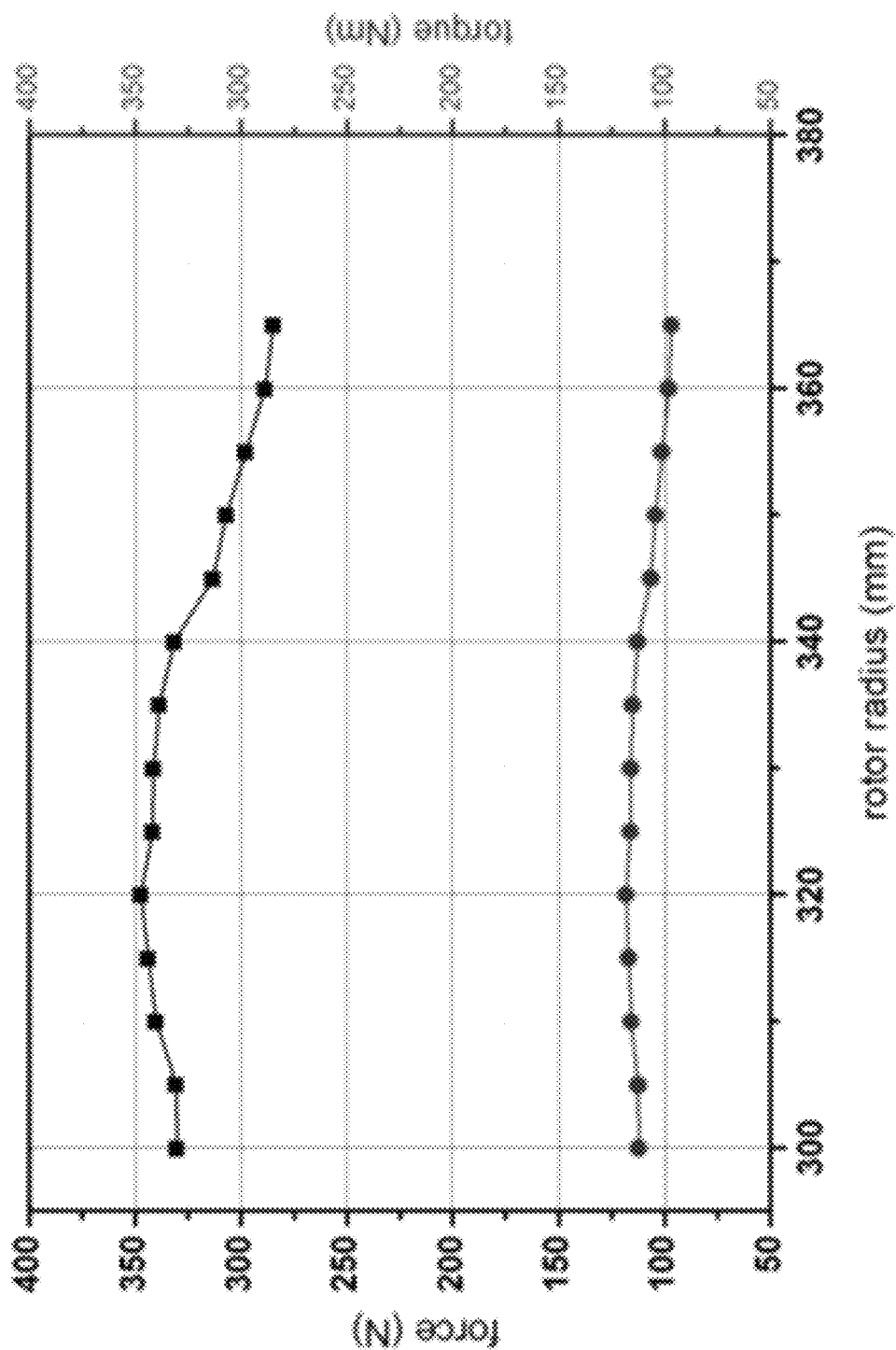

The plots shown in FIG. 29D shows the potential torque produced as the radius at which the conductor rotor bar is located is increased from 300 to 365 mm, when the solenoid bodies are still separated by 200 mm. One can deduce from the plot that a maximum torque is produced when the rotor is located at a radius of 320 to 340 mm. Overall there is only a small change in torque as the radius changes.

Figure 29E:
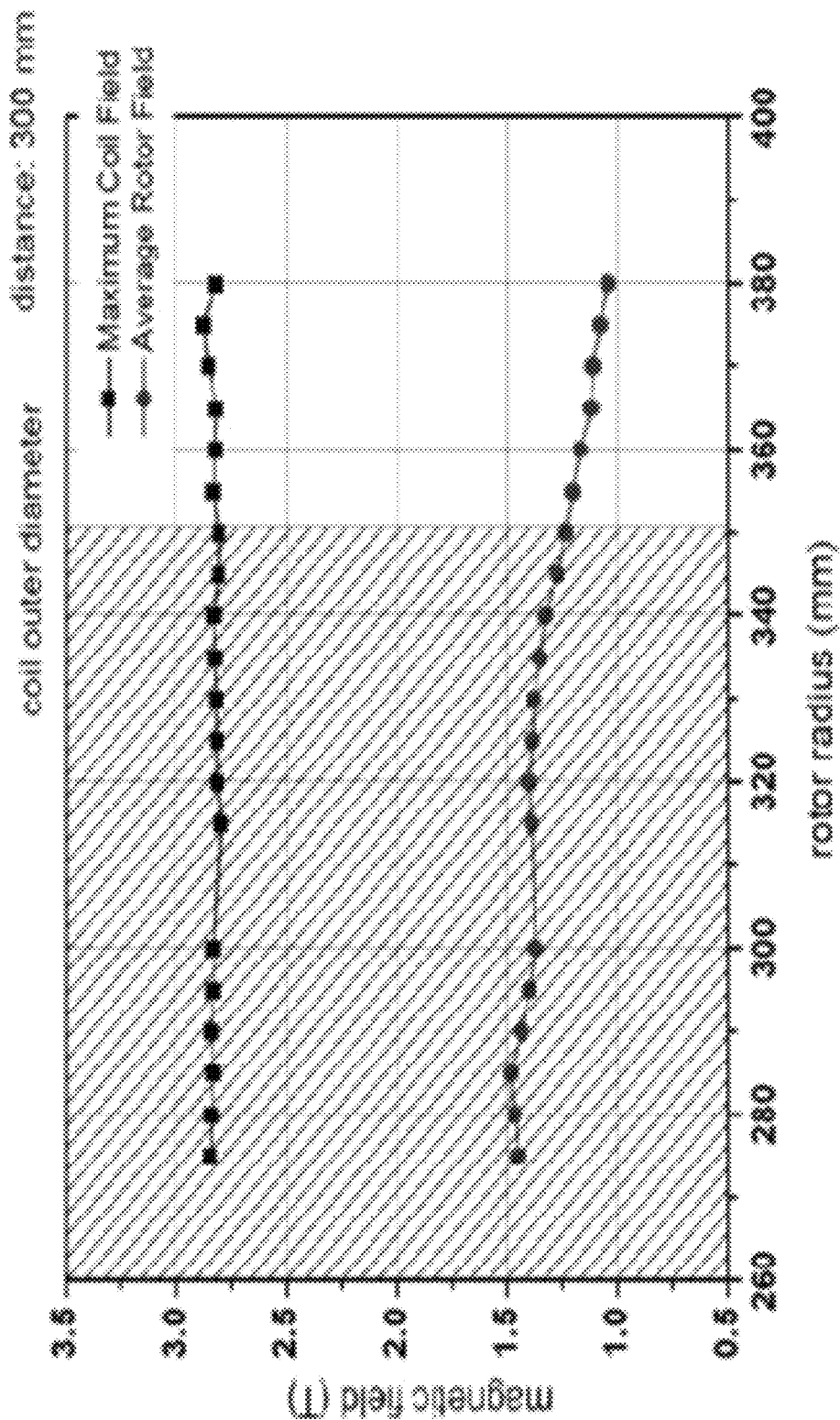

FIG. 29E compares the maximum coil field to the average conductor rotor bar field as the rotor radius increases and the solenoid bodies are separated by 300 mm. Note that the right hand side of the black shaded region corresponds to the coil solenoid body's outer radius. It is 350 mm. One can see that the peak average rotor field is experienced when the rotor radius is in fact below that of the coil solenoid body's. It is at below 290 mm in this case. One should also note that the field is stronger than in the previous case where the solenoid bodies were separated by only 200 mm.

Figure 29F:
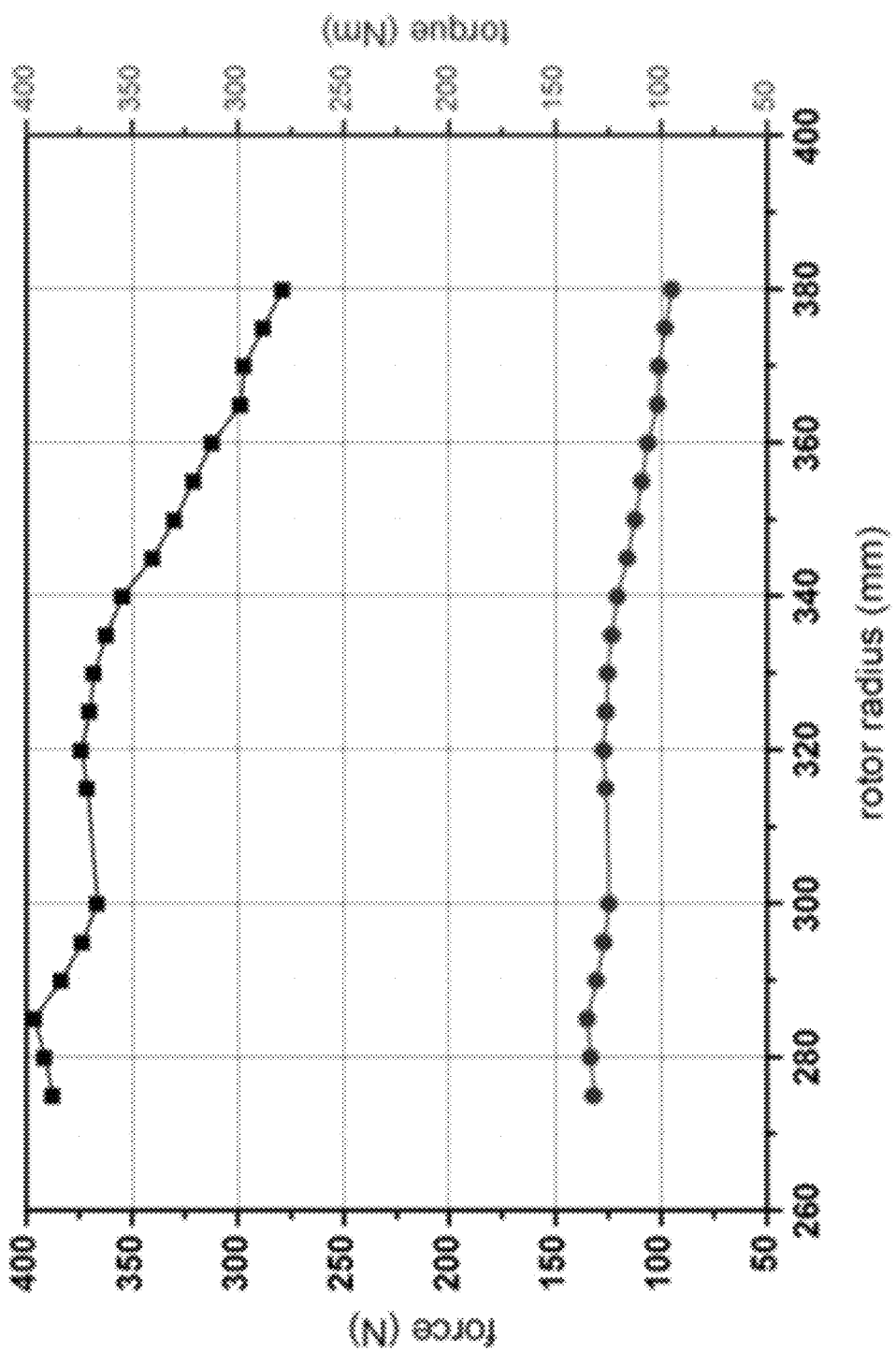

The plots in FIG. 29F show the potential torque produced as the radius at which the conductor rotor bar is located is increased from 280 to 380 mm, when the solenoid bodies are still separated by 300 mm. One can deduce from the plot that a maximum torque is produced when the rotor is located at a radius of 280 to 290 mm. Overall there is a larger change in torque as the radius changes when the solenoid bodies are separated by 300 mm as opposed to the previous case where the separation distance was only 200 mm.

Figure 30:
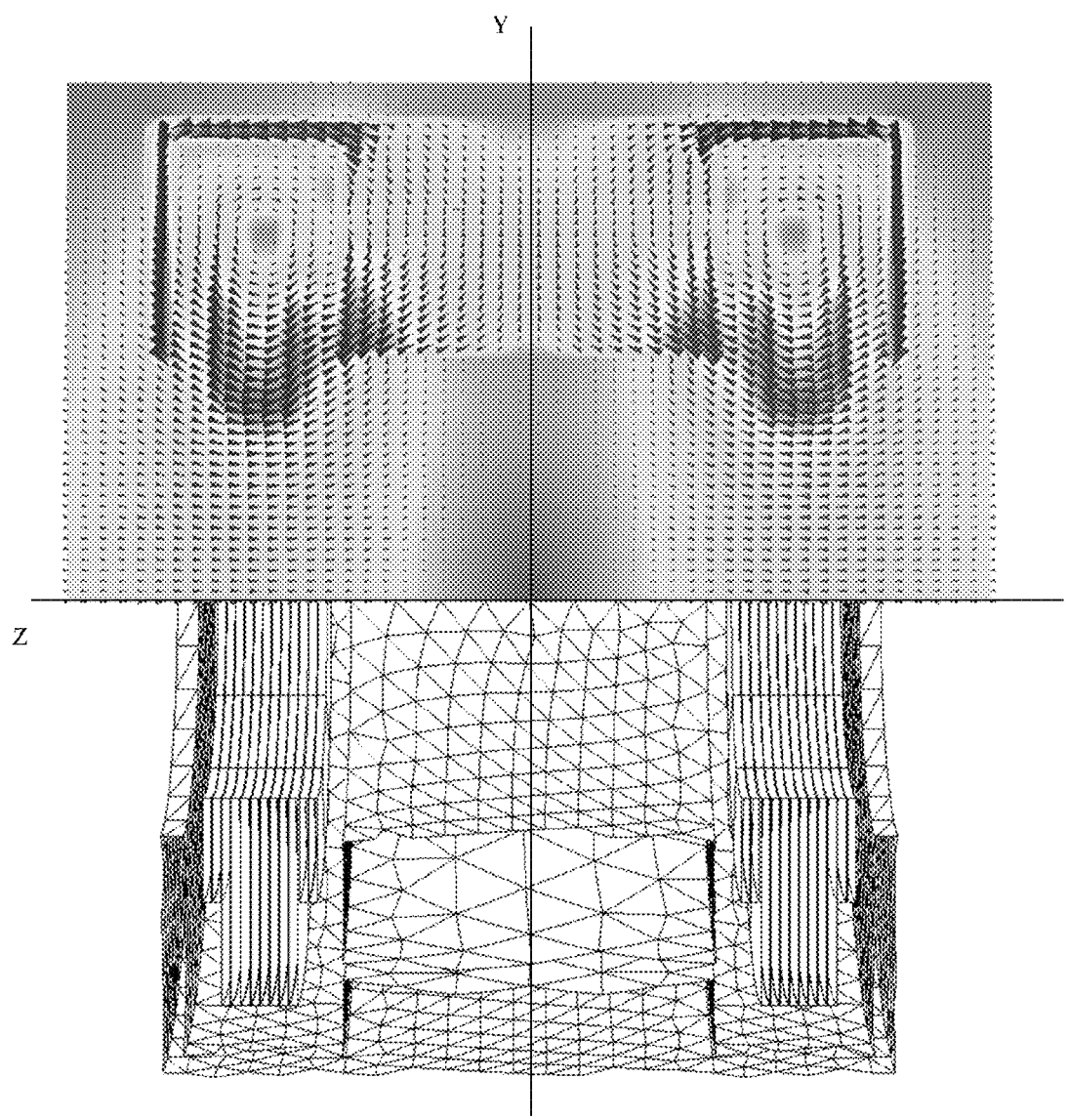
FIG. 30 is a model of the field profile for the magnetic element inclusive of the compensating coils of the turbine of FIG. 26.

FIG. 30 is a vector plot of the magnetic field between the two magnetic elements including compensation coils. The direction of the field is shown by the arrows with the intensity shown by their size and surrounding colour. As can be seen the peak perpendicular and peak parallel field strengths are close.

Figure 31A:
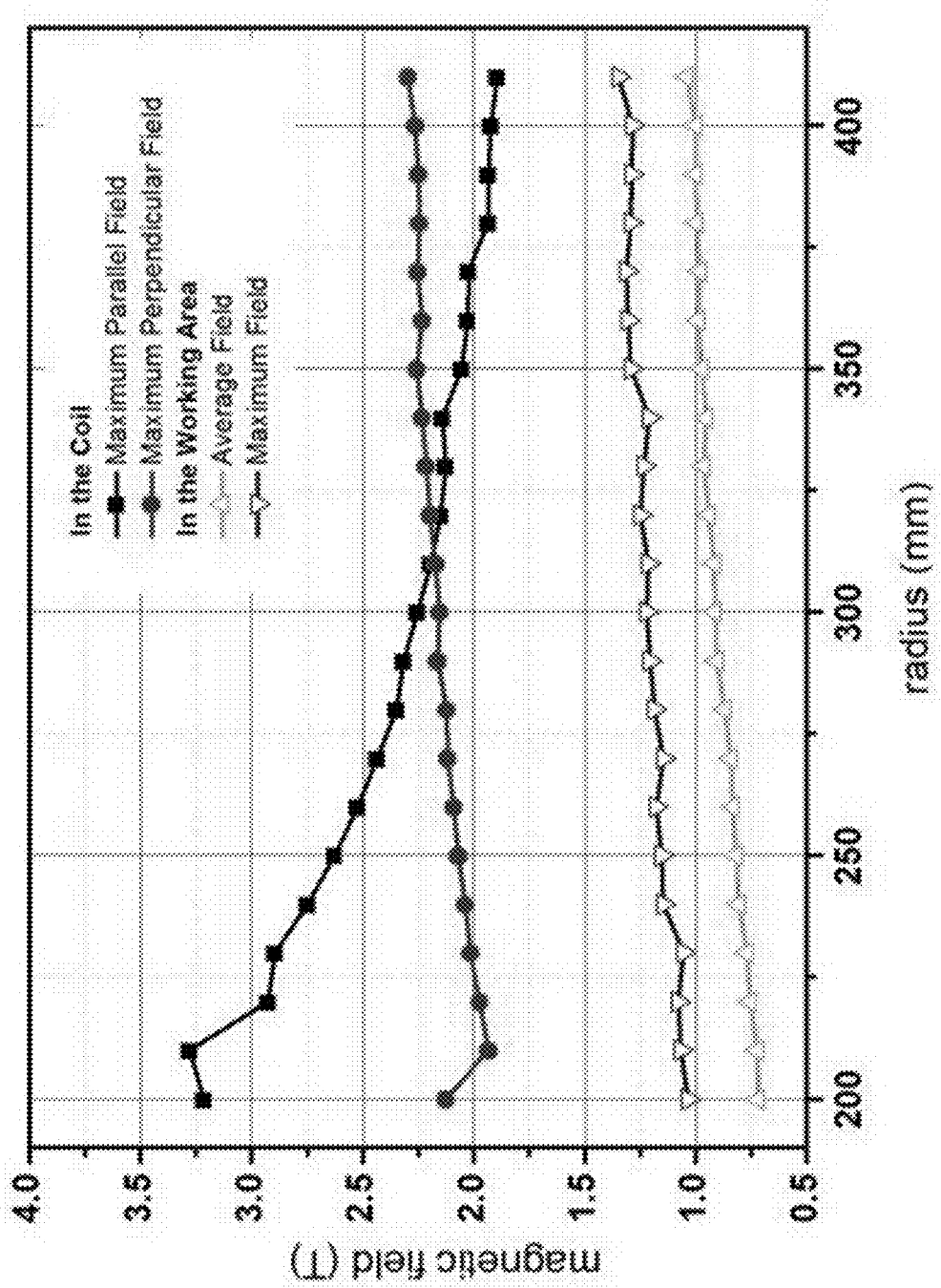
FIGS. 31A to 31D are plots depicting the effects on field strength for various parameters of the turbine.
Figure 31B:
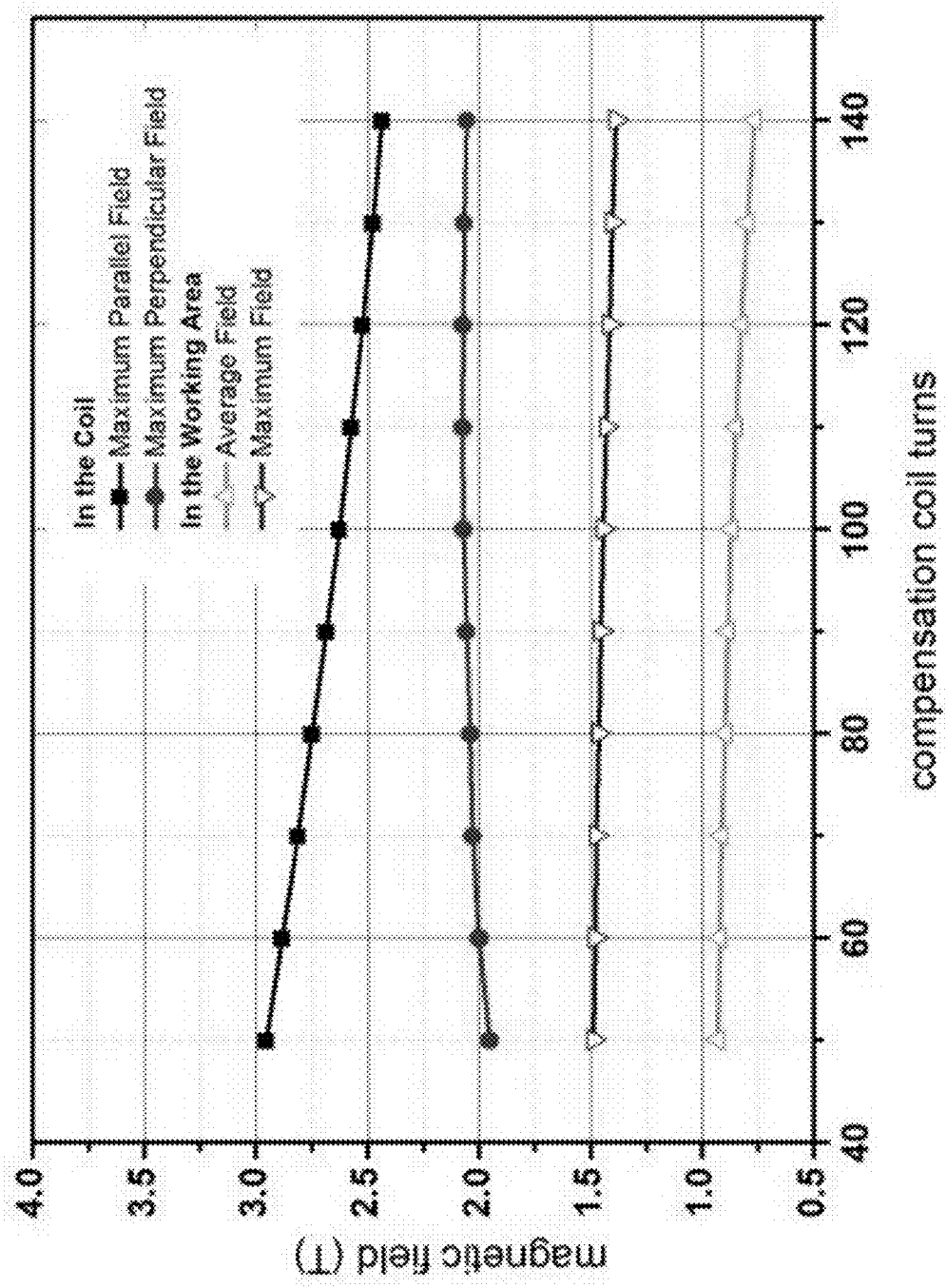
Figure 31C:
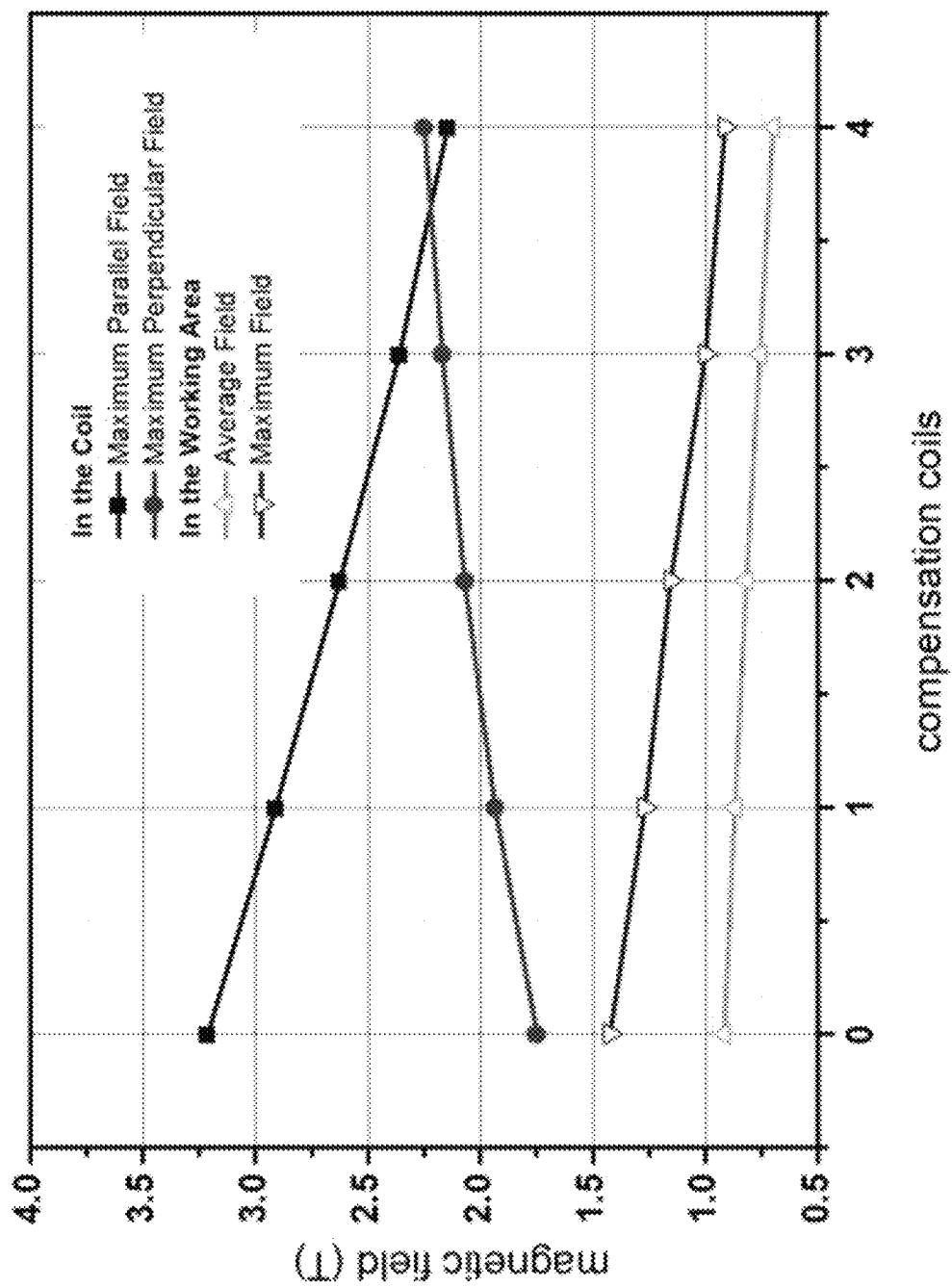
Figure 31D:
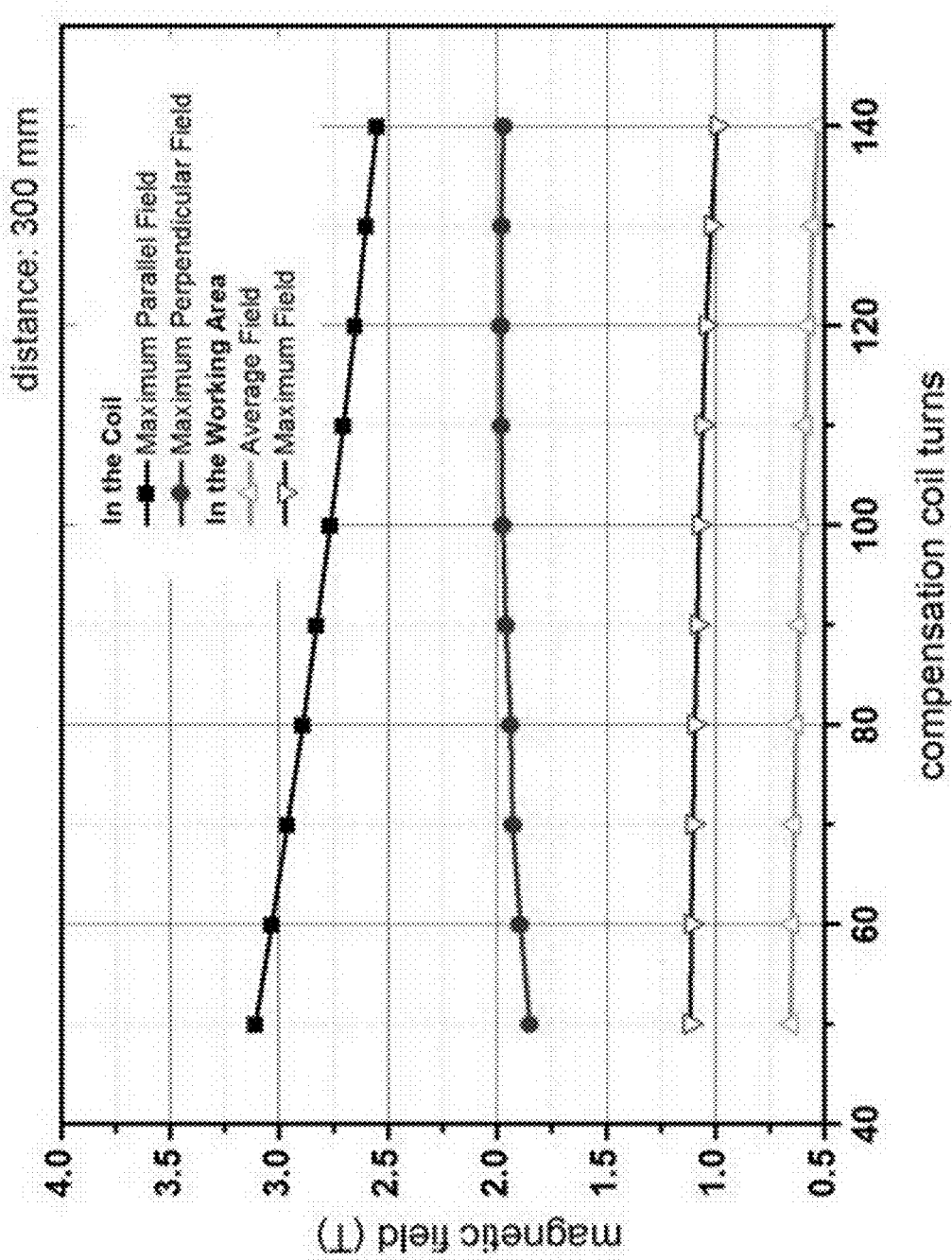

FIGS. 31A to 31D are plots of the field strength within the coils utilising different coil geometries. FIG. 31A depicts the average magnetic field with respect to the radius of the main coils. FIG. 31B depicts the magnetic field as a function of the number of turns within each compensation coil. FIG. 31C is a plot of the magnetic field strength within the compensation coils. FIG. 31D is a plot of the field strength as a function of the number of turns within each of the compensation coils.

The various plots indicate that it is possible to reduce the maximum parallel field strength by using compensation coils. Significant decreases in the field strength in the inner radius of the primary coils are accompanied by a fairly sizable drop in the average field strength in the area of the working radius.

The effect of the combined approach using both the compensation coil and the steel flux guides was positive resulting in a general increase in the strength of the perpendicular field in the working area but also a reduction in the maximum field in the coils especially when increasing the radius of the inner drum. The trends observed earlier continue to remain there continues to be an optimum separation distance beyond which no observable gain is seen.

Figure 32:
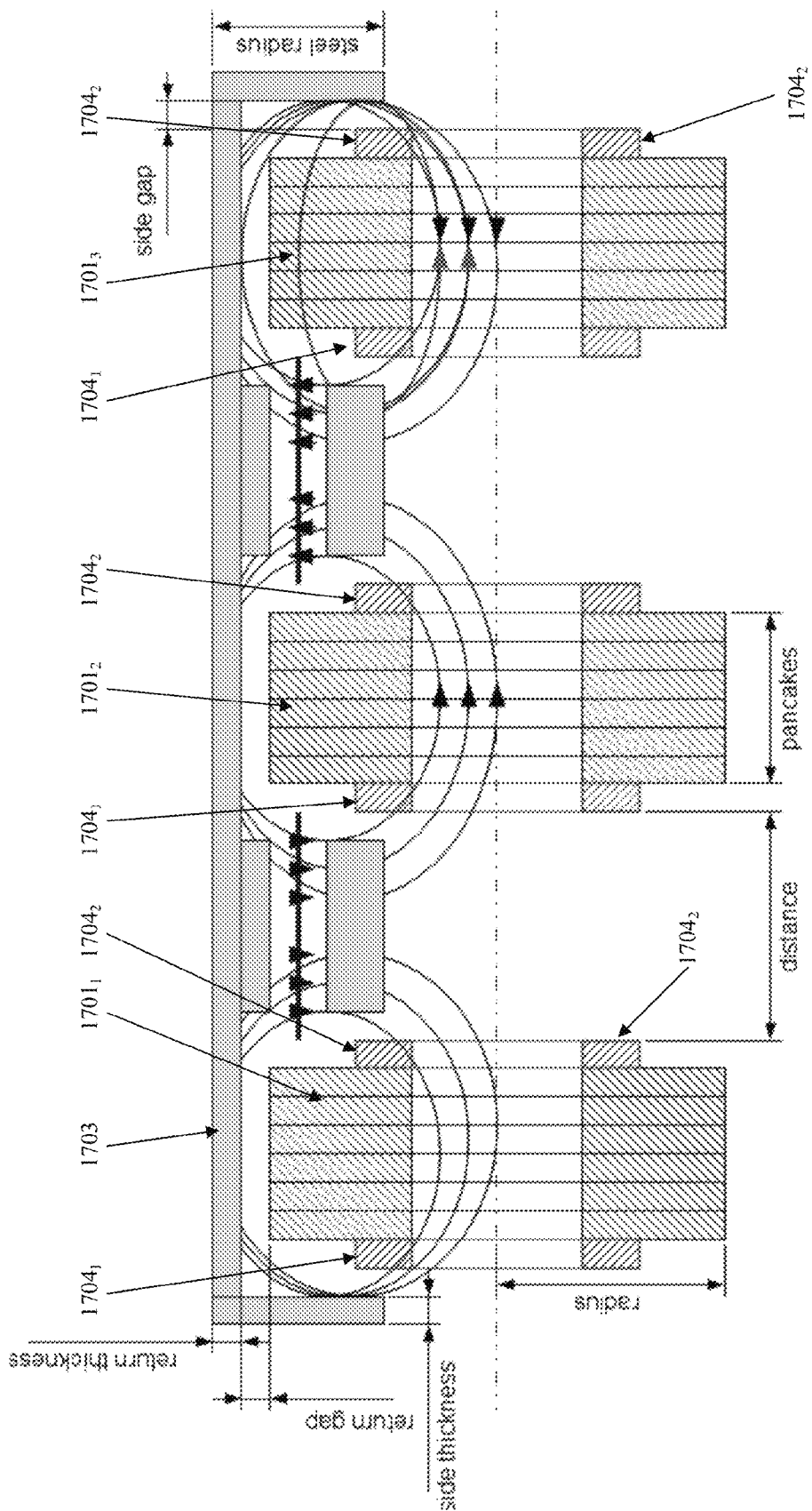
FIG. 32 is a cross-sectional view of one arrangement of the magnetic elements of the turbine according to one embodiment of the present invention.

FIG. 32 depicts extended version of the hybrid flux guide-compensation coil configuration of FIG. 26. As shown the configuration of FIG. 32 includes three magnetic elements $1701_1$, $1701_2$, $1701_3$ constructed from a plurality coils constructed from 12 mm wide HIS tape. Each coil is composed of a 100 turns of HTS tape with an internal radius of 150 mm. An external steel flux guide 1703, for the purposes of clarity only one half of the guide is shown. The addition of the steel flux guide allows for the localized strengthening of the field However the addition of steel is only beneficial up to a point and then there is no further advantage due to over saturation of the steel.

In addition to the flux guide this particular example compensation coils $1704_1$, $1704_2$ are used to further increase the field strength. As shown the coils are mounted at opposing ends of the magnetic elements $1701_1$, $1701_2$, $1701_3$. The current applied to the compensation coils are in the opposite direction as that of the coil assemblies $1701_1$, $1701_2$, $1701_3$. The effect is to manipulate the field such that the parallel field (along X axis, i.e. the central axis) is reduced and the BY (i.e. the perpendicular) field increased. Ideally it is desired for HTS tape with equal field directional characteristics (such as MGB2 wire) that the perpendicular and parallel field values are the same. HTS tape with a different field directional dependence will normalize as soon as the parallel or perpendicular field is exceeded.

Figure 33:
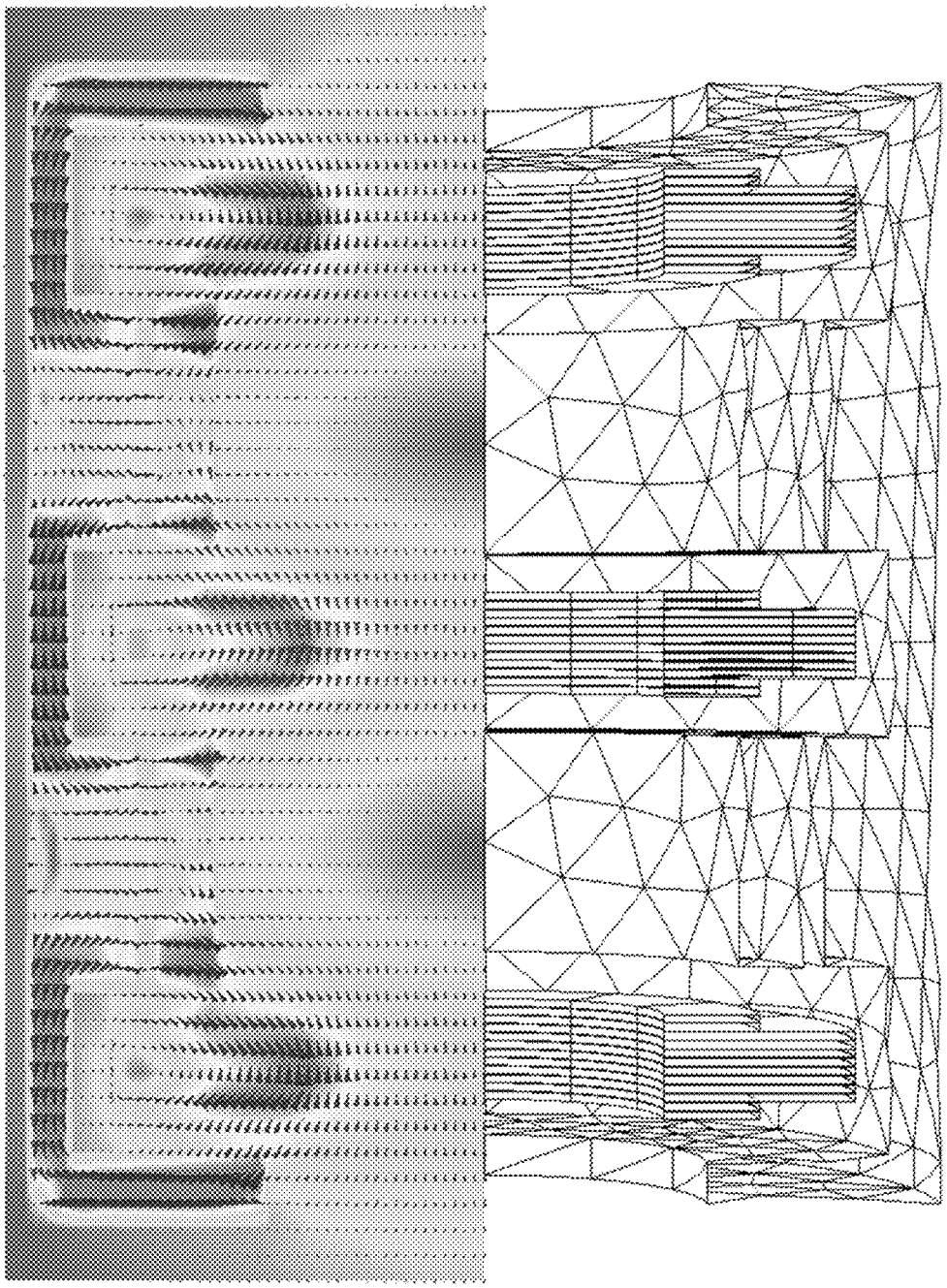
FIG. 33 is a model of the field profile for the arrangement of FIG. 32.

This version increases the ratio of superconducting coil wire length to power out by a half because the middle coil is effectively used for two engines. FIG. 33 is a plot of the magnetic field produced by the configuration of FIG. 32. Again it can be seen that the peak perpendicular and peak parallel field strengths for each magnetic element are very close.

Despite these gains a number of issues remain with this combination design of FIG. 26. Firstly the gains come at the cost of the increased amount of steel in the design which adds significantly to the weight of the final product. Higher operating fields become unobtainable due to the limited benefit of steel above 2 T. Finally, the field plots of these designs indicate that even with the compensation coils and significant amount of shielding there still remains a significant amount of field outside the flux guides where the brushes would have to sit in the physical construction of the electromagnetic turbine. If the field in the region of the brushes was uniform in one direction the effect on the metal fibre brushes could be minimised. Unfortunately the field modelling has shown that the component of the magnetic field detrimental to the performance of the metal fibre brushes will be above a practically allowable limit of 0.5 T in any practical orientation of the brush.

The desire to develop a practical Radial Electromagnetic Turbine coupled with the concerns over the ability of the metal fibre brushes or any sliding contact to operate reliably in the high fields of the designs of FIGS. 26 and 32 discussed above led to the development of the following arrangements.

Figure 34:
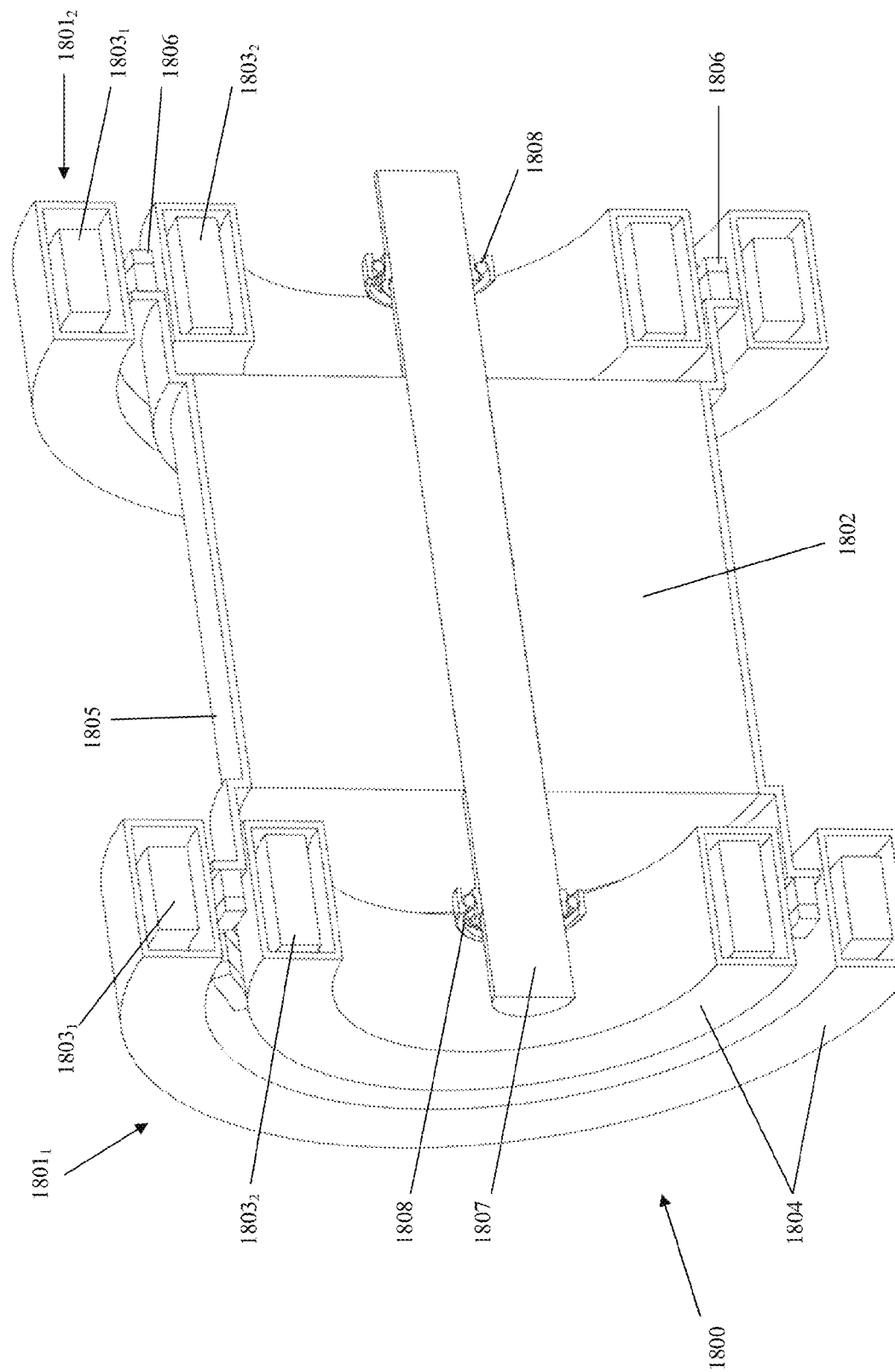
FIG. 34 is a cross-sectional view of one arrangement a turbine according to one embodiment of the present invention.

FIG. 34 depicts one possible arrangement of a radial drum type turbine 1800 according to one embodiment of the present invention. As shown the turbine 1800 includes a pair of opposing magnetic assemblies $1801_1$, $1801_2$ with drum 1802 positioned therebetween. Each of the magnetic assemblies $1801_1$, $1801_2$ includes a pair of coils an outer coil $1803_1$ and an inner coil $1803_2$. The coils are arranged concentrically about the axis of rotation of the drum 1802, i.e. the coils $1803_1$, $1803_2$ are co-axial with the rotational axis of the drum 1802. As shown each of the coils $1803_1$, $1803_2$ are encased in a cryogenic envelope 1804 which are inturn connected to cyro-cooler system.

As can be seen in this example the drum 1802 is a solid construction which includes an outer conductive layer 1805. A portion of the conductive layer extends into the gap between the coils $1803_1$, $1803_2$ and contacts brushes 1806 which pass current across the drum 1802. While in the present example the drum is shown as a solid construction it will of course be appreciated by those of skill in the art that the drum need not be a solid construction but could also formed using segmented bars etc.

As current is passed across brushes 1806 to the conductive layer of the drum torque is generated on the drum. The torque is transferred to the output shaft 1807 which passes through the drum and magnetic elements. The shaft is rotatably mounted on a pair of bearings 1808.

Figure 35:
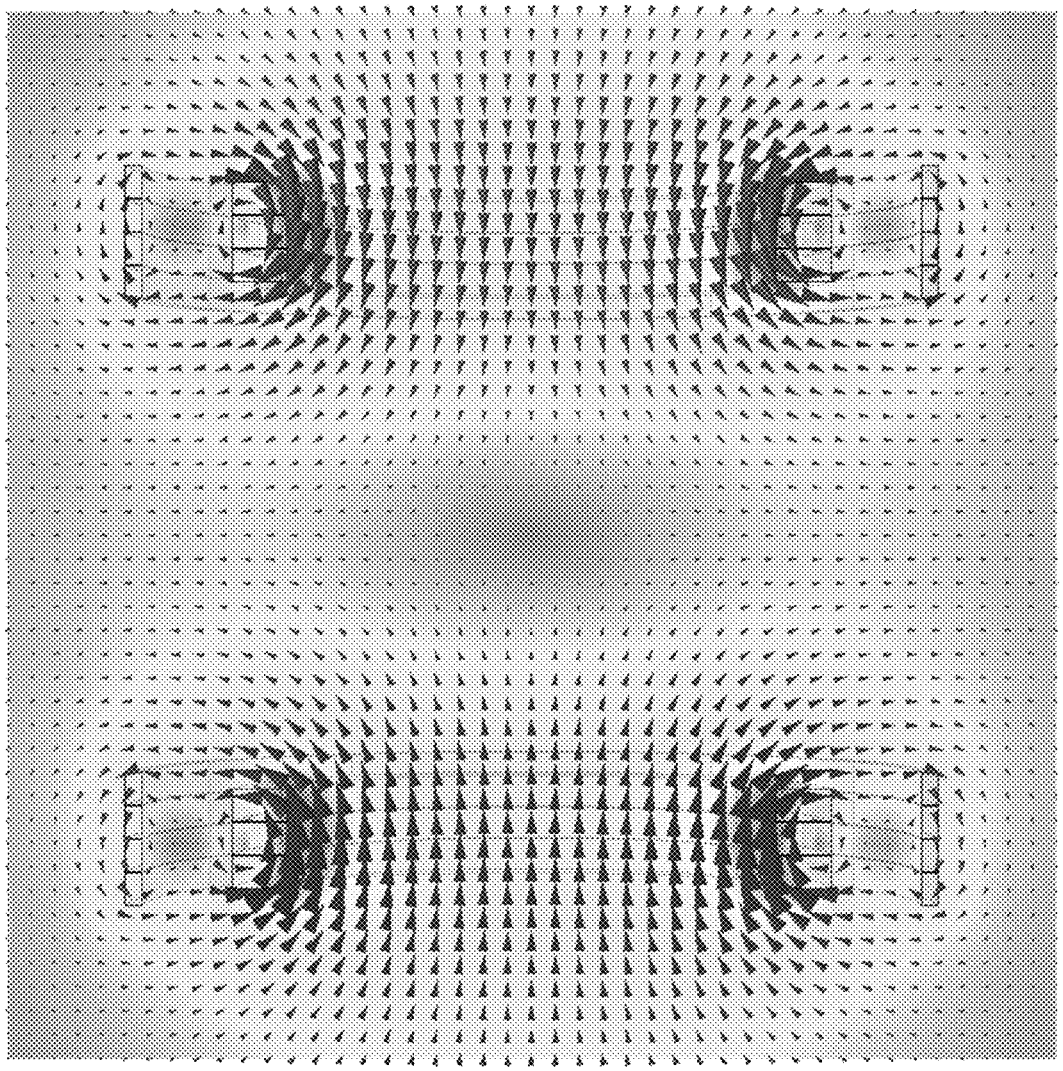
FIG. 35 is a model of the field profile for the arrangement of FIG. 34.
Figure 36:
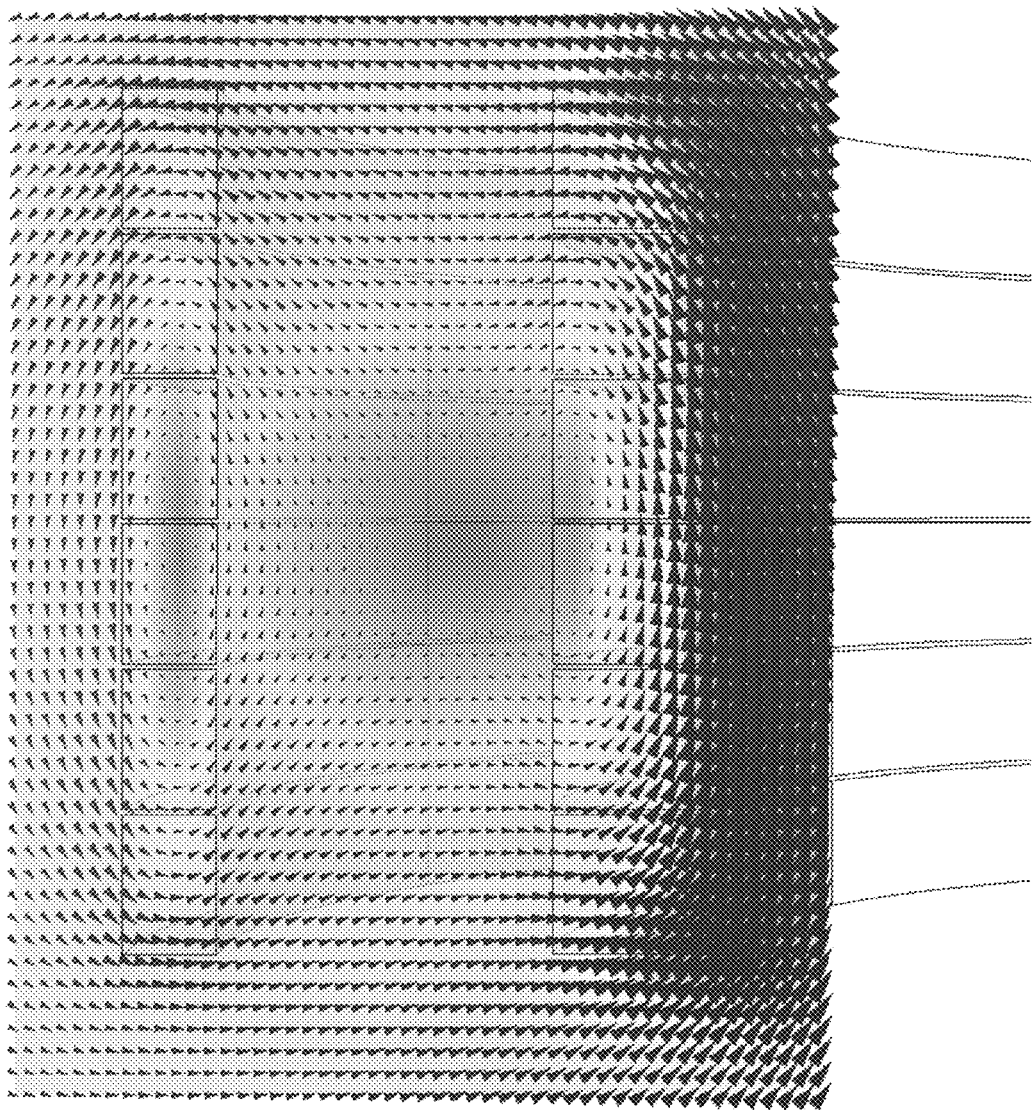
FIG. 36 is a model of the field profile of FIG. 35 showing the null field region in greater detail.

A plot of the field generated by the magnetic assemblies is shown in FIG. 35. As can be seen this arrangement of the superconducting coils creates a field null or region of field cancellation in the space between the inner and outer solenoids. A more detailed view of the null region can be seen in FIG. 36 which depicts the arrangement of the coils $1803_1$, $1803_2$ in further detail.

Figure 37A:
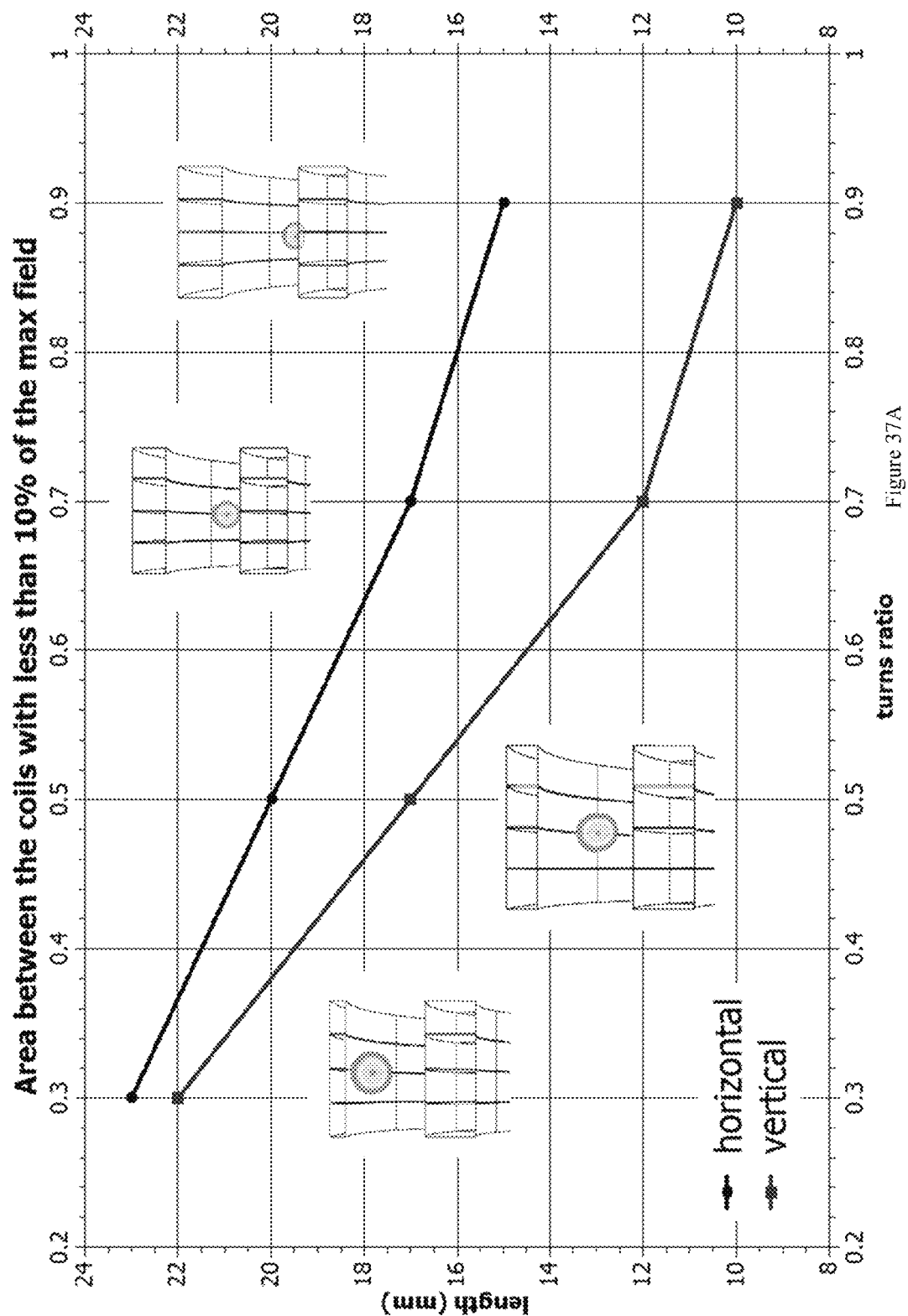
FIGS. 37A and 37B are plots depicting the effects on the null field region for various parameters of the turbine.
Figure 37B:
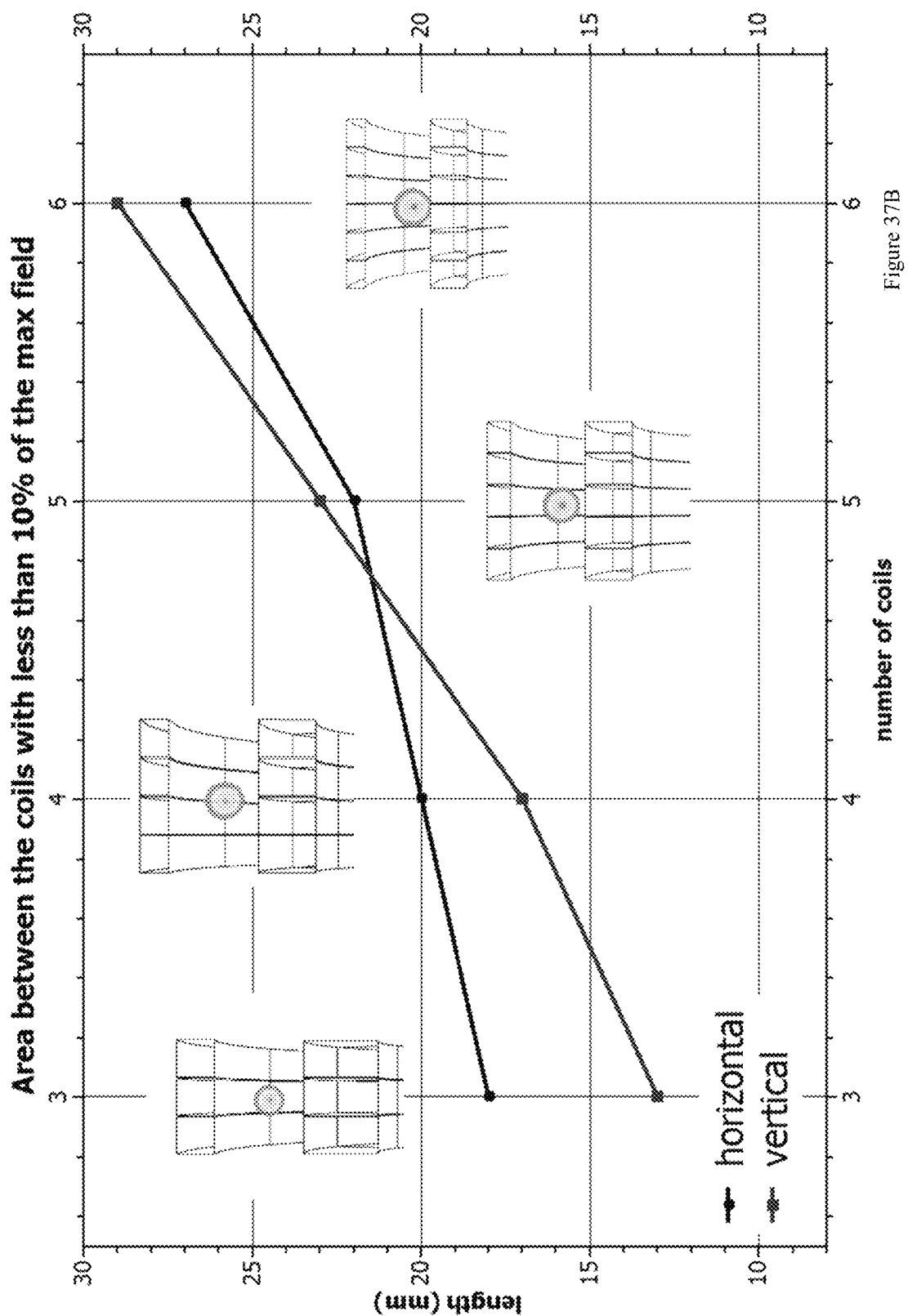

FIGS. 37A and 37B are plots depicting the effect of field strength based on differing geometries between the inner $1803_1$ and outer coils $1803_2$. FIG. 37A show the effect of the ratio of the inner and outer coil turns on the position and total area of the low field region. FIG. 37B shows the effect of increasing the number of coils or total length of the solenoid on the area of the low field region. Within this region the field strength is low enough (Less than 0.5 T) to allow for the practical operation of metal fibre brushes. The coil geometry is optimised so as to produce a straight drive field between the opposing pairs of coils and allow space for a cryostat around the superconducting coils.

Figure 38:
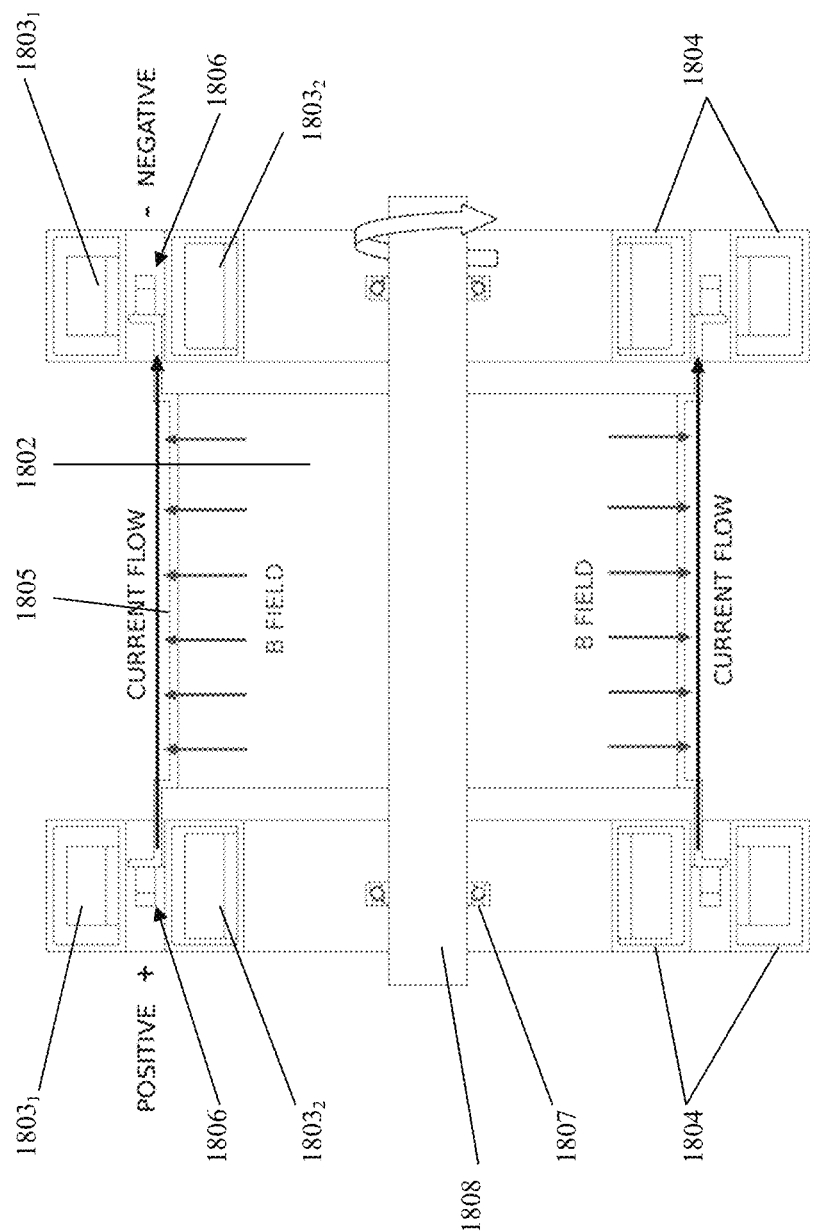
FIG. 38 is a cross sectional view of the turbine of FIG. 34 depicting the positioning of the brushes.

FIG. 38 depicts the positioning of the brushes in the context of the current flow in the drum of the radial turbine. The driving B field perpendicular to the current path is shown with blue arrows. Further refinements to the above concept include the addition of cancelling coils in order to further improve the ratio of the field strength in the inner radius of the inner coil and the field strength at the working radius. By reducing or cancelling the field in the null zone the use of liquid brushes also becomes possible. As the conductive fluid used in liquid brushes possess no inherent resistance to movement of the fluid due to the interaction of the current path through the fluid and the field in which the brush is immersed, it is important ensure liquid brushes are operating in a very low field environment.

There are a number of advantages of this dual coil radial electromagnetic turbine design these include low or null field area for brush operation in between the inner and outer coils. Moreover the positioning of the brushes in between the inner and outer solenoids enable much more of the total solenoid flux to be used in driving the turbine when compared to the pancake design. The cryostat of the pancake design prevented the working bar from using much of the flux generated by the coils. Now with the cryostat leaving a space for the brushes in between the coils almost all of the flux can be captured by the working bar. Optimised coil geometry can produce large radial field on the working bar. Finally, the null field region ideally suited to liquid brushes.

Figure 39:
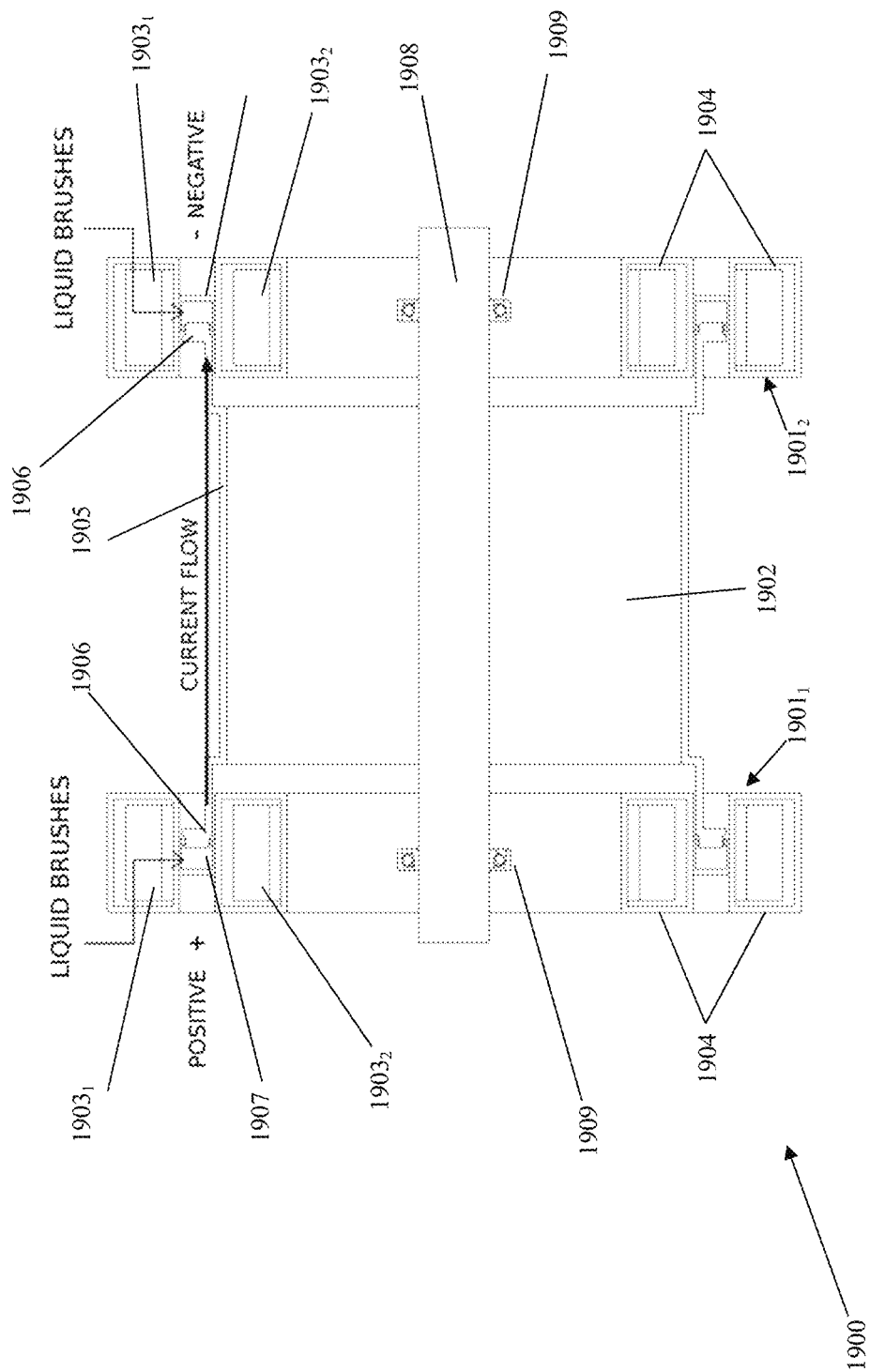
FIG. 39 is a cross-sectional view of one arrangement a turbine according to one embodiment of the present invention.

FIG. 39 depicts one possible layout that allows for the possibility of using liquid brushes instead of metal fibre brushes. As shown the turbine is a similar construction to that of FIG. 34 above. Again the turbine includes a pair of opposing magnetic assemblies $1901_1$, $1901_2$ with drum 1902 positioned therebetween. Each of the magnetic assemblies $1901_1$, $1901_2$ includes a pair of coils an outer coil $1903_1$ and an inner coil $1903_2$. The coils are arranged concentrically about the axis of rotation of the drum 1902, i.e. the coils $1903_1$, $1903_2$ are co-axial with the rotational axis of the drum 1902. As shown each of the coils $1903_1$, $1903_2$ are encased in a cryogenic envelope 1904 which are in turn connected to cyro-cooler system.

As can be seen in this example the drum 1902 is a solid construction which includes an outer conductive layer 1905. A portion of the conductive layer extends into the gap between the coils $1903_1$, $1903_2$. The conductive layer in this instance includes a projection 1906 which engages a channel within a conductive ring 1907 as shown the conductive ring includes a fluid which transfers current to the conductive layer of the drum.

As current is passed across the conductive layer of the drum torque is generated on the drum. The torque is transferred to the output shaft 1908 which passes through the drum and magnetic elements. The shaft is rotatably mounted on a pair of bearings 1909.

Figure 40:
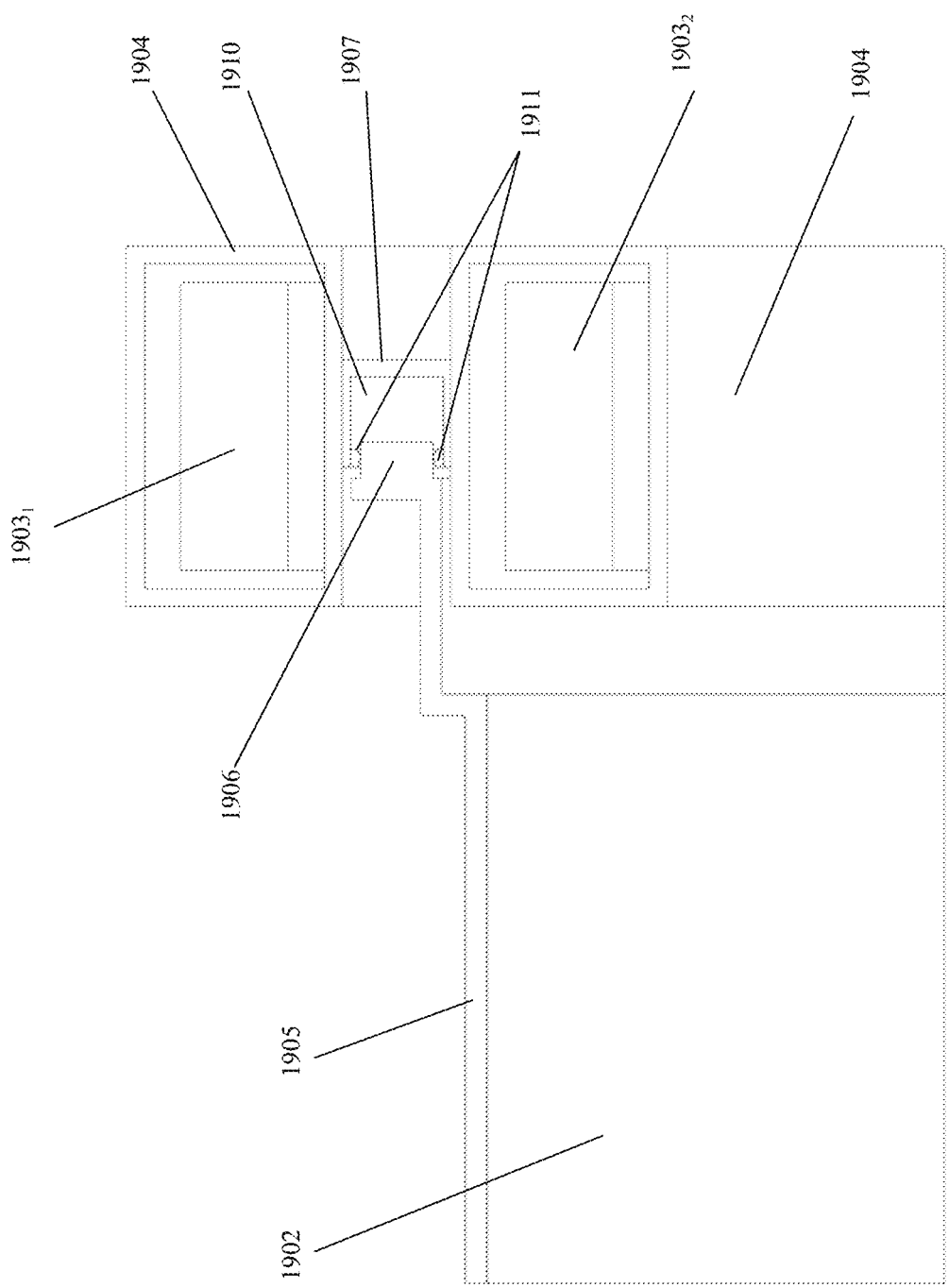
FIG. 40 is a cross sectional view of the turbine of FIG. 39 depicting the construction of the fluid current transfer mechanism.

FIG. 40 shows the interconnection of the conductive ring 1907 and the conductive layer 1905 of the drum in further detail. As shown the projection 1906 extends outwardly from the end face of the conductive layer 1905. The projection 1906 is inserted into channel 1910 of the conductive ring 1907. As can be seen the projection is inserted into the channel 1910 past seals 1911 thereby providing a fluid tight seal. It will of course be appreciated by those of skill in the art that given the construction of the fluid current transfer mechanism of FIGS. 39 and 40 that the fluid may be introduced into the fluid channel 1910 once the projection 1906 is within channel 1910 and engaged with the seals 1911. In such instances the conductive disc 1907 may include a sealable fluid port to allow for the injection of fluid into the fluid channel 1910. It will also be appreciated by those of skill in the art that the conductive fluid may be any suitably stable conductive fluid such as sulphuric acid, hydrochloric acid or other suitable acids, sodium hydroxide, sodium chloride, sliver nitrate, potassium hydroxide or other suitable ionic or electrolytic fluids. In some instances the fluid may be a metal in liquid phase such a mercury, Wood's metal, Rose's metal; Field's metal, Bi—Pb—Sn—Cd—In—Tl, gallium, NaK, GaInSn.

Figure 41:
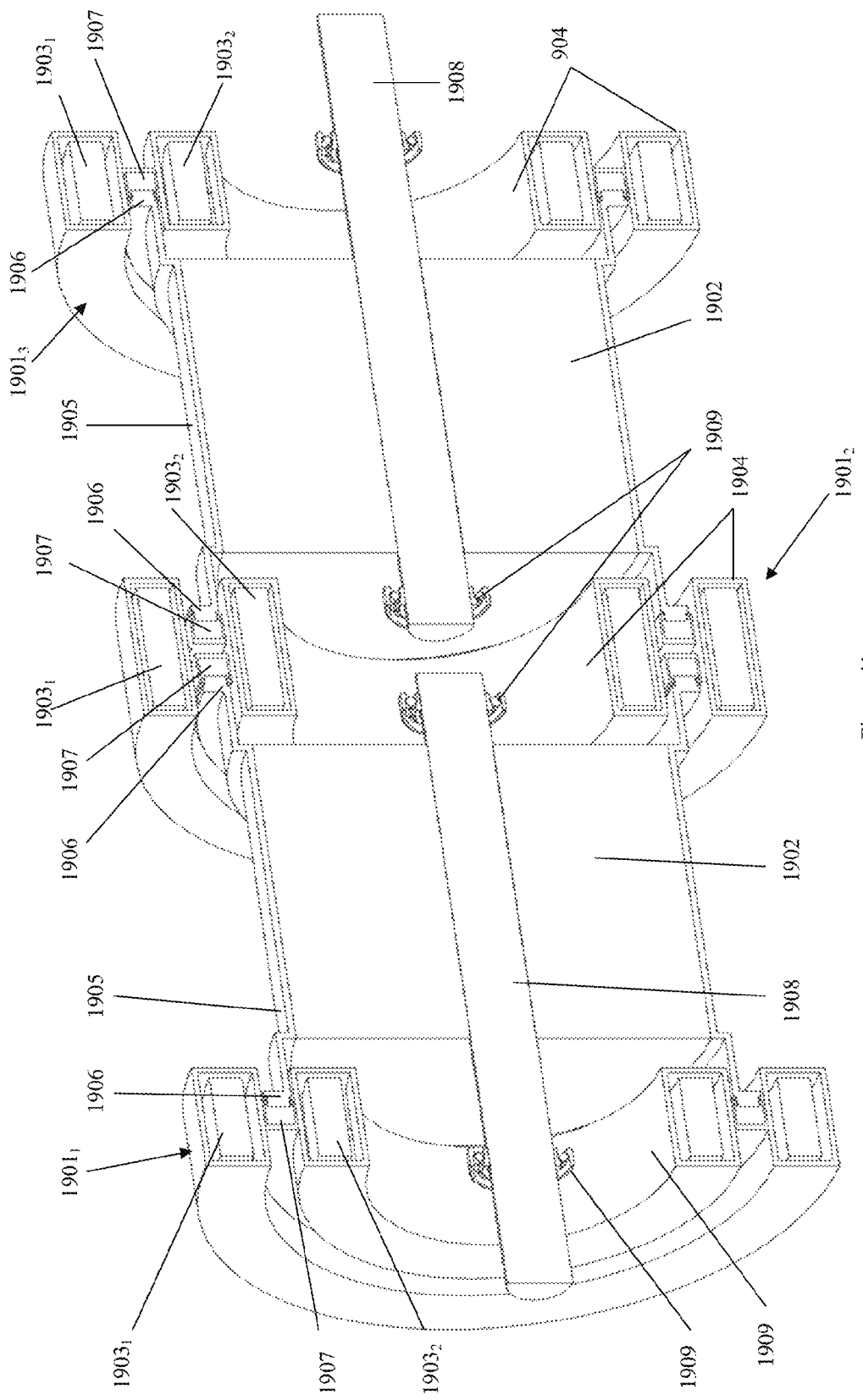
FIG. 41 is a cross-sectional view of one arrangement a turbine according to one embodiment of the present invention.

FIG. 41 depicts a further possible arrangement of a turbine according to one embodiment of the present invention. In this example an additional magnetic assembly $1901_3$ is utilised. Again each of the magnetic assemblies $1901_1$, $1901_2$ and $1901_3$ includes a pair of coils an outer coil $1903_1$ and an inner coil $1903_2$. Each turbine again includes a solid drum 1902 having an outer conductive layer 1905. A portion of the conductive layer extends into the gap between the coils $1903_1$, $1903_2$. The conductive layer in this instance includes a projection 1906 which engages a channel within a conductive ring 1907. As shown the conductive ring includes a fluid which transfers current to the conductive layer of the drum.

Figure 42:
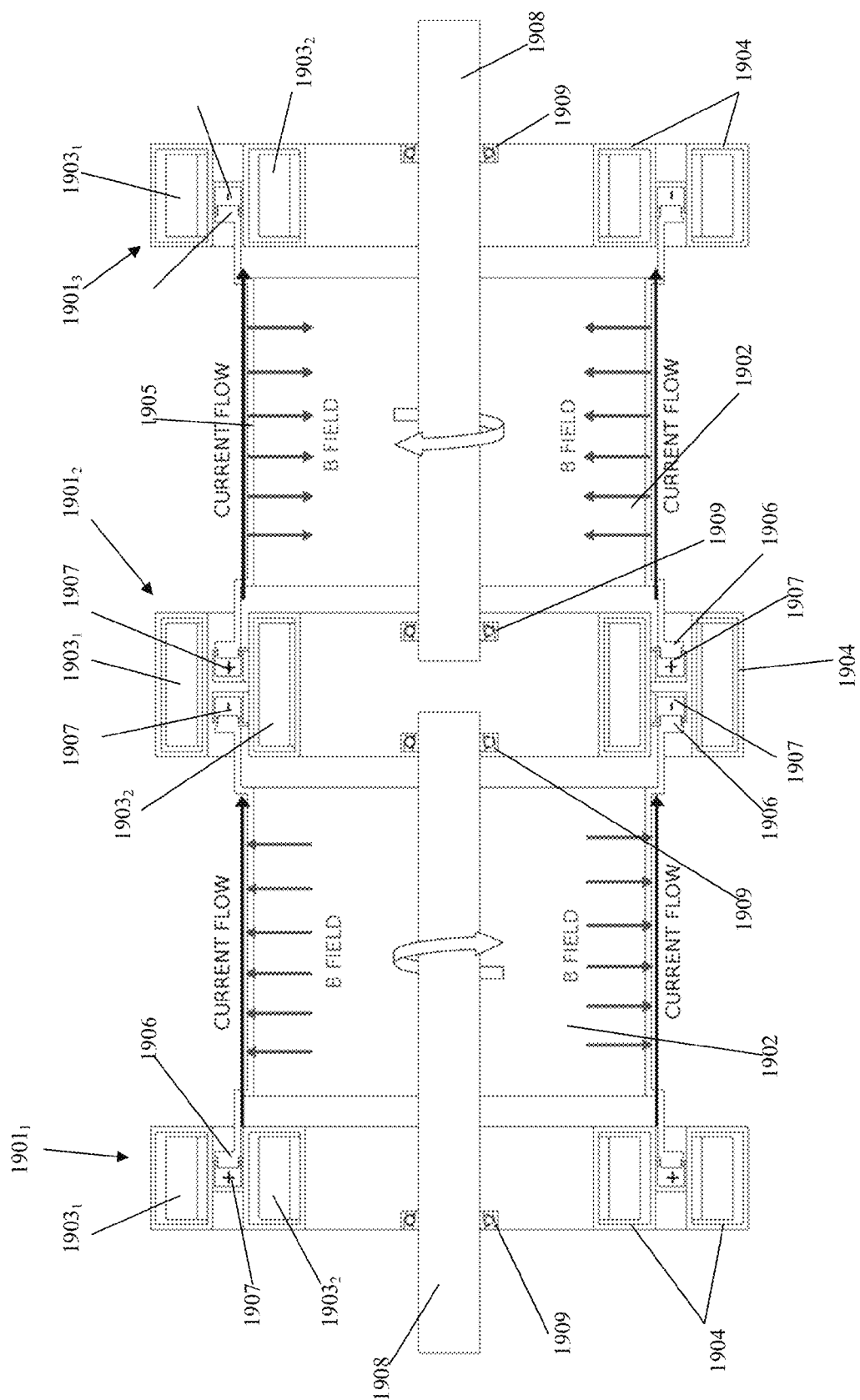
FIG. 42 is a cross-sectional view of the turbine of FIG. 41 configured for counter rotation.
Figure 43:
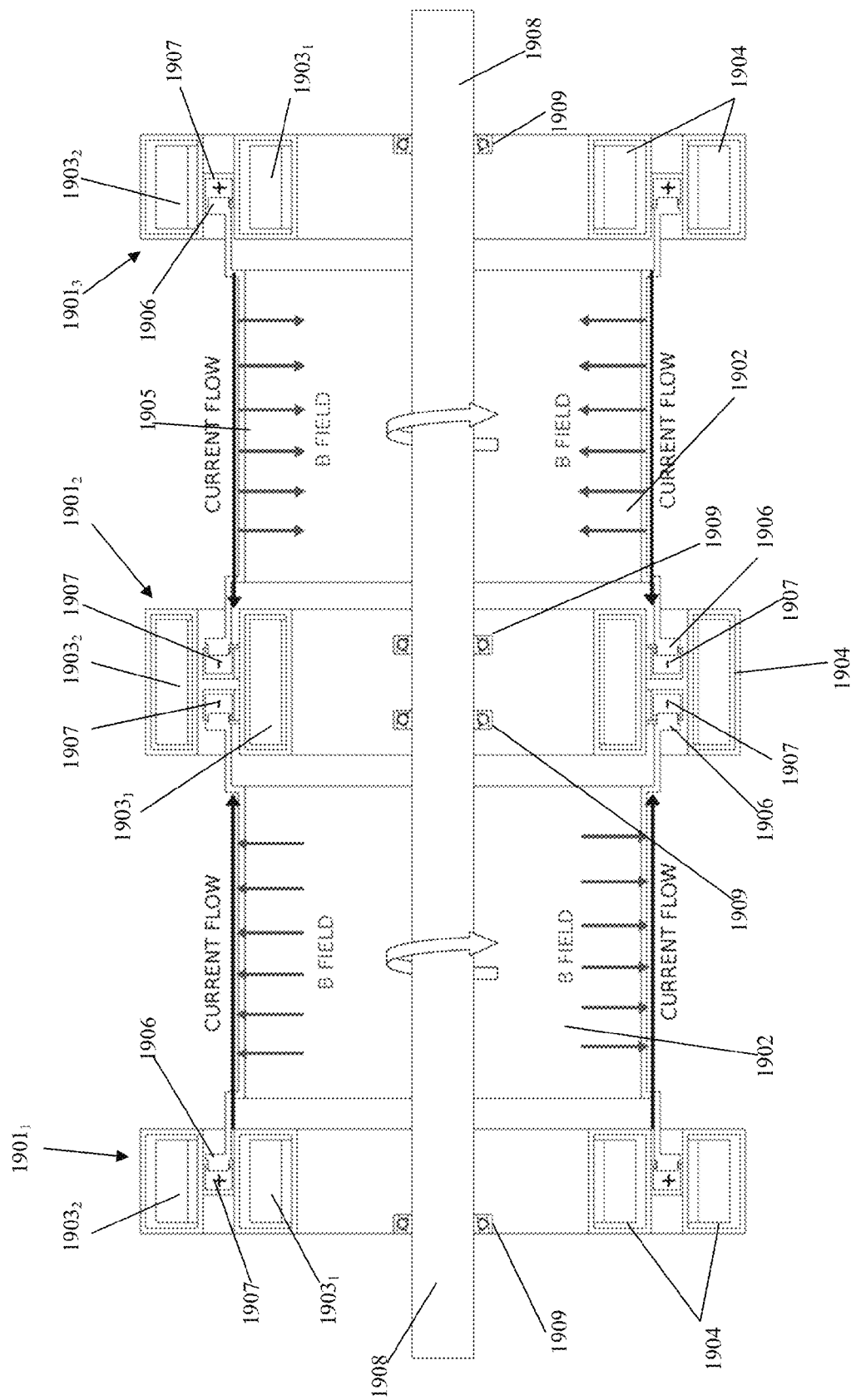
FIG. 43 is a cross-sectional view of the turbine of FIG. 41 configured for unitary rotation.

As current is passed across the conductive layer of the drum torque is generated on the drum. The torque is transferred to the output shaft 1908 which passes through the drum and magnetic elements. The shaft is rotatably mounted on a pair of bearings 1909. Depending on the current direction in the rotor the two rotor shafts can rotate in the same or opposite directions. FIG. 42 depicts the polarities of the brushes/fluid transfer assemblies for a counter rotating configuration while FIG. 43 depicts the polarities of the brushes/fluid transfer assemblies for unitary rotation. In the case of the turbine of FIG. 42 two separate shafts are utilised while the turbine of FIG. 43 utilises a single unitary shaft.

The use of the additional magnetic elements increases the power output from the motor and provides the option of counter rotating shafts. Another advantage to this layout is also a more efficient use of the superconducting wire as the power can be increased by a factor of two without necessarily having to double the amount of superconducting wire used.

As can be seen from the above examples the creation of a region of null field allows for the operation of metal fibre brushes without undergoing undue deformation of the brush material due to adverse loading on the metal fibre strands. It also enables the use of liquid metal brushes. Like metal fibre brushes, liquid metal brushes have a similar loading. The presence of a Lorentz force on the current path of a liquid metal brush operating in a high magnetic field environment can result in eddy formation with the liquid metal. The formation of these eddies corresponds with the reduction in current carrying capacity seen in prototype brushes operating in high field environments.

Consequently the creation and optimisation of the null field is important to enable liquid metal brushes to function correctly. The applicant has devised a number of different arrangements of superconducting coils to create a region of no or very little magnetic field in which the brushes can operate and to increase the strength of the magnetic field along the working length of the drum torque elements.

Figure 44:
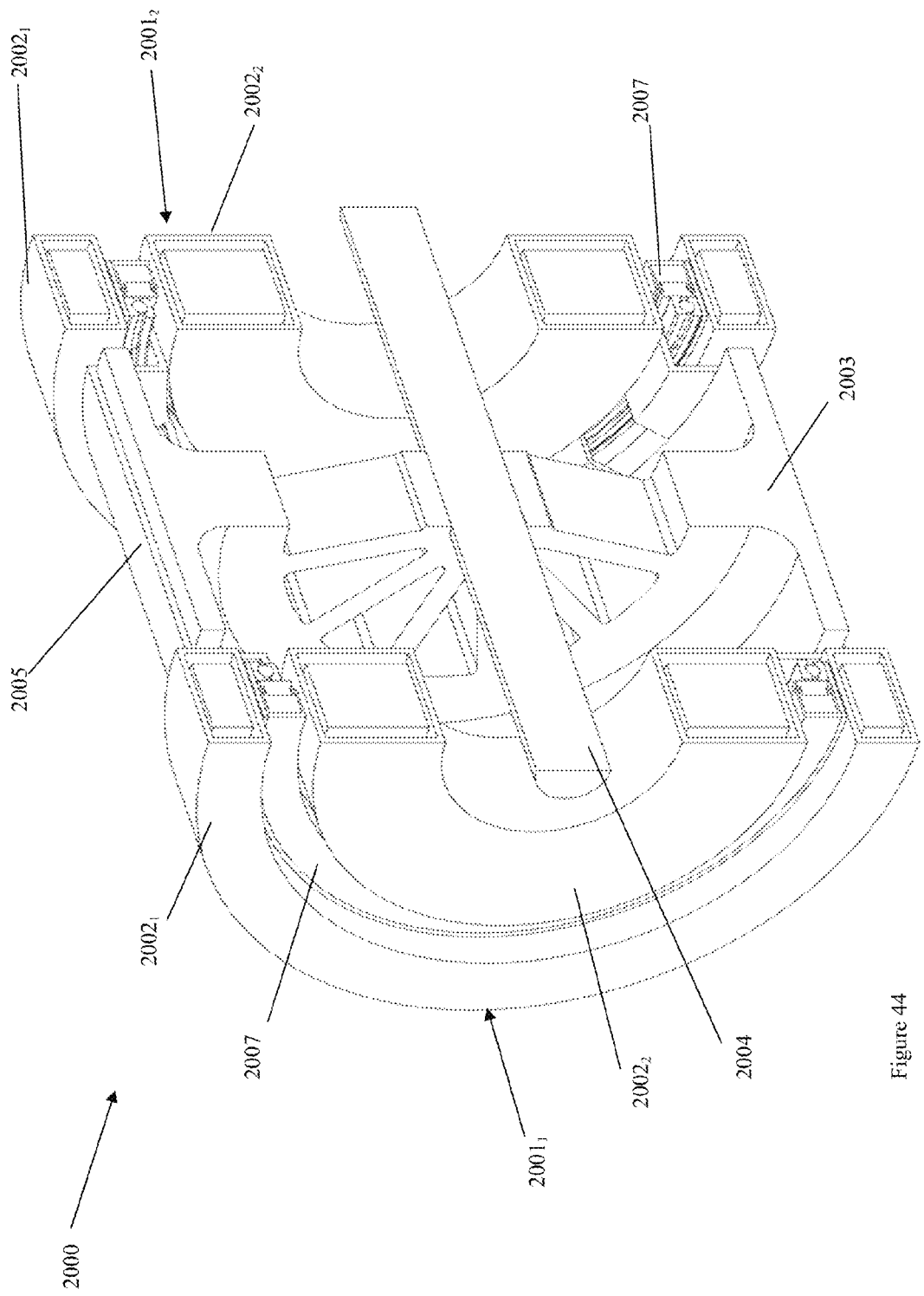
FIGS. 44 and 45 are cross-sectional views of one arrangement a turbine according to one embodiment of the present invention.

FIG. 44 depicts one implementation of a turbine 2000 utilising a pair of magnetic assemblies $2001_1$, $2001_2$. Again each of the magnetic assemblies $2001_1$, $2001_2$ include a pair of coils an outer coil $2002_1$ and an inner coil $2002_2$. The turbine includes a rotor assembly 2003 mounted on shaft 2004, the rotor assembly 2003 having an outer conductive layer 2005. A portion of the conductive layer 2005 extends into the gap between the coils $2002_1$, $2002_2$. The conductive layer in this instance includes a projection 2006 which engages a channel 2009 within conductive rings 2007 disposed within the gap between the coils $2002_1$, $2002_2$.

Figure 45:
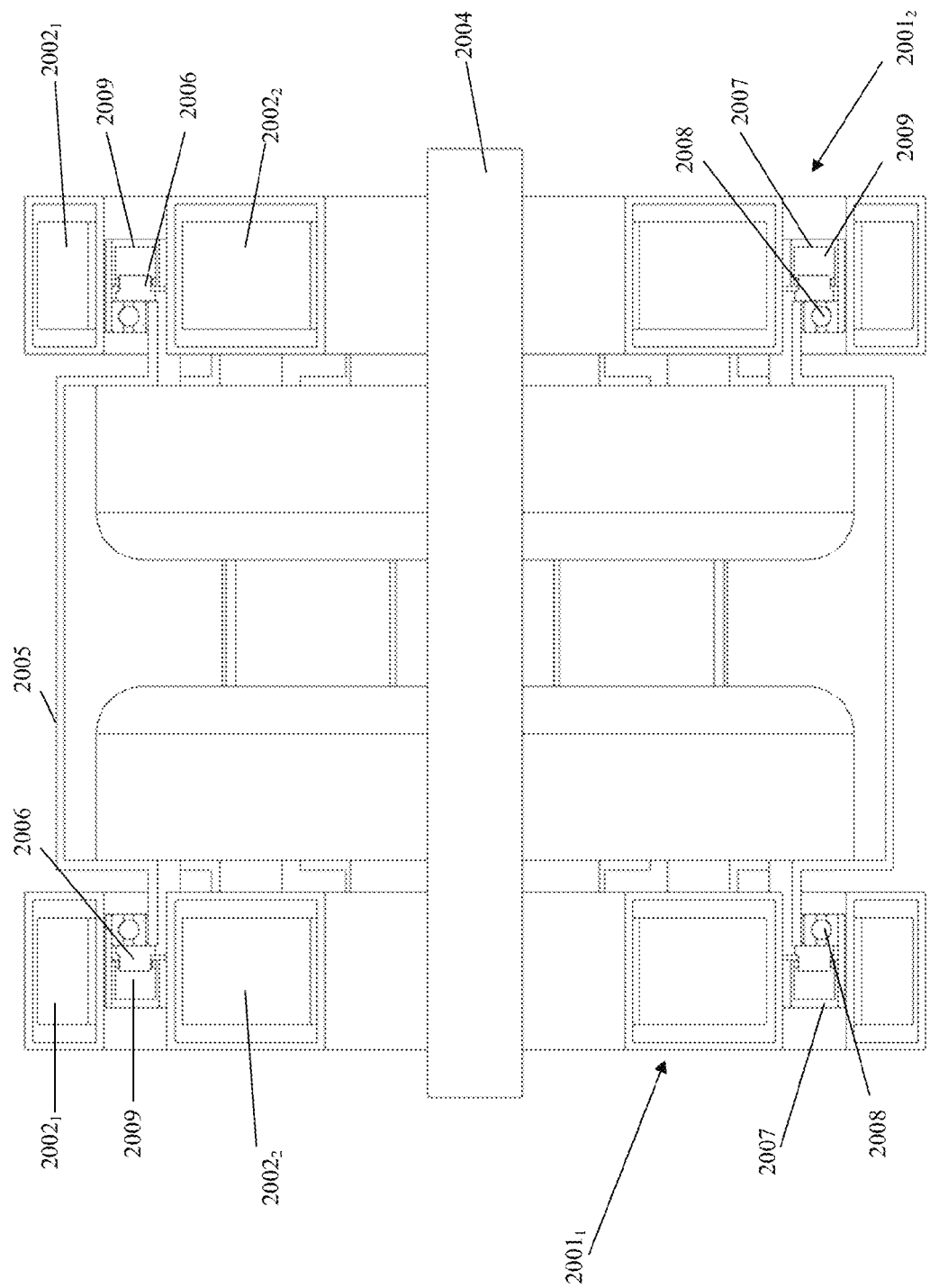

A more detailed view of the arrangement of the conductive elements is shown in FIG. 45. As can be seen in this example the conductive rings 2007 include a fluid which transfers current to the conductive layer of the drum 2005. Bearings 2008 are provided between the conductive layer and the outer solenoid to ensure proper alignment and smooth rotation as of the conductive layer of the drum 2005 as the rotor assembly 2003 rotates on shaft 2004. It will of course be appreciated by those of skill in the art that the bearings 2008 in this case are non-magnetic given their proximity to a large magnetic field.

The current in both coils $2002_1$, $2002_2$ in the turbine depicted in FIGS. 44 and 45 flows in the same direction. This produces a region of field cancellation in between the inner and outer coils. As can be seen this particular implementation readily allows for brush placement of either metal fibre or liquid metal style brushes while maximising the working length of the drum element with sufficient space for the cryogenic envelope.

Figure 46:
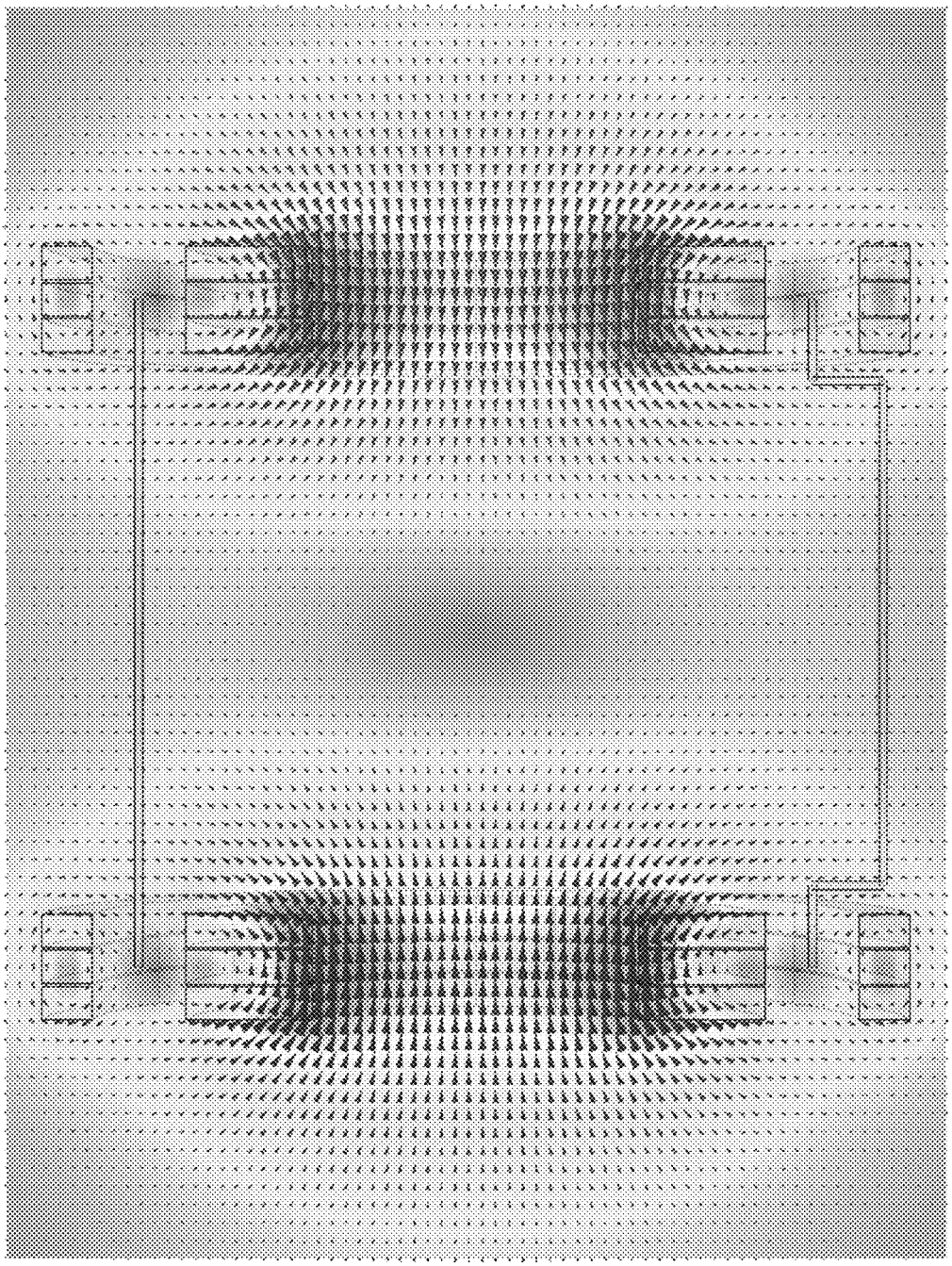
FIG. 46 is a model of the field profile for the arrangement of FIGS. 44 and 45

A plot of the generated by the magnetic assemblies of the turbine of FIGS. 44 and 45 is shown in FIG. 46. As can be seen this arrangement of the superconducting coils creates a field null or region of field cancellation in the space between the inner and outer solenoids.

Figure 47:
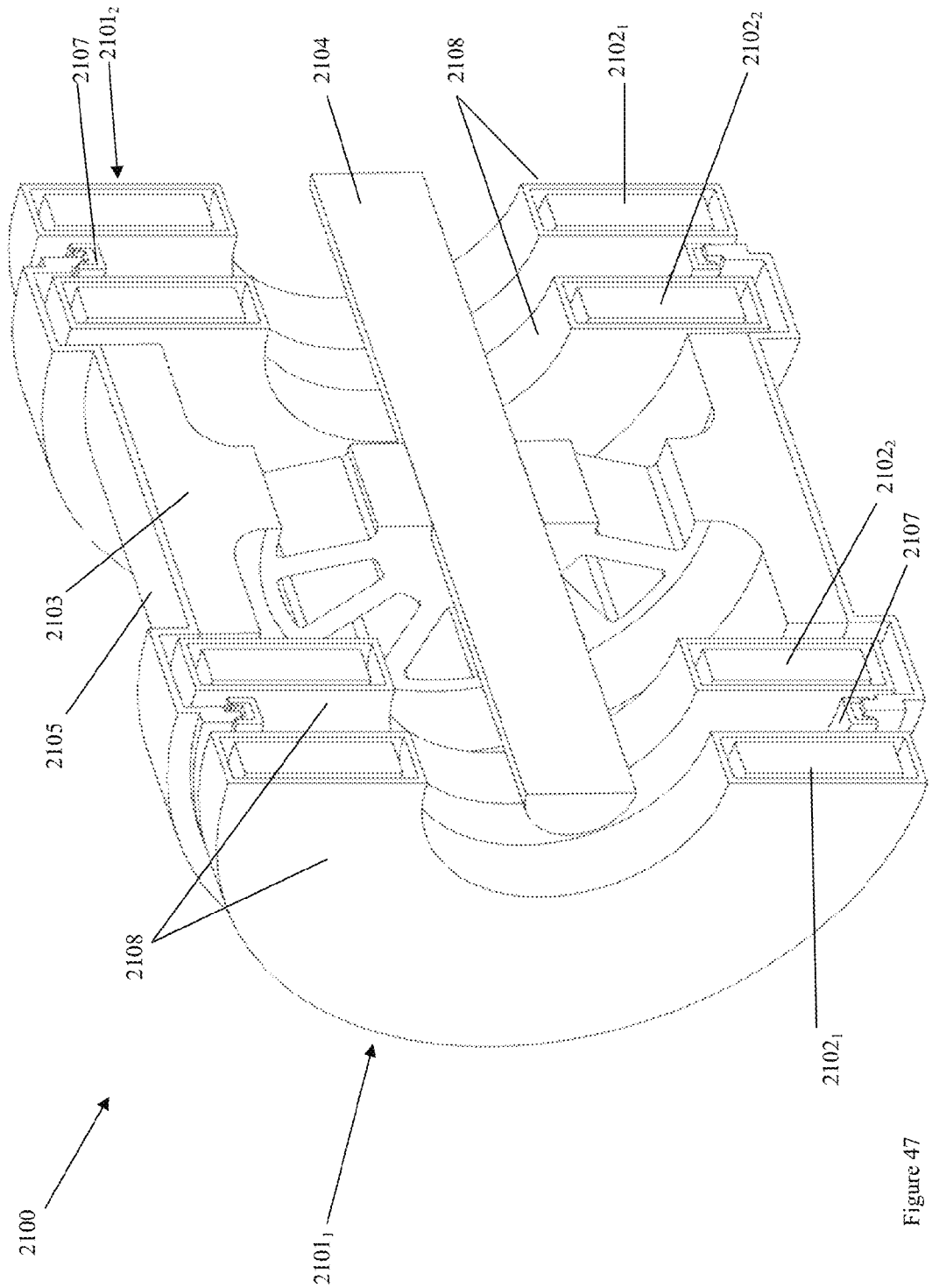
FIGS. 47 and 48 are cross-sectional views of one arrangement a turbine according to one embodiment of the present invention.

FIG. 47 depicts another possible arrangement of a turbine 2100 according to one embodiment of the present invention. In this particular implementation the magnetic assemblies $2101_1$, $2101_2$ are constructed from two superconducting coils $2102_1$, $2102_2$ arranged side-by-side to produced the field null in between the coils. The coils $2102_1$ and $2102_2$ in this case are encased by cryogenic bodies 2108. As can be seen the rotor assembly 2103 in this instance is positioned on shaft 2104 between the inner most coils $2102_2$ of the magnetic assemblies $2101_1$, $2101_2$. The rotor assembly 2103 includes an outer conductive layer 2105 which includes a projection 2106 which engages a channel 2109 within conductive rings 2107 disposed within the gap between the coils $2102_1$, $2102_2$.

Figure 48:
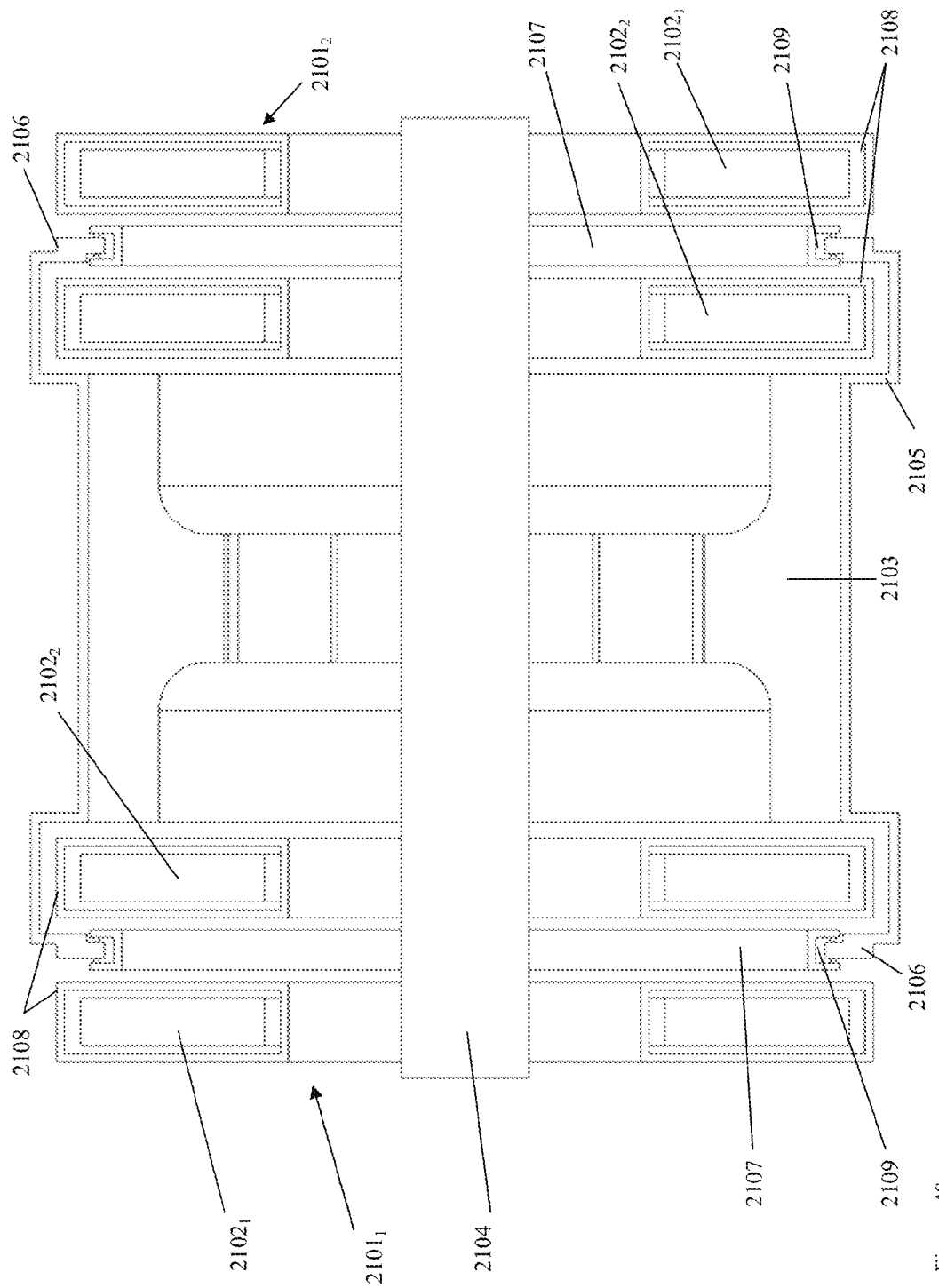

As can bee seen from FIG. 48 the conductive layer 2105 is shaped to extend over the cryogenic body 2108 of the inner coils $2102_2$. The projection 2106 is then engaged with channel 2109 of the within conductive rings 2107. As shown the channel 2109 is again filled with a fluid which transfers current across the conductive layer of the rotor assembly 2103.

Figure 49:
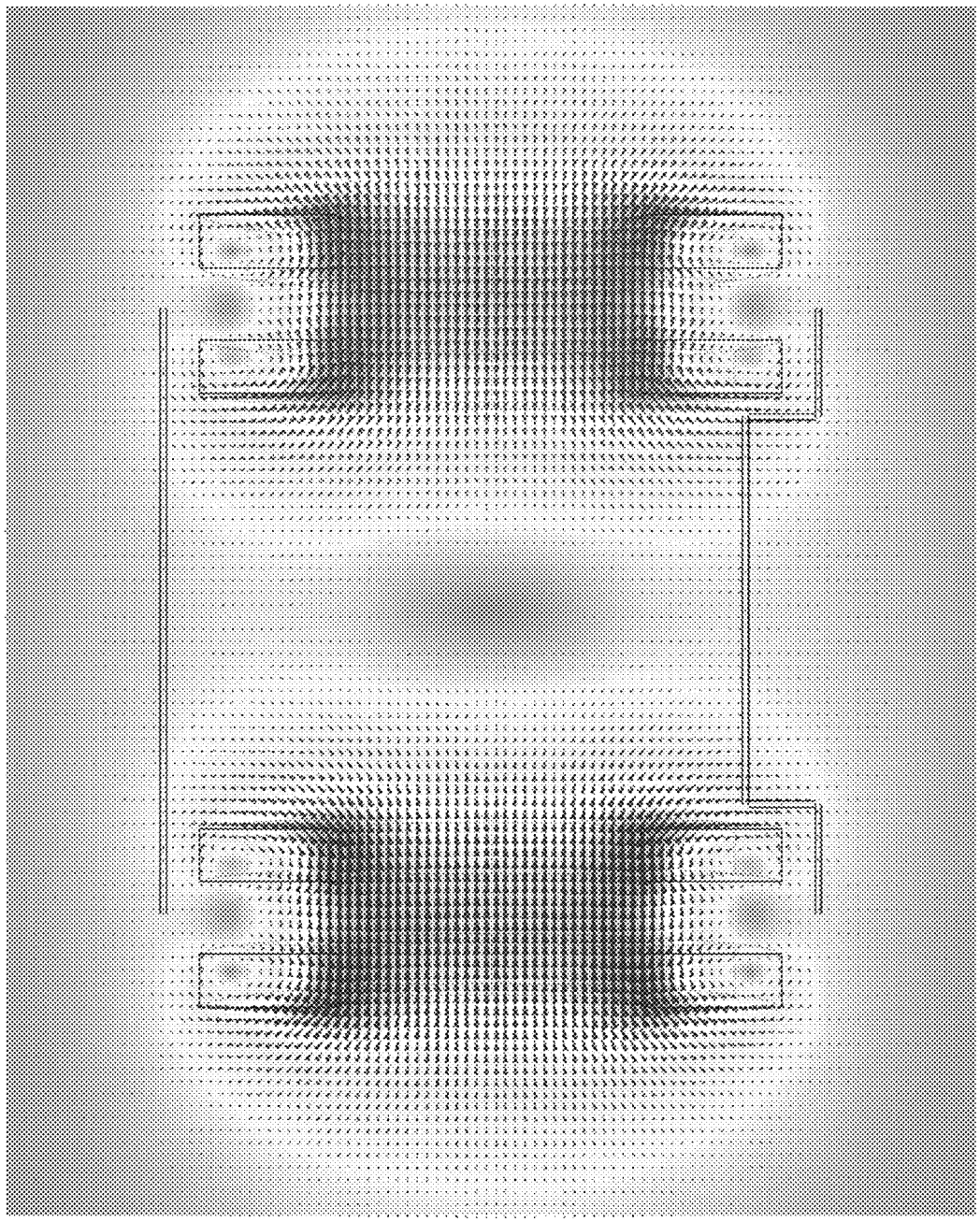
FIG. 49 is a model of the field profile for the arrangement of FIGS. 47 and 48

A plot of the generated by the magnetic assemblies of the turbine of FIGS. 47 and 48 is shown in FIG. 49. As can be seen this arrangement of the superconducting coils creates a field null or region of field cancellation in the space between the coils $2102_1$, $2102_2$.

Figure 50:
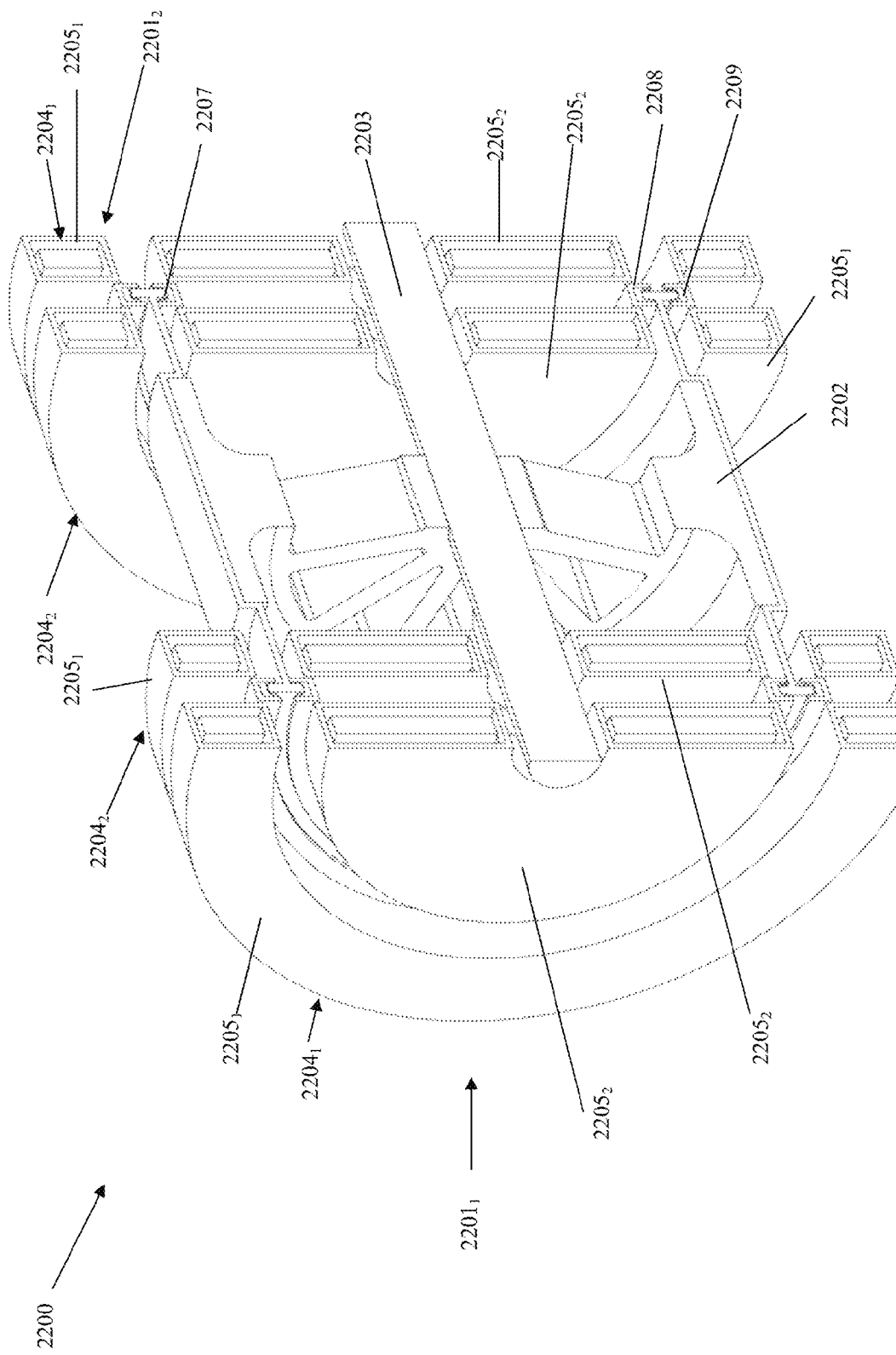
FIGS. 50 and 51 are cross-sectional views of one arrangement a turbine according to one embodiment of the present invention.
Figure 51:
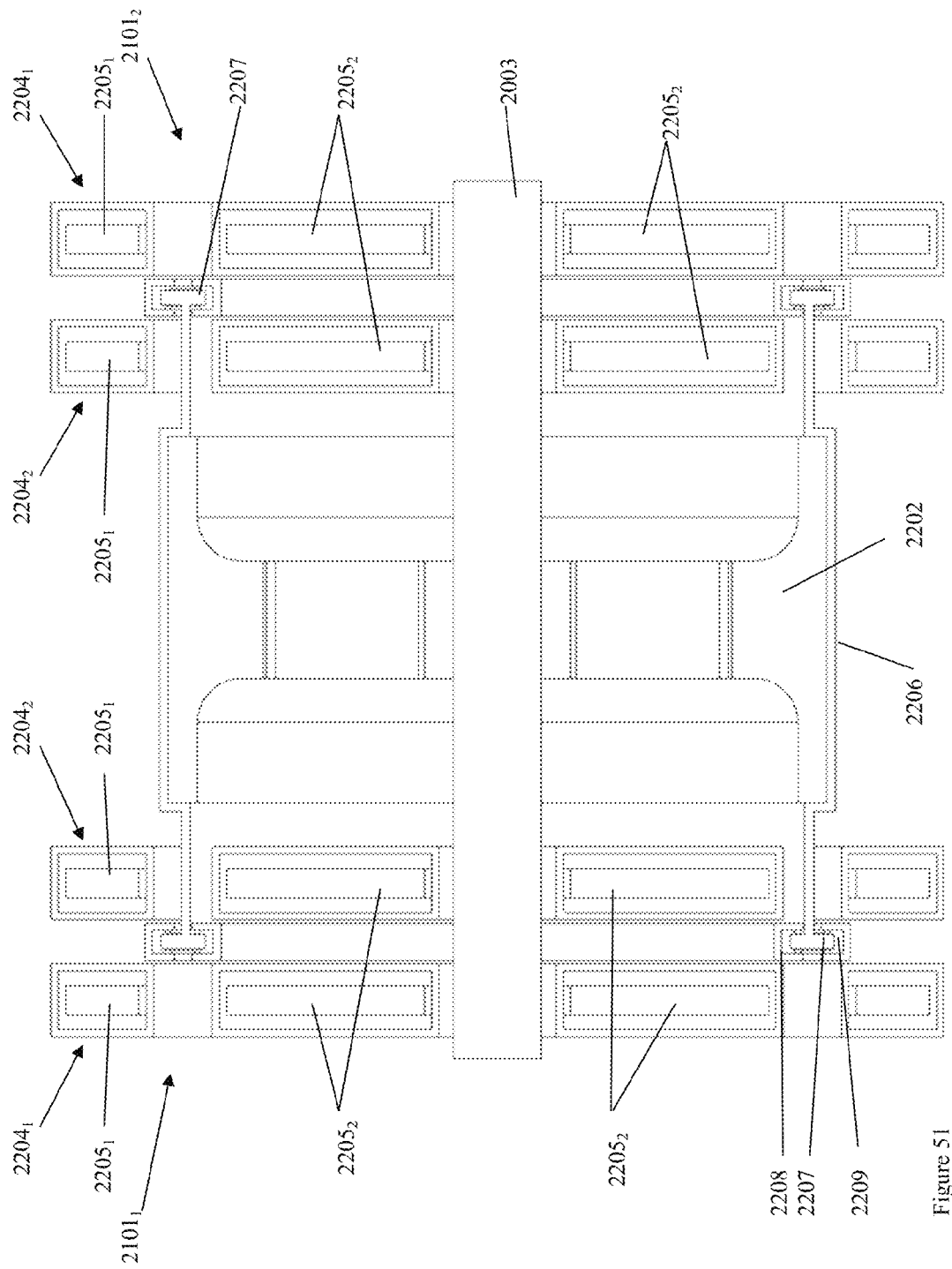

A further possible arrangement of a turbine 2200 according to one embodiment of the present invention is shown in FIGS. 50 and 51. As can be seen in FIG. 50 the turbine includes a pair of magnetic assemblies $2201_1$, $2201_2$ with a rotor 2202 assembly positioned on shaft 2203 disposed therebetween. The magnetic assemblies $2201_1$, $2201_2$ in this case are each composed inner $2204_1$ and outer $2204_2$ coil pairs arranged in a side by side configuration. The coils $2205_1$ and $2205_2$ of each coil pair $2204_1$, $2204_2$ are arranged concentrically with a gap disposed therebetween.

Again the rotor assembly 2202 includes an outer conductive layer 2206 which includes a projection 2207 which engages a channel 2208 within conductive rings 2209 disposed within the gap between the inner $2204_1$ and outer $2204_2$ coil pairs. As can be seen form FIG. 51 the conductive layer 2206 extends through the gaps disposed between coils $2205_1$ and $2205_2$ of the inner $2204_1$ coil pairs such that projection 2207 is positioned within channel 2208 of the conductive rings 2209. As in the above examples the channel 2208 is again filled with a fluid which transfers current across the conductive layer of the rotor assembly 2206.

Figure 52:
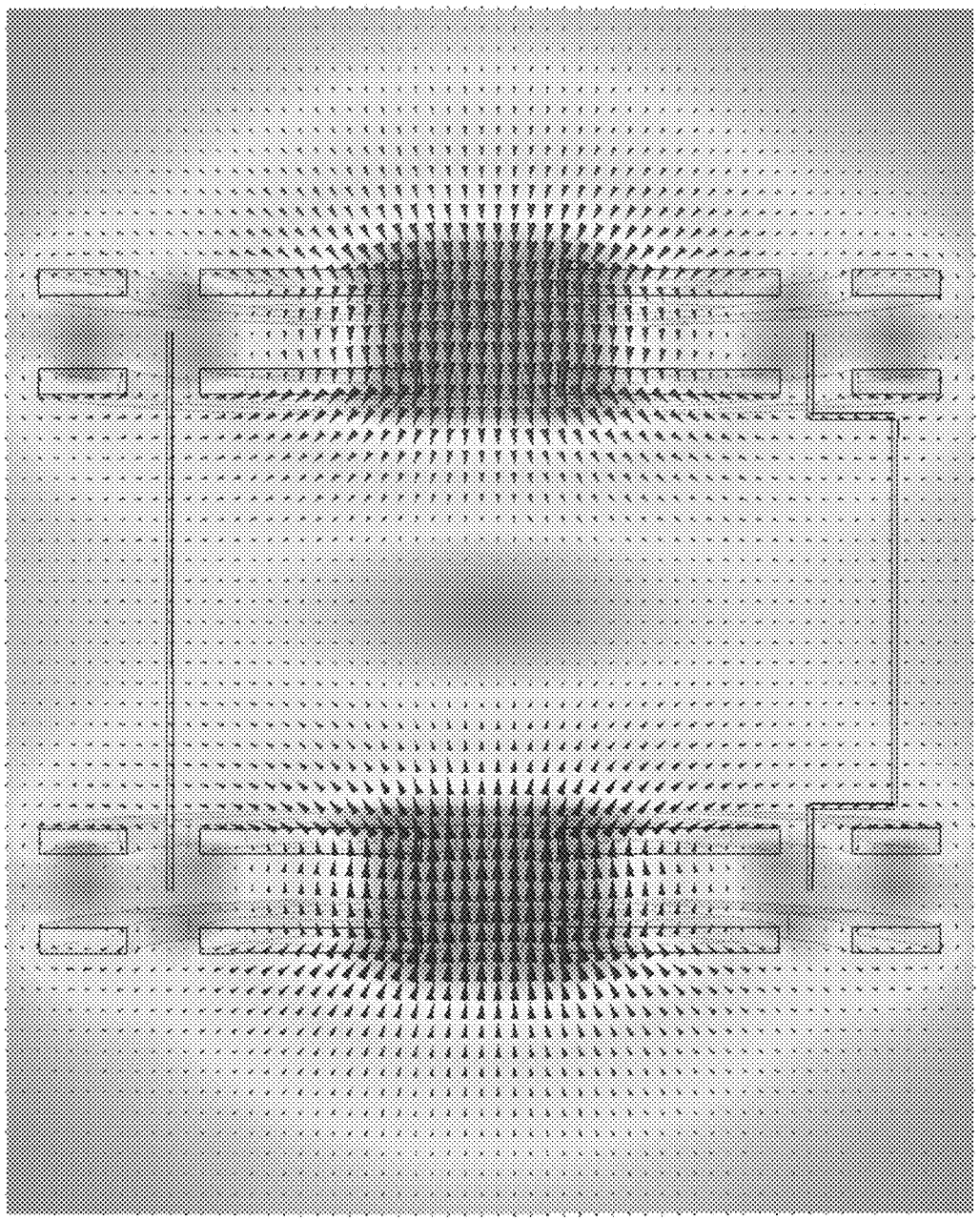
FIG. 52 is a model of the field profile for the arrangement of FIGS. 44 and 45

A plot of the generated by the magnetic assemblies of the turbine of FIGS. 50 and 51 is shown in FIG. 52. As can be seen this arrangement of the superconducting coils creates a pair of null regions in the region between the inner $2204_1$ and outer $2204_2$ coil pairs. This arrangement enables double the number of brushes and therefore double the current to be delivered to the rotor assembly 2202. However given the complex arrangement of the coils the complexity of the cytostatic system required is also significantly increased.

It is to be understood that the above embodiments have been provided only by way of exemplification of this invention, and that further modifications and improvements thereto, as would be apparent to persons skilled in the relevant art, are deemed to fall within the broad scope and ambit of the present invention described herein.

The invention claimed is:

1. A turbine, said turbine including:
   at least one pair of longitudinally spaced apart magnetic elements;
   a drum assembly positioned between the magnetic elements, the drum assembly including at least one conductive element,
   wherein the at least one pair of longitudinally spaced apart magnetic elements is arranged to (a) provide a region of working magnetic field between the at least one pair of spaced apart magnetic elements and (b) define regions of null magnetic field positioned outside the region of working magnetic field, at least a part of the current transfer mechanism located in at least one of the regions of null magnetic field and at least one conductive element of the drum assembly is located at least partially within the region of working magnetic field such that application of current through the at least one conductive element via said current transfer mechanism causes rotation of the drum.

2. The turbine of claim 1, wherein the drum assembly is one of a plurality of drum assemblies each positioned between a respective pair of magnetic elements, each drum assembly including one or more conductive elements disposed about the respective drum assembly wherein the one or more conductive elements are connected to form an electrical circuit through each drum assembly and wherein the drum assemblies are electrically coupled together to form a current path through the turbine; and
   wherein application of current through the current path causes the drum assemblies to rotate in unison about an axis of rotation.

3. The turbine of claim 1, wherein the drum assembly includes:
   a first drum and a second drum positioned between the magnetic elements for rotation about a common axis, the first drum including one or more conductive elements disposed about the drum and the second drum including one or more conductive elements disposed radiating from the axis, the conductive elements of the second drum located closer to the magnetic elements than those of the first drum;
   wherein the conductive elements are connected to form an electrical circuit through the drum assembly and wherein the first and second drums are electrically coupled together to form a current path through the turbine; and
   wherein application of current through the current path causes the drum assembly to rotate about the common axis of rotation and wherein the conductive elements of the first drum are located in a portion of the magnetic field which is substantially perpendicular to the common axis of rotation and the conductive elements of the second drum are located in a portion of the magnetic field which is substantially parallel to the common axis of rotation.

4. The turbine of claim 3, wherein adjacent conductive elements are electrically isolated and insulated from each other.

5. The turbine of claim 4, wherein adjacent conductive elements are separated by a plurality of non-conductive spacing elements.

6. The turbine of claim 4, wherein the electrical circuit through the drum is formed by connecting adjacent conductive elements via plurality of current transfer elements positioned about the drum.

7. The turbine of claim 4, wherein the magnetic elements are electromagnets.

8. The turbine of claim 7, wherein the electromagnets are formed from coils of high temperature superconducting tape.

9. The turbine of claim 1, wherein each magnetic element includes at least one pair of spaced apart superconducting coils.

10. The turbine of claim 9, wherein the at least one pair of spaced apart superconducting coils is concentrically spaced and wherein the regions of null magnetic field are produced within the space between the at least one pair of superconducting coils.

11. The turbine of claim 9, wherein the at least one pair of spaced apart superconducting coils is longitudinally spaced and wherein the regions of null magnetic field are produced within the space between the at least one pair of superconducting coils.

12. The turbine of claim 1, wherein each magnetic element includes two pairs of superconducting coils, a first pair of superconducting coils spaced concentrically from one another and a second pair of superconducting coils spaced concentrically from one another, the second pair of coils spaced longitudinally from the first pair, away from the drum assembly and wherein the regions of null magnetic field are produced within the space between the first pair of superconducting coils and the second pair of superconducting coils and between the superconducting coils in each of the respective first and second pairs.

13. The turbine of claim 1, wherein the at least a part of the current transfer mechanism located in at least one of the regions of null magnetic field includes a liquid metal current transfer mechanism to provide current transfer between the rotating drum assembly and a stationary current transfer component.

14. The turbine of claim 1, wherein the pair of magnetic elements is arranged in repulsion to create the working magnetic field therebetween.

15. The turbine of claim 1, wherein the drum assembly is one of a plurality of drum assemblies each positioned between a respective pair of magnetic elements, each drum assembly including one or more conductive elements disposed about the drum assembly wherein the one or more conductive elements are connected to form an electrical circuit through each drum assembly and wherein the drums assemblies are electrically coupled together to form a current path through the turbine; and
   wherein application of current through the current path causes the drum assemblies to counterrotate about an axis of rotation.

* * * * *